(12) United States Patent
Kulkarni et al.

(10) Patent No.: US 9,860,688 B2
(45) Date of Patent: Jan. 2, 2018

(54) SYSTEMS, METHODS AND DEVICES FOR ASSET STATUS DETERMINATION

(71) Applicant: CloudLeaf, Inc., Milpitas, CA (US)

(72) Inventors: Raghavendra Kulkarni, Fremont, CA (US); Sharath Narahari, Pleasanton, CA (US); Ravindar Roopreddy, Fremont, CA (US)

(73) Assignee: CloudLeaf, Inc., Milpitas, CA (US)

( * ) Notice: Subject to any disclaimer, the term of this patent is extended or adjusted under 35 U.S.C. 154(b) by 0 days.

(21) Appl. No.: 14/845,071

(22) Filed: Sep. 3, 2015

(65) Prior Publication Data

US 2016/0066137 A1    Mar. 3, 2016

Related U.S. Application Data

(60) Provisional application No. 62/045,420, filed on Sep. 3, 2014, provisional application No. 62/061,853, filed
(Continued)

(51) Int. Cl.
*H04W 4/02* (2009.01)
*H04W 84/18* (2009.01)
(Continued)

(52) U.S. Cl.
CPC .............. *H04W 4/02* (2013.01); *H04W 84/18* (2013.01); *G01S 13/75* (2013.01);
(Continued)

(58) Field of Classification Search
CPC ........ G06K 7/10366; G06K 2017/0045; G01S 13/75; G01S 13/878; G01S 5/0284;
(Continued)

(56) References Cited

U.S. PATENT DOCUMENTS

| 5,742,237 A | 4/1998 | Bledsoe et al. |
| 6,025,799 A * | 2/2000 | Ho .................. G01S 13/878 |
| | | 342/373 |

(Continued)

FOREIGN PATENT DOCUMENTS

| WO | 2014068366 A1 | 5/2014 |
| WO | 2016036991 A1 | 3/2016 |
| WO | 2016118776 A1 | 7/2016 |

OTHER PUBLICATIONS

PCT/US2015/048412, "International Application Serial No. PCT/US2015/048412 International Search Report and Written Opinion dated Jan. 4, 2016", CloudLeaf, Inc., 11 pages.
(Continued)

*Primary Examiner* — Olumide T Ajibade Akonai
(74) *Attorney, Agent, or Firm* — GTC Law Group PC & Affiliates

(57) ABSTRACT

A system for determining real time location of leaf node device, the system including at least one battery-powered Bluetooth Low Energy (BLE) enabled leaf node device, wherein the at least one leaf node device is associated with a corresponding monitored asset; and at least one beam forming reader node in communication, via BLE, with the at least one leaf node, the reader node creating a plurality of sectorized beams in a plurality of sectors and collecting data related to the at least one leaf node device from at least one of the plurality of sectors, wherein a location processing facility determines the real-time location of the at least one leaf node device based on the data collected by the beam forming reader node.

15 Claims, 23 Drawing Sheets

Related U.S. Application Data on Oct. 9, 2014, provisional application No. 62/081,478, filed on Nov. 18, 2014, provisional application No. 62/105,885, filed on Jan. 21, 2015, provisional application No. 62/161,463, filed on May 14, 2015, provisional application No. 62/161,789, filed on May 14, 2015.

(51) Int. Cl.
*H04W 64/00* (2009.01)
*H04W 8/00* (2009.01)
*G01S 13/75* (2006.01)
*G06K 17/00* (2006.01)

(52) U.S. Cl.
CPC ..... *G06K 2017/0045* (2013.01); *H04W 8/005* (2013.01); *H04W 64/00* (2013.01)

(58) Field of Classification Search
CPC ....... H04W 64/00; H04W 4/02; H04W 4/028; H04W 84/18; H04W 4/043; H04W 8/005
See application file for complete search history.

(56) References Cited

U.S. PATENT DOCUMENTS

| | | | |
|---|---|---|---|
| 6,040,774 A * | 3/2000 | Schepps | G01S 13/74 340/12.54 |
| 6,219,613 B1 * | 4/2001 | Terrier | G01S 13/74 342/42 |
| 8,451,120 B2 | 5/2013 | Davisson et al. | |
| 8,688,140 B2 | 4/2014 | Németh et al. | |
| 8,836,580 B2 | 9/2014 | Mendelson | |
| 8,847,754 B2 | 9/2014 | Buchheim et al. | |
| 8,878,671 B2 | 11/2014 | Buchheim et al. | |
| 9,179,331 B2 | 11/2015 | Shin et al. | |
| 9,232,357 B2 | 1/2016 | Buchheim et al. | |
| 9,641,964 B2 | 5/2017 | Kulkarni et al. | |
| 9,651,659 B2 * | 5/2017 | Vinski | G01S 13/74 |
| 2003/0007473 A1 | 1/2003 | Strong et al. | |
| 2007/0282560 A1 | 12/2007 | Anderson et al. | |
| 2008/0042898 A1 | 2/2008 | Sharma et al. | |
| 2008/0214203 A1 | 9/2008 | Titli et al. | |
| 2008/0278347 A1 * | 11/2008 | Ho | G07B 15/063 340/928 |
| 2009/0106801 A1 | 4/2009 | Horii et al. | |
| 2009/0201169 A1 | 8/2009 | D'Hont et al. | |
| 2009/0206992 A1 * | 8/2009 | Giobbi | G06F 19/322 340/5.74 |
| 2009/0219170 A1 | 9/2009 | Clark et al. | |
| 2010/0144383 A1 | 6/2010 | Berger et al. | |
| 2011/0080264 A1 | 4/2011 | Clare et al. | |
| 2012/0015665 A1 | 1/2012 | Farley et al. | |
| 2012/0213136 A1 | 8/2012 | Woo et al. | |
| 2013/0090133 A1 | 4/2013 | D' Jesus Bencci et al. | |
| 2013/0127596 A1 | 5/2013 | Jain et al. | |
| 2013/0166198 A1 | 6/2013 | Funk et al. | |
| 2013/0188538 A1 | 7/2013 | Kainulainen et al. | |
| 2013/0214046 A1 * | 8/2013 | Choi | G06K 7/10346 235/439 |
| 2013/0264382 A1 | 10/2013 | Taylor et al. | |
| 2013/0281120 A1 | 10/2013 | Oka et al. | |
| 2014/0118113 A1 | 5/2014 | Kaushik et al. | |
| 2014/0132411 A1 | 5/2014 | Buchheim et al. | |
| 2014/0136233 A1 | 5/2014 | Atkinson et al. | |
| 2014/0191868 A1 | 7/2014 | Ortiz et al. | |
| 2014/0370917 A1 | 12/2014 | Buchheim et al. | |
| 2015/0019266 A1 * | 1/2015 | Stempora | G06Q 40/08 705/4 |
| 2015/0042447 A1 * | 2/2015 | Vogt | G08C 17/02 340/4.41 |
| 2015/0120295 A1 | 4/2015 | Raines et al. | |
| 2015/0133170 A1 | 5/2015 | Buchheim et al. | |
| 2015/0181631 A1 * | 6/2015 | Lee | H04W 76/023 455/41.2 |
| 2015/0271639 A1 | 9/2015 | McKechney et al. | |
| 2015/0296332 A1 | 10/2015 | Nakra et al. | |
| 2016/0142868 A1 | 5/2016 | Kulkarni et al. | |
| 2017/0180939 A1 | 6/2017 | Kulkarni et al. | |

OTHER PUBLICATIONS

PCT/US2016/014369, "International Application Serial No. PCT/US2016/014369, International Search Report and Written Opinion dated Mar. 24, 2016", CloudLeaf, Inc., 10 pages.

Scheerens, "Practical Indoor Localization Using Bluetooth", Masters Thesis, Faculty of Electrical Engineering, Mathematics and Computer Science, Information Systems Engineering, University of Twente, Jan. 2012, pp. 1-99.

PCT/US2015/048412, "International Application Serial No. PCT/US2015/048412, International Preliminary Report on Patentability and Written Opinion dated Mar. 16, 2017", CloudLeaf, Inc., 8 Pages.

PCT/US2017/014428, "Application Serial No. PCT/US2017/014428, International Search Report and the Written Opinion dated Apr. 6, 2017", 10 pages.

* cited by examiner

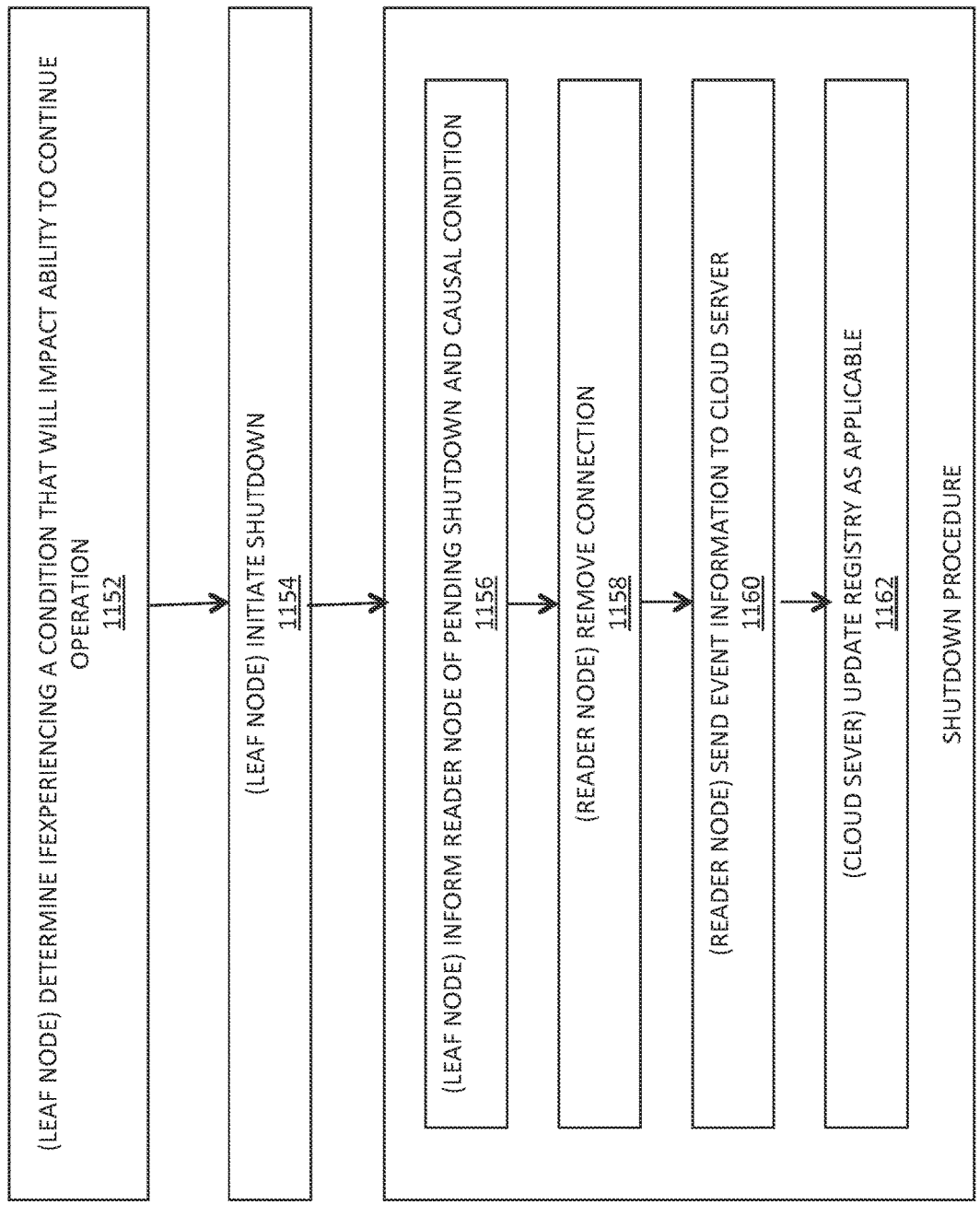

SYSTEMS, METHODS AND DEVICES FOR ASSET STATUS DETERMINATION

CLAIM OF PRIORITY

This application claims priority to U.S. Provisional Appl. 62/045,420 filed on Sep. 3, 2014, entitled "DEVICES AND METHODS FOR BLUETOOTH AND BLUETOOTH LOW-ENERGY (BLE) COMMUNICATIONS FOR INDUSTRIAL CONTROL, STATUS AND LOGISTICAL SYSTEMS."

This application also claims priority to U.S. Provisional Appl. 62/061,853, filed Oct. 9, 2014, entitled "DEVICES AND METHODS FOR BLUETOOTH AND BLUETOOTH LOW-ENERGY (BLE) COMMUNICATIONS FOR INDUSTRIAL CONTROL, STATUS AND LOGISTICAL SYSTEMS."

This application also claims priority to U.S. Provisional Appl. 62/081,478, filed Nov. 18, 2014, entitled "DEVICES AND METHODS FOR BLUETOOTH AND BLUETOOTH LOW-ENERGY (BLE) COMMUNICATIONS FOR INDUSTRIAL CONTROL, STATUS AND LOGISTICAL SYSTEMS."

This application also claims priority to U.S. Provisional Appl. 62/105,885, filed Jan. 21, 2015, entitled "DEVICES AND METHODS FOR BLUETOOTH AND BLUETOOTH LOW-ENERGY (BLE) COMMUNICATIONS FOR INDUSTRIAL CONTROL, STATUS AND LOGISTICAL SYSTEMS."

This application also claims priority to U.S. Provisional Appl. 62/161,463, filed May 14, 2015, entitled "COMMUNICATIONS FOR INDUSTRIAL CONTROL, STATUS AND LOGISTICAL SYSTEMS."

This application also claims priority to U.S. Provisional Appl. 62/161,789, filed May 14, 2015, entitled "COMMUNICATIONS FOR INDUSTRIAL CONTROL, STATUS AND LOGISTICAL SYSTEMS."

All of the above-mentioned U.S. patent applications are hereby incorporated by reference in their entirety.

FIELD OF THE EMBODIMENTS OF THE INVENTION

The disclosure relates to Bluetooth Low Energy (BLE) systems containing end node devices and the monitoring, control, and data extraction therefrom, for example, in the area of asset management. The disclosure also relates to hardware and componentry to enable efficient communication and power usage for such BLE systems.

BACKGROUND

An asset management system is a software system which continually inputs current real-time data from a set of computationally intelligent nodes where each such node associates with some asset; coherently organizes these data; provides methods to extract useful information and knowledge from these data; and potentially provides methods to direct those nodes.

Asset management systems are useful in connection with the management of the manufacture, storage, delivery and other logistics associated with physical goods.

A critical aspect relates to tracking such goods, and providing to the controlling industrial entities crucial data such as: current and historic location of the goods, current and historic rate at which the goods are traveling, current and historic state information regarding those goods such as humidity, temperature, shock, change in weight as detected by pressure gauges, tamper-detection by contact-sensors, and so on.

Within the field of enterprise asset management, physical asset management includes various methods and systems that help various types of enterprises manage various physical and infrastructure assets, including in relation to design, construction, commissioning, operating, maintaining, repairing, modifying, replacing and decommissioning/disposal of such physical and infrastructure assets, which may include equipment, tools, structures, production and service plants, power generating assets, water and waste treatment assets, facilities, distribution networks, transport systems, buildings, inventory, supplies, vehicles, products, information technology systems, and a wide range of other physical assets. Information technology systems have emerged that catalog and help enterprises manage physical assets, including systems for recording locations of such assets, and including systems that use networking and tagging technologies, such as WiFi and RFID, to store, collect, and manage certain information about the assets.

In the context of asset management systems, the prior art fails to provide continuous instantaneous access to all tracked states and to instantaneously inform operators of events that require their attention.

Range, real-time access to data at the nodes, the potential for interference, scalability, physical constraints, centralized control, and power consumption are all challenges in prior art systems that utilize Wi-Fi and RFID. With respect to Wi-Fi, while Wi-Fi appearing to be a good choice due to Wi-Fi's decent range and the fact that it contains proper protocols at all levels of the software stack, suffers from Wi-Fi's demands of high-power, rending a system based on purely battery-powered Wi-Fi devices infeasible. RFID has range constraints in that a reader must be in range of an asset in order to obtain the information therefrom.

The above is a non-exhaustive list of shortcomings of the prior art that a BLE enabled asset management system (hereinafter "BLEATS") can address. In embodiments, a BLEATs asset management system may comprise a software system that continually inputs current real-time data, such as from a set of computationally intelligent tags, where each such tag physically associates with some assets; coherently organizes these data; provides methods to extract useful information and knowledge from these data; and potentially provides methods to direct those tags.

SUMMARY AND OBJECTIVES

This disclosure presupposes knowledge and understanding of the subjects of Bluetooth Low Energy (BLE) devices and protocols and Internet physical devices and protocols these subjects being well known and well understood by those skilled in the art.

A BLEATS system described herein is advantageous in the following aspects:
- by connecting previously unconnected devices to the Internet and thereby providing access to those devices from computers, cell phones and tablets
- by streamlining control across all these devices; by making access to these devices reliable, future-tolerant and fault-tolerant
- by allowing autonomous control, tracking, and logistics of wide ranges of assets The present disclosure describes a system for real time location of at least one leaf node device, the system according to one disclosed non-limiting embodiment of the present disclosure can include, a location processing engine located on a server that is remote from the at least one leaf node device; and at least one beam forming gateway node for collecting sectorized data relating to at least one leaf node, wherein the location processing engine processes information relayed by the beam forming receiver hardware node to facilitate determination of the location of the leaf node.

A further embodiment of any of the foregoing embodiments of the present disclosure may include situations wherein the leaf node is adapted to use the Bluetooth Low Energy protocol and to be deployed as an asset tag on a physical asset.

A further embodiment of any of the foregoing embodiments of the present disclosure may include situations wherein the beam forming gateway node and the leaf node can communicate over a range of at least twenty feet using not more than 10 mW of power.

The present disclosure describes a system for management of information relating to a leaf node device, the system according to one disclosed non-limiting embodiment of the present disclosure can include, at least one Bluetooth Low Energy-enabled leaf node device adapted communicate through a gateway node; and a processing engine located on a server that is remote from the at least one leaf node device for managing information relating to the leaf node.

A further embodiment of any of the foregoing embodiments of the present disclosure may include situations wherein the gateway node is a beam forming gateway node.

A further embodiment of any of the foregoing embodiments of the present disclosure may include situations wherein the managed information includes at least one of location data for the leaf node, event data about the leaf node, state information about the leaf node, and sensor data collected by the leaf node.

The present disclosure describes a system for asset tagging, the system according to one disclosed non-limiting embodiment of the present disclosure can include, at least one leaf data communication node adapted to be attached to a physical asset, wherein the leaf data communication node is configured to continuously communicate in real time using the Bluetooth Low Energy protocol with at least one receiver node that collects real time information about the location of a plurality of assets.

A further embodiment of any of the foregoing embodiments of the present disclosure may include situations wherein the assets comprise at least one of human assets, manufacturing assets and inventory assets.

The present disclosure describes a system for real time location management of at least one leaf node device, the system according to one disclosed non-limiting embodiment of the present disclosure can include, a remote location processing facility located on a server that is remote from the at least one leaf node device for determining the location of the at least one leaf node device; at least one beam forming receiver hardware node for collecting and communicating sectorized data relating to the at least one leaf node; and a Bluetooth Low Energy (BLE)-enabled user device having an application for communicating with at least one of the beam forming receiver hardware node and the at least one leaf node to display the current location of the at least one leaf node, wherein the location of the leaf node is determined by at least one of the remote location processing facility and the beam forming receiver hardware node.

A further embodiment of any of the foregoing embodiments of the present disclosure may include situations wherein at least one leaf node is deployed as an asset tag on a physical asset.

The present disclosure describes a method for real time location of at least one leaf node device, the method according to one disclosed non-limiting embodiment of the present disclosure can include, taking at least one of signal strength information, proximity information and phase angle information collected via Bluetooth Low Energy communication signals from the leaf node device; delivering the collected information to a processing engine that is remote from the leaf node device; and processing the collected information in real time to determine the location of the leaf node.

The present disclosure describes a system for real time location of at least one leaf node device, the system according to one disclosed non-limiting embodiment of the present disclosure can include, at least one beam forming gateway node for managing data relating to at least one leaf node, wherein the leaf node is adapted to use the Bluetooth Low Energy protocol.

A further embodiment of any of the foregoing embodiments of the present disclosure may include situations wherein the data is managed according to location sectors located around the beam forming gateway node.

The present disclosure describes a system for asset tagging, the system according to one disclosed non-limiting embodiment of the present disclosure can include, at least one Bluetooth Low Energy-enabled leaf node device adapted to be attached as an asset tag on an asset and adapted to communicate through a gateway node to a remote location processing facility.

A further embodiment of any of the foregoing embodiments of the present disclosure may include situations wherein the gateway node is a beam forming gateway node that can identify a sector around the gateway node in which the leaf node is located.

A further embodiment of any of the foregoing embodiments of the present disclosure may include situations wherein the assets comprise at least one of human assets, manufacturing assets and inventory assets.

A further embodiment of any of the foregoing embodiments of the present disclosure may include situations wherein the leaf node device has at least one sensor.

The present disclosure describes a system for managing information related to at least one leaf node device that uses Bluetooth Low Energy (BLE) data communication, the system according to one disclosed non-limiting embodiment of the present disclosure can include, a software application installed on a mobile hardware device for communicating by the BLE data communication with at least one of a beam forming gateway node that collects data related to the leaf node device, the leaf node device, and a processing engine that is remote from the leaf node device, to present at least one of location data, event data, state data and sensor data related to the least one leaf node.

A further embodiment of any of the foregoing embodiments of the present disclosure may include situations wherein the beam forming gateway node forms sectorized beams that enable collection of directional information about the leaf node device.

The present disclosure describes a system for real time location of at least one leaf node device, the system according to one disclosed non-limiting embodiment of the present disclosure can include, at least one beam forming gateway node for collecting sectorized data relating to at least one leaf node, wherein the beams of the gateway node are shaped into sectors by use of a plurality of patch antennas.

A further embodiment of any of the foregoing embodiments of the present disclosure may include situations wherein the patch antennas are used to form four sectorized beams around the gateway node.

A further embodiment of any of the foregoing embodiments of the present disclosure may include situations wherein the sectorized beams collectively cover a 360-degree angle around the gateway node.

A further embodiment of any of the foregoing embodiments of the present disclosure may include situations wherein the sectorized beams are at least partially overlapping.

The present disclosure describes a system for real time location of at least one leaf node device, the system according to one disclosed non-limiting embodiment of the present disclosure can include, a location processing engine located on a server that is remote from the at least one leaf node device; and at least one beam forming receiver hardware node for collecting sectorized data relating to at least one leaf node, wherein the beams of the beam forming receiver are shaped into sectors by use of at least one antenna selected from the group consisting of a patch antenna, a linear antenna, a point antenna, a spherical antenna, a circular polarization antenna, a vertical polarization antenna, a horizontal polarization antenna, and an omnidirectional antenna with reflectors.

The present disclosure describes a system for managing data related to a leaf node device, the system according to one disclosed non-limiting embodiment of the present disclosure can include, a location processing engine located on a server that is remote from the at least one leaf node device; at least one beam forming gateway node for collecting data relating to at least one leaf node; and a database of the locations of points of interest corresponding to known locations of deployed gateways, wherein the known locations are used as a basis for determining the locations of a plurality of leaf nodes that communicate with the gateways using BLE.

The present disclosure describes a system for managing and storing data related to at least one leaf node device, the system according to one disclosed non-limiting embodiment of the present disclosure can include, a location processing engine located on a server that is remote from the at least one leaf node device; at least one beam forming gateway node for collecting data relating to at least one leaf node; and a database for storing the information collected from the leaf node devices.

The present disclosure describes a system for real time location of at least one leaf node device, the system according to one disclosed non-limiting embodiment of the present disclosure can include, a location processing engine located on a server that is remote from the at least one leaf node device; at least one beam forming gateway node for collecting sectorized data relating to at least one leaf node; and a database of the locations of virtual points of interest corresponding to logical locations of beam forming gateway nodes within a flow of assets, wherein the logical locations are used for determining the locations of a plurality of leaf nodes within the flow of assets, wherein the leaf nodes communicate with the beam forming gateway nodes using BLE.

A further embodiment of any of the foregoing embodiments of the present disclosure may include situations wherein the logical location of a leaf node device is used to trigger an action.

A further embodiment of any of the foregoing embodiments of the present disclosure may include situations wherein upon a leaf node arriving at a logical location, an event is triggered by the beam forming gateway node.

A further embodiment of any of the foregoing embodiments of the present disclosure may include situations wherein upon a leaf node sensing a triggering condition, an event is triggered by the beam forming gateway node.

The present disclosure describes a system for real time location of at least one leaf node device, the system according to one disclosed non-limiting embodiment of the present disclosure can include, a location processing engine located on a server that is remote from the at least one leaf node device; at least one gateway node for collecting data relating to at least one leaf node; and a database of the locations of virtual points of interest corresponding to logical locations of gateway nodes within a flow of assets, wherein the logical locations are used for determining the locations of a plurality of leaf nodes within the flow of assets, wherein the leaf nodes communicate with the gateway nodes using BLE.

The present disclosure describes an information technology system for handling information to enable a real time location system using Bluetooth Low Energy (BLE), the system according to one disclosed non-limiting embodiment of the present disclosure can include, a device management system for mapping physical devices and handling sampled data with respect to the devices; an asset visibility system for real time tracking of asset locations; a process flow system for tracking travel paths of assets; a logic layer for using logic to determine locations of assets; and a presentation layer for presenting locations of assets, trip metrics of assets and the like.

The present disclosure describes method of an information technology system for handling information relating to a real time location system (RTLS) that uses Bluetooth Low Energy (BLE) nodes for communication of data, the system according to one disclosed non-limiting embodiment of the present disclosure can include, a process flow editor having a user interface to allow a user to at least one of access a stored process flow from a library and edit a process flow to create a customized process flow, such that an asset may be tracked using the RTLS system with respect to at least one of a physical location corresponding to the process flow and a logical location with respect to a logical position within the process flow.

The present disclosure describes a method of an information technology system for handling information to enable an a real time location system using data communication nodes that communicate using the Bluetooth Low Energy protocol (BLE), the system according to one disclosed non-limiting embodiment of the present disclosure can include, taking raw event streams from a plurality of leaf data communication nodes; transforming the event stream data based on use of a library of contextual metadata about the raw event types to produce transformed event types; tagging active sessions of leaf data communication nodes; performing domain level processing on the active sessions; determining at least one event; determining a transition of at least one leaf data communication node from a state or location to another state or location; handing off the leaf data communication node as needed to one or more receivers; tagging at least one event as a leaf data communication node transitions from first state to second state; calculating at least one metric as to the location of at least one leaf data communication node; and providing at least one of an alert and a notification based on the at least one tagged event.

A further embodiment of any of the foregoing embodiments of the present disclosure may include situations wherein the events are at least one of boundary events and visit events.

A further embodiment of any of the foregoing embodiments of the present disclosure may include situations wherein the events relate to at least one of battery status, temperature, location, signal strength, and phase angle.

The present disclosure describes a method of an information technology system for handling information to enable an a real time location system using data communication nodes that communicate using the Bluetooth Low Energy protocol (BLE), the method according to one disclosed non-limiting embodiment of the present disclosure can include, taking raw event streams from a plurality of leaf data communication nodes; transforming the event stream data based on use of a library of contextual metadata about the raw event types to produce transformed event types; tagging active sessions of leaf data communication nodes; performing domain level processing on the active sessions; and determining at least one event from the domain level processing.

The present disclosure describes a method of an information technology system for handling information to enable an a real time location system using data communication nodes that communicate using the Bluetooth Low Energy protocol (BLE), the method according to one disclosed non-limiting embodiment of the present disclosure can include, taking raw event streams from a plurality of leaf data communication nodes; transforming the event stream data based on use of a library of contextual metadata about the raw event types to produce transformed event types; tagging active sessions of leaf data communication nodes; performing domain level processing on the active sessions; determining a transition of at least one leaf data communication node from a state or location to another state or location; and providing at least one of an alert and a notification based on the determined transition.

The present disclosure describes a method relating to an information technology system for handling information to enable a real time location system using Bluetooth Low Energy data communication nodes, the method according to one disclosed non-limiting embodiment of the present disclosure can include, providing a reference data library containing at least one of device metadata, context data, business rules for stages of a processing pipeline, business rules for a domain, and process flows for devices that use the data communication nodes, wherein the rules and flows may be customized for particular situations. Metadata may include a wide range of information about a device, such as device identification, device history, descriptions of types of data that a device can handle, and the like. Device metadata may also encapsulate various defined structures relating to the capabilities and configuration parameters of the leaf node. This metadata may be used to connect and control a leaf node in a generic way, such as from the reader node or gateway.

The present disclosure describes a method relating to a system for real time location of at least one leaf node device, the method according to one disclosed non-limiting embodiment of the present disclosure can include, providing at least one gateway for collecting data relating to a plurality of leaf nodes; and time division multiplexing connections of the leaf nodes to the gateway in a time domain protocol and managing each of the connections in the time domain.

The present disclosure describes a method relating to a system for real time location of at least one leaf node device, the method according to one disclosed non-limiting embodiment of the present disclosure can include, providing at least one gateway node for collecting data relating to a plurality of leaf nodes; and providing a MAC layer designed to manage connections in the time domain, thereby enabling concurrent connections of a large number of leaf nodes to a receiver of the gateway node.

The present disclosure describes a method relating to a system for real time location of at least one leaf node device, the method according to one disclosed non-limiting embodiment of the present disclosure can include, providing at least one beam forming receiver hardware node for collecting sectorized data relating to a plurality of leaf nodes; and providing a plurality of physical radios in each sector of the beam forming receiver hardware node.

A further embodiment of any of the foregoing embodiments of the present disclosure may include situations wherein 16 physical radios are provided per beam of the beam forming receiver hardware node.

The present disclosure describes a method relating to a system for real time location of at least one leaf node device, the method according to one disclosed non-limiting embodiment of the present disclosure can include, providing at least one beam forming receiver hardware node for collecting sectorized data relating to a plurality of leaf nodes; and providing a plurality of physical radios in each sector of the beam forming hardware receiver node, wherein the plurality of radios have spectral diversity among them.

The present disclosure describes a method relating to a system for real time location of at least one leaf node device, the method according to one disclosed non-limiting embodiment of the present disclosure can include, providing at least one beam forming receiver hardware node for collecting sectorized data relating to a plurality of leaf nodes; providing a plurality of physical radios in each sector of the beam forming hardware receiver node; implementing an antenna training phase for the receiver to map out null areas; and in an operating phase, steering at least one beam to avoid at least one null area mapped during the training phase.

The present disclosure describes a method relating to a real time location system using data communication nodes that communicate using the Bluetooth Low Energy protocol (BLE), the method according to one disclosed non-limiting embodiment of the present disclosure can include, providing a virtualized connection manager that manages connections of a plurality of leaf nodes to a receiver node in a TDM protocol.

The present disclosure describes a method relating to a system for real time location of at least one leaf node device, the method according to one disclosed non-limiting embodiment of the present disclosure can include, providing at least one beam forming gateway node having a plurality of radios for collecting sectorized data from a plurality of leaf nodes; and using a TDM protocol of the beam forming gateway node to enable the beam forming gateway node to handle a plurality of leaf node device connections per radio of the beam forming gateway node. In embodiments, the plurality of connections per radio may comprise more than one, more than ten, more than one hundred, or more than one thousand leaf node device data connections per radio of the beam forming gateway node.

The present disclosure describes a method relating to a system for real time location of at least one leaf node device, the method according to one disclosed non-limiting embodiment of the present disclosure can include, providing at least one beam forming receiver hardware node having a plurality of radios for collecting sectorized data from a plurality of leaf nodes; and using multiple radios per sector to enable long range communication between the beam forming receiver hardware node and the leaf nodes.

A further embodiment of any of the foregoing embodiments of the present disclosure may include situations wherein the range of communication between the beam forming receiver hardware node and a leaf node extends at least to at least one of ten meters, twenty meters, thirty meters, forty meters, fifty meters, sixty meters, seventy meters, eighty meters, ninety meters, and one hundred meters.

The present disclosure describes a system for machine learning of the real time location of at least one leaf node device, the system according to one disclosed non-limiting embodiment of the present disclosure can include, at least one beam forming receiver hardware node for collecting sectorized data relating to at least one leaf node; a location processing engine located on a server that is remote from the at least one leaf node device, wherein the location processing engine uses machine learning on the data flow collected by the beam forming receiver hardware node about the leaf node device to help determine the location of the leaf node; and at least one leaf node, wherein machine learning is also performed on at least one of the leaf node and the beam forming hardware receiver node. Thus, machine learning logic may be tiered, such that portions run on any of the cloud, a reader node, or a leaf node.

The present disclosure describes a system for real time location of at least one leaf node device, the system according to one disclosed non-limiting embodiment of the present disclosure can include, at least one gateway node for collecting sectorized data relating to at least one leaf node; at least one leaf node that communicates using the Bluetooth Low Energy (BLE) protocol; a location processing engine located on a server that is remote from the at least one leaf node device, wherein the location processing engine orchestrates information for the gateway node, at least one leaf node, and at least one mobile application that presents information about the location of the at least one leaf node, wherein the location processing engine includes an interpreter for interpreting heterogeneous languages used by the beam forming hardware receiver node, the leaf node and the mobile application.

A further embodiment of any of the foregoing embodiments of the present disclosure may include situations wherein the interpreter handles at least one of code and logic that is at least one of customer-specific and location-specific.

A further embodiment of any of the foregoing embodiments of the present disclosure may include situations wherein the interpreter uses SCALA language.

A further embodiment of any of the foregoing embodiments of the present disclosure may include situations wherein the interpreter uses at least one Docker as an embedded container that includes logic interpreter on the local receiver.

The present disclosure describes a system for real time location of at least one leaf node device, the system according to one disclosed non-limiting embodiment of the present disclosure can include, at least one gateway node for collecting data relating to at least one leaf node; at least one leaf node that communicates using the Bluetooth Low Energy (BLE) protocol; and a location processing engine using a plurality of servers that are remote from the at least one leaf node device, wherein the location processing engine load balances resources for a plurality of gateway nodes and wherein if a server of the plurality of servers becomes unavailable, an alternate server is designated to manage data relayed by the gateway node that was served by the unavailable server.

The present disclosure describes a system for real time location of at least one leaf node device, the system according to one disclosed non-limiting embodiment of the present disclosure can include, at least one gateway node for collecting data relating to at least one leaf node; at least one leaf node that communicates using the Bluetooth Low Energy (BLE) protocol; and a location processing engine using a plurality of servers that are remote from the at least one leaf node device, wherein the location processing engine load balances resources for a plurality of gateway nodes and wherein if a server of the plurality of servers becomes overloaded, an alternate server is designated to manage data relayed by the gateway node that was served by the overloaded server.

The present disclosure describes a system for real time location of at least one leaf node device, the system according to one disclosed non-limiting embodiment of the present disclosure can include, at least one gateway node for collecting data relating to at least one leaf node; at least one leaf node that communicates using the Bluetooth Low Energy (BLE) protocol; and a location processing engine located on a server that is remote from the at least one leaf node device, wherein real time processing of location data about the leaf node and sensor data from the leaf node is distributed across the gateway node and the location processing engine.

The present disclosure describes a method for managing a work flow based on the real time location of at least one leaf node device, the method according to one disclosed non-limiting embodiment of the present disclosure can include, providing a location processing engine located on a server that is remote from the at least one leaf node device; providing at least one gateway node for collecting data relating to at least one leaf node; providing the location of at least one asset to an workflow management system; and using the workflow management system, guiding execution of at least one task of a workflow based on the asset location information. An industrial workflow may, for example, define work from start to completion, with sequence of coordinated operations among sensors, machines and people.

A further embodiment of any of the foregoing embodiments of the present disclosure may include situations wherein the asset is at least one of a hardware asset and a human asset. A workflow management system may include one or more information technology components, including hardware and/or software, for assisting an enterprise or other user in managing a workflow, such as a workflow involving one or more assets. Such a workflow management system may typically process inputs relating to a workflow, such as handling alerts, events, and other inputs and provide direction, assistance, data, or the like that assist the completion of a workflow, such as by prompting a user as to the availability of information and guidance as to steps to complete the workflow. Workflow management systems may frequently relate to assets, such as involving using assets to complete tasks, manufacturing goods with assets, using assets to perform services, tracking assets, reporting on information about assets, and the like.

The present disclosure describes a method relating to a system for real time location of at least one leaf node device, the method according to one disclosed non-limiting embodiment of the present disclosure can include, providing at least one gateway node for collecting data relating to a plurality of leaf nodes; and providing a MAC layer designed to handle data connections to the receiver hardware node; providing a virtual MAC address in the MAC layer to at least gateway node; and accessing the gateway node by using the assigned virtual MAC addresses.

A further embodiment of any of the foregoing embodiments of the present disclosure may include situations wherein the gateway node is a beam forming gateway node.

The present disclosure describes a method relating to a system for real time location of at least one leaf node device, the method according to one disclosed non-limiting embodiment of the present disclosure can include, providing at least one gateway node for collecting data relating to a plurality of leaf nodes; and providing a MAC layer designed to handle data connections to the gateway node; providing a virtual MAC address in the MAC layer to at least one leaf node device; and accessing the leaf node device through the gateway node by using the assigned virtual MAC addresses.

A further embodiment of any of the foregoing embodiments of the present disclosure may include situations wherein the MAC layer translates the virtual MAC address of the leaf node to an asset tag identifier.

A further embodiment of any of the foregoing embodiments of the present disclosure may include situations wherein the gateway node is a beam forming gateway node.

The present disclosure describes a method relating to a system for real time location of at least one leaf node device, the method according to one disclosed non-limiting embodiment of the present disclosure can include, providing at least one gateway node for collecting data relating to a plurality of leaf nodes; providing a virtual IP address to at least one leaf node device; translating the virtual IP address at the gateway node into an asset tag identifier; and accessing the leaf node device through the gateway node by using the assigned virtual IP address.

A further embodiment of any of the foregoing embodiments of the present disclosure may include situations wherein the gateway node is a beam forming gateway node.

The present disclosure describes a system for real time location of at least one leaf node device, the system according to one disclosed non-limiting embodiment of the present disclosure can include, a location processing engine located on a server that is remote from the at least one leaf node device; at least one gateway node for collecting data relating to at least one leaf node; wherein a software language is provided to allow a user to at least one of query and control at least one of the leaf node and the gateway node based on at least one of an attribute and an event.

A further embodiment of any of the foregoing embodiments of the present disclosure may include situations wherein the attribute is at least one of the address, the physical location, the virtual location, and a sensed condition of at least one of the leaf node device and the gateway node.

A further embodiment of any of the foregoing embodiments of the present disclosure may include situations wherein the event is at least one of a timing event and a sensed condition.

A further embodiment of any of the foregoing embodiments of the present disclosure may include situations wherein the gateway node is a beam forming gateway node.

A further embodiment of any of the foregoing embodiments of the present disclosure may include situations wherein the software language allows a user to at least one of schedule events, query individual lead nodes, query individual gateway nodes, send commands to individual leaf nodes, send commands to individual gateway nodes, send commands to groups of leaf nodes in the system, send command to groups of gateway nodes in the system, and take action based on data transmitted by at least one of a leaf node and a gateway node.

A further embodiment of any of the foregoing embodiments of the present disclosure may include situations wherein a gateway node uses the software language to send an event notification to a remote server.

A further embodiment of any of the foregoing embodiments of the present disclosure may include situations wherein a remote server uses the software language to request data from a gateway node identified in a registry.

A further embodiment of any of the foregoing embodiments of the present disclosure may include situations wherein a remote server uses the software language to send a programmatic instruction to be executed by a gateway node.

The present disclosure describes a method of a system for real time location of at least one leaf node device, the method according to one disclosed non-limiting embodiment of the present disclosure can include, providing a plurality of gateway nodes for collecting data relating to at least one leaf node; configuring at least one leaf node to provide a rolling advertisement packet; and using the rolling advertisement packet data to correlate information about the leaf node as the information is detected by a plurality of receiver hardware nodes.

The present disclosure describes a method relating to a system of real time location of at least one leaf node device, the method according to one disclosed non-limiting embodiment of the present disclosure can include, providing a plurality of gateway nodes for collecting data relating to at least one leaf node; configuring at least one leaf node to provide a rolling advertisement packet having a time stamp; and using the rolling advertisement packet time stamp data to synchronize information across components of the real time location system.

A further embodiment of any of the foregoing embodiments of the present disclosure may include situations wherein the real time location system further includes at least one of a location processing engine located on a server that is remote from the at least one leaf node device and a Bluetooth Low Energy (BLE)-enabled user device having an application for communicating with at least one of the receiver hardware node and the at least one leaf node to display the current location of the at least one leaf node.

The present disclosure describes a method relating to a system of real time location of at least one leaf node device, the method according to one disclosed non-limiting embodiment of the present disclosure can include, providing a plurality of beam forming gateway nodes for collecting data relating to at least one leaf node; identifying a characteristic of the environment of the leaf node; and configuring at least one of a number of radios, a number of sectors, a type of antenna, and a configuration of antennas based on the identified characteristic to facilitate communication between the gateway node and the leaf node.

The present disclosure describes a method of a system for real time location of at least one leaf node device, the method according to one disclosed non-limiting embodiment of the present disclosure can include, providing a plurality of gateway nodes for collecting data relating to at least one leaf node; and using the rolling advertisement packet data from a moving leaf node device to identify the leaf node as being present in the proximity of a gateway node . . . HM: Why is this transient? Please explain The present disclosure describes system, the system according to one disclosed non-limiting embodiment of the present disclosure can include, a gateway node that is configured to search for proximate Bluetooth Low Energy (BLE) devices through a sectorized spatial region and across a range of frequency spectral bands The present disclosure describes system, the system according to one disclosed non-limiting embodiment of the present disclosure can include, a gateway node that is configured to search for proximate Bluetooth Low Energy (BLE) devices through a sectorized spatial region and across a range of frequency spectral bands in order to establish communication with at least one such BLE device, and a channel switching facility of the gateway node that, upon establishing communication with the BLE device, switches to a data channel for continued communication with the BLE device.

The present disclosure describes system, the system according to one disclosed non-limiting embodiment of the present disclosure can include, a plurality of gateway nodes each configured to interact with at least one leaf node device; and a synchronization facility of such gateway nodes for exchanging PTP synchronization data among them to synchronize the gateway nodes to nanosecond resolution; and a correlation facility for correlating sampled I and Q components of signals received by the gateway nodes from the leaf node device to determine the leaf node device position at a point in time.

A further embodiment of any of the foregoing embodiments of the present disclosure may include situations wherein the correlation facility is located on a server that is remote from the gateway nodes.

The present disclosure describes system, the system according to one disclosed non-limiting embodiment of the present disclosure can include, a plurality of gateway nodes each configured to interact with at least one leaf node device; and a synchronization facility of such gateway nodes for exchanging PTP synchronization data among them to synchronize the gateway nodes to nanosecond resolution; wherein once synchronized, the gateway nodes test interference with each other by simultaneously transmitting a packet and a plurality of gateway nodes monitor and sample the I and Q data with respect to the packet, and wherein the system uses the interference test data to determine a map of gateway node interactions.

The present disclosure describes a method of a system of communication in an asset management system having a plurality of leaf nodes that communicate via Bluetooth Low Energy (BLE), the method according to one disclosed non-limiting embodiment of the present disclosure can include, detecting a collision of messages emitted by two leaf nodes on the same channel at the same time; and upon detecting the collision, having each of the leaf nodes wait a random amount of time then retransmit the messages, thereby reducing the likelihood of a second collision of the messages.

The present disclosure describes a method of relating to an asset tracking system having a plurality of leaf nodes associated with a plurality of assets, the method according to one disclosed non-limiting embodiment of the present disclosure can include, providing a plurality of gateway nodes for collecting data relating to at least one leaf node; providing a geo-location system of the gateway nodes to establish the positions of the gateway nodes; and storing the positions of the gateway nodes in a data storage facility, such that the positions can be used as references in determining relative locations of the leaf nodes.

The present disclosure describes a system for real time location of at least one leaf node device, the system according to one disclosed non-limiting embodiment of the present disclosure can include, a location processing engine located on a server that is remote from the at least one leaf node device; and at least one gateway node for collecting data relating to at least one leaf node, wherein the location processing engine processes information relayed by the gateway node to facilitate determination of the location of the leaf node, wherein the communication between the gateway node and the leaf node device is configured to hop between available BLE frequencies.

The present disclosure describes a system for real time location of at least one leaf node device, the system according to one disclosed non-limiting embodiment of the present disclosure can include, a location processing engine located on a server that s remote from the at least one leaf node device; and at least one gateway node for collecting data relating to at least one leaf node, wherein the location processing engine processes information relayed by the gateway node to facilitate determination of the location of the leaf node, wherein the priority of communication between the gateway node and a leaf node device may be managed based on a communication bit that designates a message as a high priority message.

The present disclosure describes a system for real time location of at least one leaf node device that communicates using the Bluetooth Low Energy protocol, the system according to one disclosed non-limiting embodiment of the present disclosure can include, at least one gateway node for collecting data relating to at least one leaf node; and at least one access point device for providing Internet access to a region in which the leaf node may be located, wherein the gateway node is integrated as a card in the chassis of the access point device and the gateway node and the access point device communicate through the backplane of the access point device.

As compared to RFID asset management system, a BLEATS system offers favorable alternatives. For instance, BLE has a greater range than RFID. Therefore an object of the system described herein is to increase the range of communication of end nodes in a system, such as an asset management system.

In addition to the readily apparent advantages of a longer range of communication, a longer range in such a system results in a system requiring fewer control devices. Therefore, another object of the system disclosed herein is to enable management of large numbers of assets through an efficient architecture that uses relatively few reader nodes, such as compared to conventional RFID or WiFi systems.

Also, BLE interferes less with other devices than the prior art, such as RFID. For example, a BLEATS system provides for channel hopping to avoid signal collisions, while active RFID does not. Therefore, another object of the system described herein is to reduce interference that exists in asset management systems. For example, when two BLE devices both transmit in the same geographic vicinity at the same time on the same channel, then the messages can collide, resulting in interference, noise, and potentially a meaningless, garbled signal. If this happens then either the devices themselves may listen at the same time as they transmit, or they may not do so. If the devices listen at the same time as they transmit, then each such device may recognize the potential collision (by recognizing that the device has emitted a signal at the same time and one the same channel as it has detected a signal from another device). Upon recognition, the device may be programmed to retransmit the signal; however, there is a question as to when the re-transmission should occur. To reduce the chance of a second collision, each device may be programmed to wait for a random duration before trying again, reducing the chances of a second collision. If the devices don't listen as they transmit, then one of the devices in the intended audience, such as a reader node, may send out a message that indicates that whatever device tried to transmit on the specified channel at the specified time should wait a random amount of time, then retransmit. By these and other methods collisions may be avoided.

Devices of the BLEATS system described herein, most notably, the leaf/end node discussed herein, can be powered through attached power sources including but not limited to battery, power grid, and solar cell, rather than just received signal energy, as is the case with passive RFID systems. Other approaches have been based on Wi-Fi. While Wi-Fi appears a good choice due to its decent range and the fact that it contains proper protocols at all levels of the software stack. Wi-Fi demands high-power, rending a system based on purely battery-powered Wi-Fi devices infeasible. Therefore, another object of the system described herein is to improve power consumption of BLEATS system and the devices thereof.

Since communication in a BLEATS described herein is wireless, the system can be configured and controlled remotely and it could configure itself dynamically through self-discovery. There is no need for physical wiring to install and re-arrange. Thus, another object of the invention is to diminish the need for mechanical parts in asset management systems thus making such systems easier to manage.

While many different sorts of prior art devices exist, they all have disparate means of communication. Embodiments of the system disclosed herein uses TCP/IP for all communication above the MAC layer. Thus, another object of the system disclosed herein is to unify and simplify all communication thereby streamlining operation of the system.

A BLEATS system according to the methods and systems disclosed herein may behave similarly whether it currently registers ten reader nodes (discussed more fully below) or one million. This is because the operators can increase the number of cloud servers, even while the system is active. Thus, another object of the invention is to increase the scalability of asset management systems, including offering scalability during operation.

A BLEATS of the type described herein is flexible enough to adapt to future needs. If there is a new device that needs to be supported, then the operators simply add the code for that support into the cloud servers.

A BLEATS system as described herein may be fault-sensing and fault-tolerant at many levels. Thus for example if any device of the system fails, other devices compensate and pick up its work inasmuch as possible. Thus, another object of the system described herein is to improve operational efficiency, security, and redundancy.

The above and other object of the system described herein will be apparent to one skilled in the art upon reviewing this disclosure.

BRIEF DESCRIPTION OF THE DRAWINGS

The above and other features and advantages of this disclosure will be more readily apparent from a reading of the following detailed description of various aspects of the disclosure taken in conjunction with the accompanying drawings, in which:

FIG. 11 depicts a "self-deregistration" event for a leaf node.

DETAILED DESCRIPTION

Figure 1:
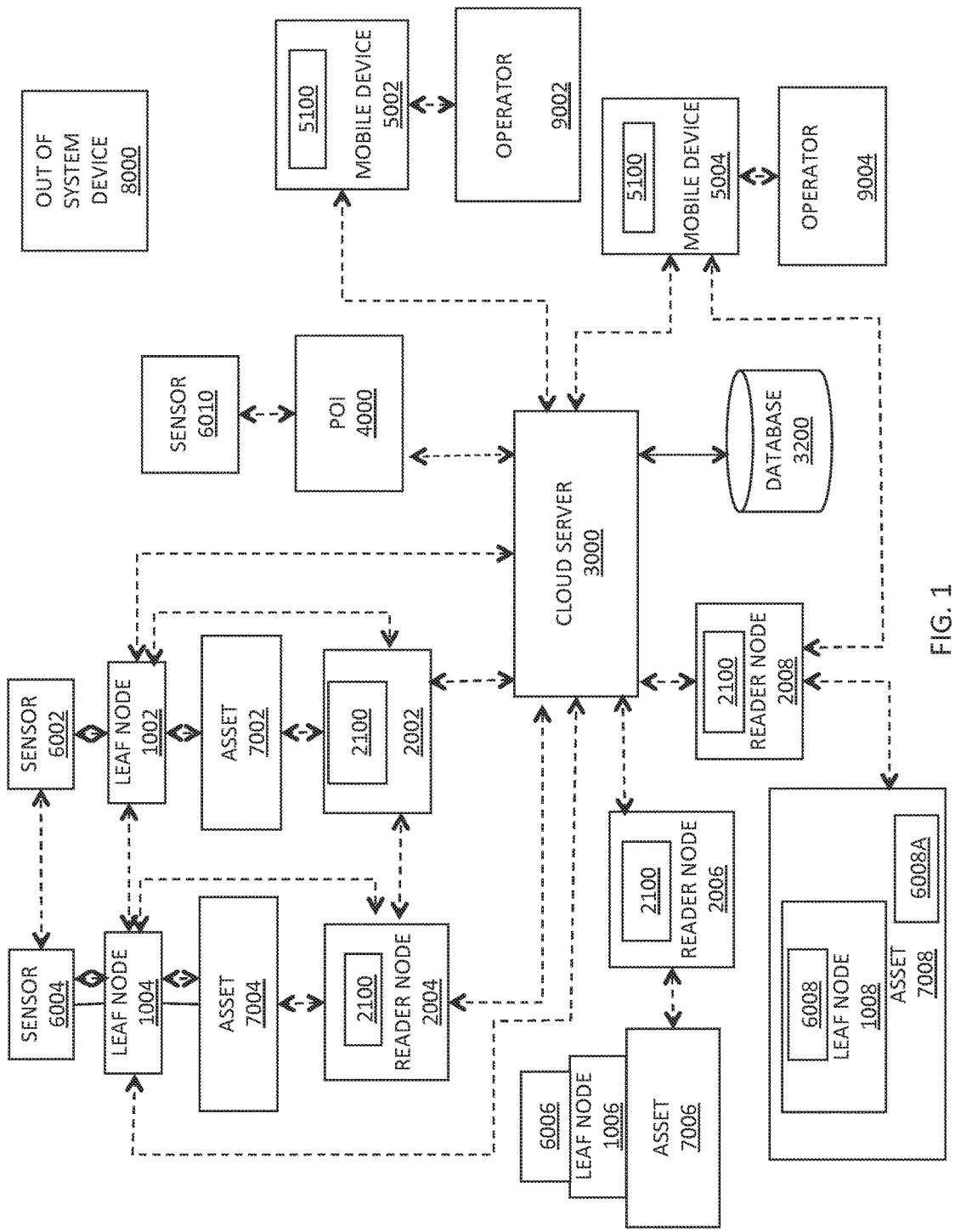
FIG. 1 depicts a schematic for a system for asset location and tracking.

Methods and systems disclosed herein include methods and systems for real time location. The term "real time," as used herein, should be understood, except where context indicates otherwise, to refer to events happening concurrently or simultaneously, or happening closely in time, such as in near real time, such as to the level of sub-seconds to seconds resolution.

Methods and systems disclosed herein include methods and systems for managing information relating to one or more leaf nodes. References to managing information, collecting information, processing information, presenting information, or the like relating to a leaf node throughout this disclosure should be understood to encompass, except where context indicates otherwise, information about the location of a leaf node, information about the direction, velocity, acceleration, or other motion of a leaf node, location-related events relating to a leaf node (such as the leaf node crossing a boundary or entering a zone), information about other events of a leaf node (such as turning on or off, waking up, going to sleep, and the like), information about states of a leaf node (such as power status, battery status, quality of data connection, schedule status, and the like), and data collected by or from or transmitted by the leaf node (such as advertisement packets, data from sensors associated with the leaf node, or the like). A leaf node may also be referred to as a "tag," a "leaf sense tag," or "LST".

References throughout this disclosure and the claims to a "processing engine," a "location processing engine," a "processing pipeline," a "cloud processing engine," a "server-based processing engine," a "cloud-based processing engine," a "cloud location engine," and "location engine" and "cloud server" are synonymous with one another and should be understood to encompass one or more data processing or storage modules, applications, components, services, resources, and the like that may be disposed in a cloud computing or similar environment, with one or more servers, for processing data collected from, or about, one or more devices of the system including leaf nodes, or data processed by, collected from, transmitted by or collected about one or more devices of the system including gateway nodes, such as for determining locations of one or more devices of the system including leaf nodes, determining or processing events relating to one or more devices of the system including leaf nodes, managing or processing information about a device of the system including leaf nodes, or the like, and references to any of the foregoing should be understood, except where context indicates otherwise, to encompass any of them.

References throughout this disclosure to a "gateway node," a "receiver," a "receiver node," a "gateway," a "leaf node reader gateway," an "LNRG," a "gateway device," a "reader node," a "reader," or the like should be understood to encompass a device that collects, processes, manages, or transmits data collected from or about one or more leaf nodes and optionally handles the exchange of data with one or more other gateway nodes and/or with one or more cloud resources, such as a cloud processing engine, and references to any of the foregoing should be understood to encompass the others, except where context indicates otherwise. References to a "beam forming receiver node," a "beam forming hardware node," a "sectorized receiver node," and the like should be understood to encompass certain embodiments of such a gateway node that involve formation of defined sectors around the gateway node, such as by directing beams of one or more antennas to those sectors.

References throughout this disclosure to an "asset," should be understood to encompass, except where context indicates otherwise, the various types of assets that may be managed, tracked and the like, such as by or for an enterprise, such as human assets (such as workers who complete various workflows of an enterprise) and other physical assets (such as inventory assets, manufacturing assets (e.g., tools, equipment, components, sub-components, materials and the like), product assets, and the like). Any of the devices in the system herein described are capable of BLE communication and may also be referred to as a BLE device.

FIG. 1 shows the devices and relationship of the devices of the system. Embodiments include all combination of devices herein described and all devices are not required in all embodiments described herein and aspects of each device, themselves comprising embodiments, will be more fully described herein. Further, while many of the embodiments and the devices thereof may be described in the context of a BLEATS, it will be understood by the skilled artisan that the all embodiments, including embodiments of the devices herein described, are not required to be part of a BLEATS in all embodiments.

In FIG. 1 all dotted two-way arrows indicate communication between or among relevant devices. For readability of the figure, not all communication pathways are shown. The absence of a dotted line between two components does not indicate the inability of the components to communicate with one another. Embodiments may comprise a plurality of leaf nodes, several shown herein as 1002, 1004, 1006, and 1008. References to a "leaf node," a "leaf sense tag," an "LST," a "tag," or a "leaf node device" throughout this disclosure and the claims are synonymous with one another and may encompass various forms of devices, tags (e.g., asset tags), sensor-enabled devices, sensors, or the like that may be disposed in various environments and that are managed according to the methods and systems disclosed herein, such as for asset location, data collection, data storage, asset tracking, or the like, and references throughout this disclosure to any of the foregoing should be understood to encompass any such items except where context indicates otherwise.

In embodiments, the leaf nodes collectively referred to as 1000, monitor and communicate information, which in embodiments is real-time communication, regarding assets 7002, 7004, 7006, and 7008, collectively referred to as 7000 and thus are secured to or are in proximity to assets 7000. An asset may be anything object to be monitored in a BLEATS or monitor and control system. Examples would include any object in an industrial, manufacturing, or logistical workflow. Assets may be people wearing or in proximity to a leaf node. Some types of assets will be described in connection below in connection with illustrations of BLEATS and the other monitor and control systems described herein. There are various configurations of leaf nodes in relation to assets. The leaf nodes 1000 are either in the same area as and in communication with the asset as shown by leaf node 1002 and asset 7002, have some sort of physical connection to the asset while remaining in the assets area as shown by leaf node 1004 and asset 7004, are affixed or otherwise mounted to the asset as shown by leaf node 1006 and asset 7006, or are within the asset, for example, within a shipping container or palate, as shown by leaf node 1008 and asset 7008.

Sensors 6002, 6004, 6006, 6008, and 6010 collectively referred to as 6000 are in communication with the leaf nodes. There are various configurations possible. In embodiments, the sensor is in proximity to and in communication with the leaf node as shown by sensor 6002 and leaf node 1002. Another embodiment is shown with sensor 6004, which is physically connected to leaf node 1004. Another embodiment is shown with sensor 6006, which is affixed to or otherwise mounted to leaf node 1006. Another embodiment is shown by sensor 6008, which is within leaf node 1008. Another embodiment is shown by sensor 6008a, which is within asset 7008 and in communication with leaf node 1008. The preceding are non-limiting illustrations and the skilled artisan will appreciate that sensors 6000 can be placed in a variety of locations and can exist in multiple configurations with respect to the leaf nodes and, in various embodiments, they communicate via BLE or other methods with leaf nodes 1000 and detect information indicative of the asset, such information which will be discussed more fully below.

Reader nodes are shown as 2002, 2004, 2006, and 2008 and are collectively referred to herein as 2000. In embodiments, communication between the leaf nodes 1000 and the reader notes 2000 is via BLE protocols or other methods or protocols.

In embodiments, the system may comprise at least one POI 4002, 4004 collectively referred to herein as 4000. In embodiments, POIs are reader nodes. POIs communicate with each other and leaf nodes 1000 and other reader nodes 2000 via BLE and other protocols.

As mentioned above, leaf nodes 1000 may communicate directly with reader nodes 2000, via BLE protocols or other methods or protocols, as shown by the dotted line connecting leaf nodes 1002 and 2002. Also, leaf nodes 1000 may communicate directly with other leaf nodes 1000 via BLE protocols or other methods or protocols, as shown by the dotted line connecting leaf nodes 1002 and 1004. Reader 2000 nodes may communicate directly with other reader nodes 2000 via BLE protocols and other methods or protocols as shown by the dotted line connecting 2002 with 2004. Thus, data exchange in the system described herein has various paths, both direct and indirect, (as will become even more fully appreciated below). Regarding reader-node-toreader node communication, reader nodes may communicate with each other using a variety of protocols, including but not limited to: 802.11, 802.3, BLE. In embodiments, such inter-reader node communication is heterogeneous, for example, it may be that one reader node communicates with a second reader node via 802.3, and that second reader node communicates with a third reader node via BLE.

Adding, among other things, to the various communication pathways described above is at least one cloud server 3000. While only one cloud server 3000 is shown, it is to be understood that the system may comprise multiple servers, which may be located in a single cloud or in a plurality of clouds, which may be located on public cloud computing infrastructure (e.g., Amazon®), private cloud computing infrastructure, or a combination of those. "Cloud server" as used herein means "at least one server" except where context specifically indicates otherwise. Cloud server(s) 3000 comprises or accesses database 3200. Database 3200 may contain a wide range of information about the components of the methods and systems disclosed herein, the data collected by or about them, or relevant data from other systems, applications, or processes. For example, database 3200 may contain the unique identifiers and locations of devices of the system, status information from or about any of them, and information collected by or about them, including sensor information. Database 3200 may in particular catalog information about the leaf nodes 1000 and reader nodes 2000. The database 3200 may be a unified database, or it may comprise a distributed collection of various data storage resources, such as on-device memory, file system storage, server-based storage, disk-attached storage, network storage, or a plurality of linked databases, among others. The cloud server 3000 may communicate with (a) other cloud servers, (b) the reader nodes 2000, (c) operators 9002, 9004 (collectively referred to as 9000), (d) leaf nodes 1000, and (e) POIs 4000, such as via Internet or other networking protocols. Cloud server 3000, being able to communicate with the various devices of the system, may thus be an intermediate node in the communication pathway between any other devices described herein (including other cloud servers 3000). For example, leaf node 1002 may send data via BLE directly to reader node 2002, which in turn communicates the data to cloud server 3000, and cloud server 3000 may send the data to another reader node 2006 or leaf node 1006 which can be used, for example, to control the operation thereof. This operational pathway and exchange of data is allowed to occur in this example even though leaf node 1002 may not, in some instances, be in direct communication with leaf node 1006 or reader node 2006. In embodiments, reader nodes may accrue data from multiple LSTs into a single message and processes it locally as much as possible before sending it to a cloud server. As mentioned herein, reader nodes may use Internet protocol across the Internet to other cloud servers. The leaf nodes, after some processing, may upload various data to the reader nodes, which after some local processing may push this data to the cloud servers. Operators may query the cloud servers for various data, which the cloud servers have accrued from the reader nodes.

As discussed above the reader nodes 2000 may connect via an Internet protocol across the Internet to the cloud server(s) 3000. In embodiments, the leaf nodes 1000, after some processing, communicate various data to the reader nodes 2000, which after some local processing push this data to the cloud servers. Operators 9000 may query the cloud servers 3000 for various data, which the cloud servers have accrued from the reader nodes 2000.

The system effectively enables users accessing the Internet through computers or mobile devices to communicate, through the cloud servers and gateways, with the leaf devices. The leaf devices connect to physical objects or locations and contain various sensors, which allow them to monitor local information, which users can now access; and in some cases take local action, which users can now direct.

With respect to the interaction with the operators, the cloud server's interaction with operators may be via mobile devices 5002, 5004 (collectively 5000) running application 5100. In embodiments, reader nodes 2000 may communicate directly with mobile devices 5002, 5004 via BLE, Internet protocols, or some other means and, similarly, leaf nodes 1000 may communicate directly with mobile devices 5002, 5004, thereby providing operators with direct access to relevant devices of the system. Mobile devices may include any type of computing or input device including, desktop computers, laptops, PCs, tablets, smartphones, and the like.

Another category of devices such as barcode readers, passive RFID readers and the like, herein referred to as "out-of-system" ("OOS devices"), are represented in FIG. 1 as 8000. OOS devices may communicate with any device of the system described herein via any protocol described herein, and any other available method or protocol as applicable. In embodiments, the leaf nodes 1000 are able to send messages (sometime unsolicited) to OOS devices 8000. In an illustrative and non-limiting example, a barcode reader may provide a sequence number of an asset, which may provide additional information and allow the system to link the specific asset with that location.

While many of the elements described in FIG. 1 and herein are shown in a one-to-one correspondence, such as one leaf node for each reader node, this is not a requirement for the system. For example, it may be the case that a system comprises five leaf nodes communicating with two reader nodes.

Also all references to "communicate" including any roots, nominalizations, and conjugations thereof are meant to encompass two-way communication. The communication may be direct or indirect via an intermediate device, such as for example, cloud server 3000. Further, for ease of viewing all possible communication pathways, shown in FIG. 1 via dotted lines for some instance, are not shown. A lack of a dotted line between two devices on FIG. 1 does not indicate any lack of ability to communicate between devices, as the above discussion makes clear.

Returning to the leaf nodes 1000, the leaf nodes 1000 are BLE enabled in embodiments. In embodiments, the leaf nodes 1000 are battery-powered or electricity-grid-powered. In embodiments, leaf nodes 1000 contain at least one processing unit. In embodiments, a leaf node may include a microcontroller and embedded software that allows the leaf node to operate independently of outside control. In embodiments, a leaf node 1000 may include a sensor, or optionally multiple sensors of different types noted throughout this disclosure, which may be connected to the microcontroller, such as by the GPIO (general purpose input/output capability) of the microcontroller, by serial peripheral interface (SPI), or by inter-IC bus (I2C), a System management Bus with a master/slave type protocol topology, and one or more batteries. A leaf node 1000 may also have a memory, such as for programming code for the leaf node 1000, or for data logging, such as logging inputs from various sensors, logging operating parameters and history, or the like. Leaf nodes 1000 may exist outside of a system described herein, such as a BLEATS, or be may be transient in the BLEATS.

This is because embodiments herein such as the BLEATS described herein detects advertisements of leaf nodes 1000 and may integrate them into the BLEATS itself, aspects of which will be more fully described below. The skilled artisan will appreciate that in BLE there are 40 channels, 0 through 39, which exist in spectrally different frequency region of the 2.4 GHz band that is 83.5 MHz wide ISM band. Channels 37, 38 and 39 are advertisement channels, and the other channels are data channels. Thus, leaf nodes 1000 (as with any device of the system) may function without being explicitly deployed as part of the BLEATS. Leaf nodes may be associated an asset(s) or otherwise identified by the asset(s) it monitors and/or with which it communicates. Every message propagated in the BLEATS system has a unique 128-bit identifier msg_id, whether the message originates from a leaf node, a reader node or a cloud server. This includes the 64-bit device ID of the device that originated the message and a 64-bit unique timestamp. In embodiments, messages that lack the msg_id may be invalid and may be discarded as such.

As mentioned above, leaf nodes may communicate, either via a physical connection or a wireless connection (including BLE) with sensors 6000. Sensors are within, in proximity to, or are secured or otherwise applied to an asset 7000 to detect conditions of, conditions surrounding, or conditions affecting the asset 7000. Sensors 6000 may detect such conditions as temperature, humidity, light, sound, wind, electric field, magnetic field, movement, pressure, weight, presence of smoke, presence of particular molecules or chemicals, presence of radioactivity, presence of contamination, presence of biological materials, and the like. As such, sensors may be thermistors, capacitive sensors, piezoelectric sensors, optical sensors, microphones, weather sensors (including barometers, wind sensors, temperature sensors, humidity sensors and the like), chemical sensors, MEMs-based sensors, gyroscopic sensors, magnetic sensors, biological sensors, pressure sensors, transducers, acoustic sensors, radioactivity sensors, acidity sensors, and accelerometers, among others. Location can also be sensed by methods disclosed herein as well as via GPS, each of which may be referred to herein as a location sensor.

A reader node 2000 may include a microcontroller unit, or MCU 2100, with associated memory and data storage. The reader node may include beam forming elements such as multiple BLE physical radios or a single radio (e.g.: an nRF51822 from Nordic Semiconductor) for communication with one or more leaf nodes 1000. For communication with the cloud server 3000, the reader node 2000 may include one or more of an Ethernet interface (e.g. a Gigabit Ethernet interface with PoE (Power over Ethernet connected to the MCU 2100 with an USB interface), a WiFi client, and the like. In embodiments, the MCU 2100 is a digital programmable automaton that runs an embedded software system, such that the MCU 2100 operates automatically and independently of operator control, according to a programmed set of rules, in response to inputs collected by the MCU 2100. This automaton may contain a plurality of microcontrollers, and various forms of memory including SRAM, DRAM, uSD, and SSD. These digital and software elements are, except as otherwise specified, off-the-shelf, and well-known and well-understood in the art. The MCU 2100 controls the physical components of the reader nodes 2000 (such as components for beam forming, for sending and receiving signals, for handling power, and the like) through various electrical components, such as digital-analog converters, referred to as DACs. In embodiments, when a reader node 2000 establishes communication with at least one cloud server 3000 the cloud server directs the reader node 2000 to take action or to provide the cloud server 3000 with data. Based on its configuration, which will be more fully described in connection with various embodiments disclosed herein, a reader node 2000 may send notifications to a cloud server 3000.

Referring back to FIG. 1, operators may interact with the system via an application 5100 running on a mobile device. It should be noted, however, there are different layers within the system and different types of interaction that can be undertaken with the system and among the components of the system, such as interactions at the physical layer (e.g., bit-level wireless data transmissions between LNRGs and LSTs), interactions at the data link layer (e.g., media access control layer interactions and logical link control layer interactions), higher level network and transport layer interactions (such as involving use of the conventional TCP/IP stack), and presentation and application layer interactions. A significant advantage of the system is the available use of the conventional TCP/IP stack for communications above the physical and MAC layers of communication. The use of the TCP/IP stack in particular allows a wide range of conventional applications and systems to interact with the system in a standardized way. This standardizes the communications and management thereof, and leverages existing protocols, and the advantages of those protocols. Except where called out herein, it should be understood that the TCP/IP stack and the various network protocols supported by it may be employed in connection with the methods and systems disclosed herein.

In various embodiments, an application 5100 that uses or interacts with the system disclosed herein may be run or resident on various devices of the system, i.e., reader nodes 2000 deployed with the system, mobile devices 5000, and servers, such as cloud servers 3000, or it may run on external infrastructure and interoperate with the system. Applications 5100 may, in embodiments, include user interface elements that allow users to undertake a wide range of actions with respect to system components (such as the leaf nodes, reader nodes, cloud server, or server-based components), as well as with various data that is collected, processed, handled and reported by those devices. Users may, for example and without limitation, view one or more leaf nodes or groups of nodes, view locations of the leaf nodes, view data (e.g., sensor data) collected by leaf nodes, view nodes by their relationship or proximity to one or more reader nodes, and the like.

In embodiments, data from or about the components of the system may be provided through one or more application programming interfaces (APIs), such as provided in connection with one or more servers, one or more reader nodes, or one or more leaf nodes. Such APIs may, for example, allow developers to interact with the system or its components, such as to obtain data (such as location data with respect to leaf nodes or reader nodes, feeds of sensor data from leaf nodes, or the like) that is transmitted from the system or its components, to monitor processes undertaken within the system, to send instructions to the system or components thereof, or the like. For example, a developer of an application 5100 may use an API to program an application to pull data from a server of the system for use by an application, such as data about the current location of certain leaf nodes, such as to trigger a routine or process of the application when a particular leaf node arrives at a particular location (e.g., in proximity to a particular reader node). A wide range of APIs may be provided to allow interaction with the system and its components, such as ones for querying reader nodes or leaf nodes about location or other data, APIs for sending certain kinds of instructions to reader nodes or leaf nodes, APIs for managing aspects of the system or its components (e.g., managing power levels), and many others.

A wide range of applications may be supported by the system, with the needs of a particular application being served by accessing data (such as through APIs) that is handled by the various components of the system and with the user interfaces of such applications being configured to use or display the data in a manner suitable for the needs of the particular user. For example, an industrial workflow application, such as for managing an assembly line, may take a feed of data from the system indicating where certain assets (which are tagged with leaf sense tags) are currently located within a factory, and the application may handle the location data according to the needs of the user, such as by graphically displaying the locations of the assets to users on a display screen, by storing the locations in a database table, by triggering events within a process based on the locations, or the like.

In certain embodiments, an application 5100 may be used to control various system components, such as to instruct reader nodes or leaf nodes to undertake certain actions, to provide certain data, or the like. Such control may be undertaken by an operator within a user interface, such as displayed on a control screen or dashboard, or it may be undertaken using programmatic control, such as by providing instructions based on an event that is triggered by or within the system or by an external trigger. For example, an application might control a sensor on a leaf node, such as by indicating when the leaf node should undertake data collection with that sensor.

In embodiments, an operator 9000 may use an application layer (Layer-7) protocol to send various directives to the system, such as in connection with various BLEATS system embodiments described herein. In such embodiments, an operator 9000 can, for example, select some set of leaf nodes or reader nodes to which to promulgate a sequence of queries and directives. In embodiments this may be undertaken programmatically, using a programming language by which the operator may specify directives based on responses to queries. In embodiments, an application 5100 may support various application and end-user processes. For each specific application 5100, communication partners may be identified, quality of service may be identified, user authentication and privacy may be handled, and any data syntax requirements may be specified. Among other things, application layer programming may provide application services for file transfers, e-mail, and other network software services.

In embodiments, operator(s) 9000 accessing a BLEATS through a cloud server 3000 may use an HTML-encapsulated graphical user interface that allows the operator(s) to navigate quickly through all of the devices in the system that operator(s) have the privilege to access. Such an interface may allow such operator(s) 9000 to rapidly assess critical data, such as which devices are currently active, the locations of those devices, their battery lives, and the like.

In embodiments, operator(s) 9000 of the system may programmatically control the system, using a control language, such as a BLEATS Programmatic Control Language (BPCL). Such a language may allow such operator(s) to program the system to perform tasks, including but not limited to scheduling events, querying individual devices in the system, sending commands to individual devices in the system, sending commands to groups of devices in the system, taking action based on current data, and the like.

Examples of lines of pseudo-code for such a programmatic control language (in this case using PERL language code) are as follows:

```
&wait($hh_mm == 02_00);     // wait until 2AM
@all_items = &list_all_devices_in_system( );
@low_battery_items = grep { &battery($_) < 20.0; }@all_items;
&mail_operators(@low_battery_items);
```

These lines instruct the system to take various actions, such as waiting until 2:00 a.m., listing all devices in the system, listing low battery items, and mailing operators indications of low battery devices (i.e., ones with battery status below twenty percent power).

While the needs of a wide range of such applications can be configured at the application layer (Layer 7), taking advantage of the underlying use of a conventional TCP/IP Internet stack, interactions can be enabled at other layers of the networking stack, such as by providing direct physical layer connections to LSTs or LNRGs, by allowing interactions with data at the MAC layer, or by facilitating use of other layers in the conventional networking stack.

A significant advantage of the system is that communications layers the TCP/IP stack above the physical and MAC layers of communication. This standardizes the communications and management thereof, and leverages existing protocols, and the advantages of those protocols. Except where called out the TCP/IP stack and the network protocols it supports are industry standards and completely known and understood in the art.

In embodiments, the system is able to connect with a very large number of peripheral devices as compared to conventional Bluetooth platforms. To enable management of connections to those devices, a connection manager (also referred to herein as a "virtual connection manager" or "VCM") may handle the virtualization of connections to each of the devices. Before a connection is set up, the connection manager queries the cloud server to authenticate the connection. The Cloud server sends the authentication status and may also send the commands for operations to be performed by or with respect to the peripheral device. An operation could have a single command or a sequence of commands. Commands may be, for example, read and write commands to certain characteristics of peripherals and may be BLE specific. Commands may be communicated via messages. In embodiments, the messages may be transmitted in sequence. In embodiments, a command is contained in a single message.

Figure 2:
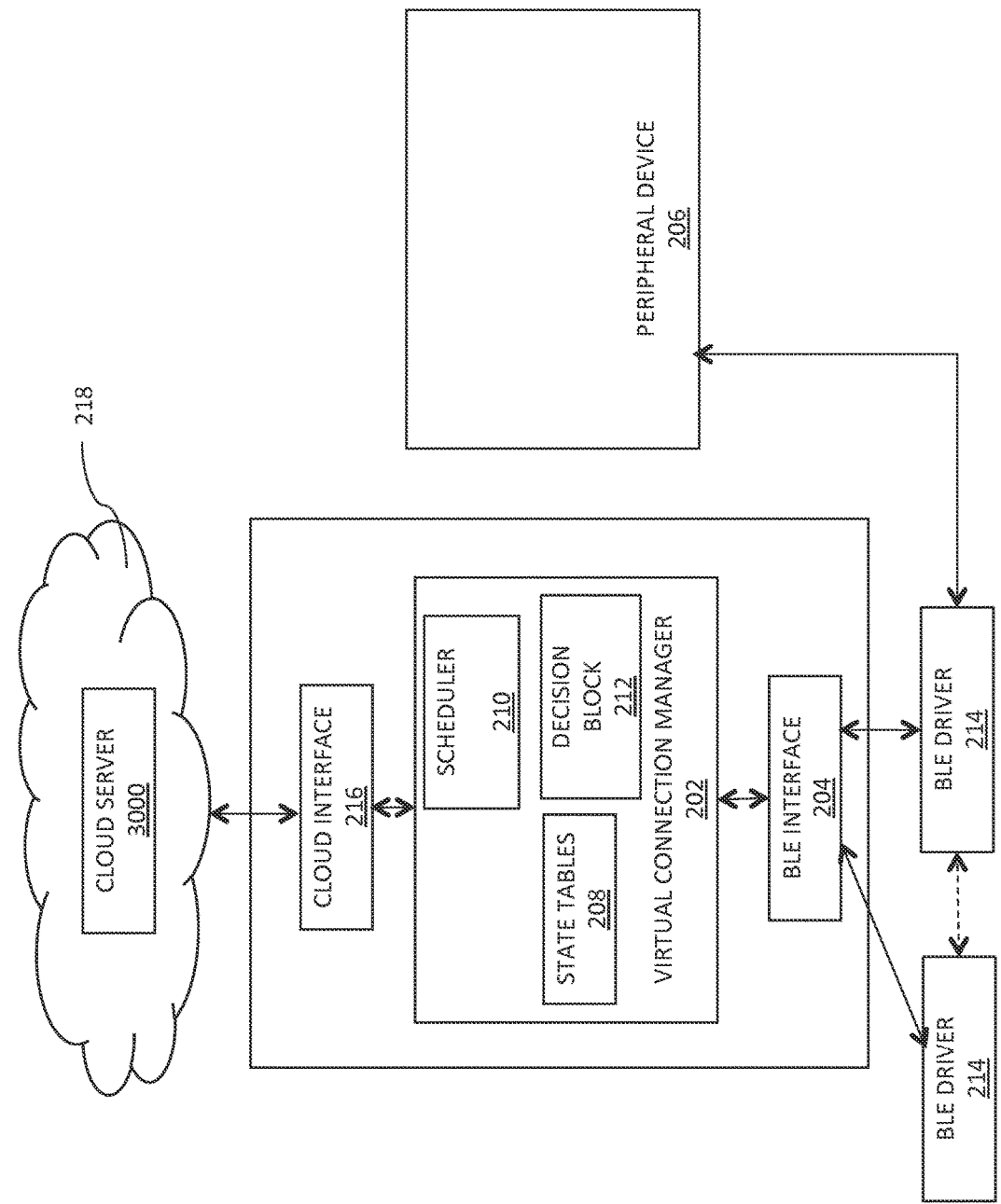
FIG. 2 depicts a more detailed schematic for a virtual connection manager.

As the connections are established, connection manager may use state tables to record of the state of each connection. Whether the peripheral device, such as a leaf node, is authenticated or not, the state of the device is registered in the state table. If a need to communicate with a peripheral device arises (FIG. 2), then the connection manager 202 may reach out to BLE interface module 204, which may try to check if there is a free physical connection resource (PCR). If there is a free PCR available, then the communication goes through, else, it is held in a backup state. Eventually, when a free PCR is available this backed up message to the peripheral device 206 is pushed through. If there are number of backed up messages are present, then the state holds the priority of service and gets pushed out based on the priority by the decision block 212 in conjunction with scheduler 210.

Each radio chip may concurrently connect with one or more peripherals, in embodiments up to 8 peripherals concurrently. An available concurrent connection may be referred to as a physical connection resource (PCR) or connection resource and is the physical BLE wireless/radio connection. The BLE Interface may keep track of the number of active connections and make this information available to VCM.

In an illustrative and non-limiting example, a VCM, with a total of 8 possible physical connection resources, may have a task of collecting pressure measurements from 12 peripherals (12 tasks in total). Initially there may be no peripherals connected to the VCM such that all of the 8 connection recourses are available. The VCM may start by establishing communication with 8 of the 12 peripherals to complete tasks 1 through 8. The 9th task (tasks 9 through 12 remain pending) will be waiting for the first of the 8 connection resources to complete its current connection and become available. As the pressure measurements are received from a peripheral, the connection resource may become available and may be used for the next text, such as connecting to the 9th peripheral.

A main task may be broken into multiple sub-tasks. A connection resource may be used for a sub-task and released. For example, in embodiments taking a temperature measurement may include the following sub-tasks: (a) initiate a temperature measurement; (b) allow a period of time to elapse; (c) read the measured temperature. In this example the VCM will use the connection resource to connect to the peripheral and send a command to start the temperature measurement. While waiting, the VCM may relinquish the resource by disconnecting from that peripheral. This would make that resource available for another task with another peripheral. At an appropriate time, the VCM may use a free connection resource to complete the pending task of reading the temperature by issuing a command to read the temperature from the first peripheral and then relinquishing the connection resource and disconnecting from peripheral.

The VCM 202 supports two type or modes of virtual connections to end nodes or peripheral devices 206. The first is a monitoring mode in which peripheral devices 206 are authenticated and registered with the cloud server 3000. The advertisement data from peripheral devices 206 is reported to the cloud server 3000 for tracking and location determination purposes. The second is an action mode in which the peripheral devices 206 are authenticated and registered with the cloud server 3000 and the VCM 202 performs a series of specific tasks on them like temperature sensing or battery read, etc.

The main components of VCM 202 are as follows: (a) State Tables 208—VCM 202 maintains the connection state of each peripheral device 206 in state tables 208. The state information includes information like the registration status of a peripheral device, its connection mode, a queue of events/commands for the peripheral, etc. Peripheral state changes are triggered by events and commands; (b) a Scheduler 210—VCM 202 implements a scheduler 210 to periodically inject commands that act on peripherals device 206; (c) a Decision Block 212—This implements the logic to initiate, maintain and terminate a large number of virtual connections over a limited set of available physical connections. It interacts with the BLE Interface 204 block to communicate with the BLE stack. It also interacts with the cloud interface 216 to access the cloud server 3000 located in the cloud 218; and (d) a BLE Interface Module 204—This module provides an abstraction of the BLE stack. Downstream it provides interfaces to one or more BLE drivers 214, which execute the BLE protocol. It maintains information about which peripheral devices 206 are reachable through which BLE driver 214. It also maintains the BLE connection resource information. This information includes current usage levels, information about resources that are free, etc. Typically the connection resources are time slots that are used by lower level BLE drivers 214 to maintain concurrent connections.

In embodiments, a virtual connection to a peripheral device 206 is established as soon as the peripheral device 206 comes into radio presence of a reader node. The virtual connection to the peripheral device 206 is terminated when the peripheral device goes out of range for a specified amount of time. The VCM 202 can support multiple connections over single or multiple radios.

The VCM 202 maintains the state of every peripheral device 206 in a state table. Events and commands for a peripheral trigger a state machine that would appropriately update the state of that peripheral in the state table. Typical events include advertisement reports from peripheral devices, responses from peripheral device to commands sent to them, timer expiration, etc. Commands may originate from the cloud server 3000 or may be generated locally as dictated by the cloud 218. Commands may be categorized as admin/management commands and 'action' commands that act on peripheral devices 206. Typical 'action' commands may be reading sensor information such as a temperature reading or reading a shock level from a sensor. Admin commands may be used to dictate to the VCM the specifics of handling a peripheral device, for example. Both events and commands may change the state of peripherals in the state tables 208. This is explained further with the aid of use cases noted below.

In one example, the VCM 202 gets advertisement reports from peripheral devices 206. It creates state table entries 208 for them and sends authentication/registration events to the cloud server 3000 using a cloud interface 216, such as messaging or Representational State Transfer (REST) protocols over TCP/IP connection on Ethernet or WiFi. The cloud server 3000 authenticates peripheral devices 206 and sends out registration commands for them. For those peripheral devices 206 that the cloud server 3000 does not want the VCM 202 to make virtual connections, it sends out commands to black list them. The VCM 202 acts on both types of commands to change the state of peripheral devices. For authenticated peripheral devices 206, the cloud server 3000 further specifies periodicity of advertisement report which the VCM 202 duly makes note of in its state tables 208. From then on, the VCM 202 reports advertisement data for authenticated peripheral devices 206 at the specified periodicity.

In a second scenario the event and command exchanges happen as in the first case noted above. For sensor peripherals (which in embodiments are sensors communicating directly or via a leaf node, leaf node-reader node combination, or a reader node), the cloud server 3000 sends an 'action' command that specifies how often a particular sensor information is needed. The VCM 202 processes the command and sets up the scheduler to locally inject sensor specific 'action' command, which basically triggers a change in state of the peripheral device 206 at the correct time instant. The decision block 212 acts on the state change and executes the logic to perform the correct peripheral operations as directed by the connection state.

As an example, the cloud server 3000 may direct the VCM 202 to read temperatures from 100 different sensor peripherals. The command from the cloud triggers changes in the connection state of the target sensor peripherals. The decision block 212 notices the changes and for each sensor peripheral changes the connection state to 'Waiting for Connection Resource'. It then executes the following sequence for each sensor peripheral in that state. First, it issues a command to BLE interface module to initiate connection. Next, it waits for events from the BLE Interface module 204.

If the BLE Interface module 204 has free connection resources to accommodate the request, it initiates a BLE connection using the appropriate BLE driver 214. If it has no free resources, it send a 'back off' message to the decision block 212. It also sends back any connection related events to the decision block 212. If the connection is successful at the BLE level, the decision block 212 moves the connection state of the sensor peripheral to 'Connection Established'.

For those peripheral devices 206 whose connection state is 'Connection Established', the decision block 212 initiates temperature read operations by issuing suitable command to the BLE Interface module 204. It waits for events, which will trigger further state changes. On the receipt of events, the decision block 212 does the following. First, if a successful read was indicated, it sends the temperature data for that sensor peripheral to the cloud 218. If a successful read was not indicated, it sends out an error report to the cloud 218. Then it initiates a connection termination.

On receipt of connection termination events, the decision block 212 goes through the process to schedule temperature read operations for sensor peripherals, which are in the 'waiting for connection resource' state.

In embodiments, an operator 9000 may a Layer-7 protocol to sends broader directives to the system including the BLEATS system embodiments described herein. This system has its own protocol layer above TCP or UDP. In such embodiments, an operator 9000 can select some set of leaf nodes or reader nodes to which to promulgate a sequence queries and directives. This provides for a programming language in that the operator may provide directives based on responses to queries. Note that in some embodiments the system uses the TCP protocol above the IP protocol. In other embodiments it uses the UDP protocol above the IP protocol. In some other embodiments it uses some other protocol over the IP protocol. In some embodiments system communication uses IP tunneling. In other embodiments it does not.

In embodiments, operator(s) 9000 accessing a BLEATS through a cloud server 3000 use a graphical user interface, such as an HTML-encapsulated graphical user interface that allows the operator(s) to navigate quickly through all of the devices in the system that operator(s) have the privilege to access. Such an interface allows such operator(s) 9000 to rapidly assess critical data, such as which devices are currently active, the locations of those devices, their battery lives, and the like, on a wide variety of devices that are HTML-enabled, such as browsers, mobile phones, tablets, and other common computing devices.

In embodiments, operator(s) 9000 of the system may programmatically control the system using a control language. Such a language allows such operator(s) to perform tasks including but not limited to schedule events, query individual devices in the system, send commands to individual devices in the system, send commands to groups of devices in the system, take action based on current data, and the like.

An example of such a programmatic control language is as follows:

```
&wait($hh_mm == 02_00);    // wait until 2AM
@all_items = &list_all_devices_in_system( );
@low_battery_items = grep { &battery($_) < 20.0; } @all_items;
&mail_operators(@low_battery_items);
```

This waits until 2 AM and then sends out a report of all devices in the system that have battery life of 20% or less.

In embodiments, the operators 9000 may promulgate various commands to the at least one cloud server 3000, which either use those commands locally or push them on to the reader nodes 2000. Also, the system itself may be programmed, i.e., with commands to execute in a given situation or based on certain conditions detected by the system. The commands mentioned above may include but are not limited to (a) queries for more specific data at either the cloud server 3000, the reader node 2000 or the leaf node 1000 level, (b) commands to collect different data at either the cloud server 3000, the reader node 2000 or the leaf node 1000 level, (c) instructions on how to process various data at either the cloud server 3000, the reader node 2000 or the leaf node 1000 level.

In embodiments, when a leaf node 1000 communicates with a reader node 2000 the reader node directs the leaf node to take action or to provide the leaf node data. Based on its programming leaf node 1000 may send an event notification to the reader node 2000 with which it is communicating or to other devices in the system. In embodiments, when particular events occur, the leaf nodes 1000 send event data to the reader nodes 2000. Also, in embodiments, when particular events occur the reader nodes 2000 send event data to the cloud servers 3000. The definitions of events and the thresholds for sending such data may be preprogrammed into the various devices or supplied by the operator 9000.

Some possible events will be more fully described herein; however, in general when a reader node 2002 sends a leaf node 1002 a request for data the leaf node 1002 responds with that data. When a reader node 2002 instructs the leaf node 1002 to run a programmed instruction the leaf node 1002 does so. A cloud server 3000 can request data from any reader node 2000. A cloud server 3000 can also instruct such a reader node 2000 to run programmatic instructions.

Having established the devices of the system and the various communication pathways, non-limiting operational scenarios and other aspect of the system will be described. As the skilled artisan will appreciate, there are currently two version of Internet Protocol (IP): IPv4 and a newer version called IPv6. IPv6 is an evolutionary upgrade to the Internet Protocol. A leaf node 1000 of the system disclosed herein may communicate through BLE protocols. However, in embodiments, not all leaf nodes 1000 have an IPv4 or IPv6 address natively. In embodiments of the BLEATS system, the system provides an IPv4 or an IPv6 address to leaf node 1000 in the following way. A leaf node 1000 registers through a reader node 2000 into the BLEATS system. A cloud server 3000 provisions the leaf node by associating the unique ID of that leaf node 1000 with a unique IPv4 or IPv6 address. After such provisioning, an operator or other devices of the system may access that leaf node 1000 by means of that IPv4 or IPv6 address. For instance, when a reader node 2000 receives a communication from a leaf node 1000 of interest, the reader node sends that communication to a cloud server 3000 along with the unique ID of the leaf node 1000. The cloud server associates the information for that leaf node 1000, as keyed by its unique ID, with the IPv4 or IPv6 address for that leaf node. When a device of the system or an operator queries, or otherwise wishes to communicate with and/or instruct a particular leaf node by its IPv4 or IPv6 address, the cloud server associates that request with that leaf node's unique ID and facilitates the communication. In this manner the system may allow for all devices under it to be accessed via a single IPv4 or IPv6 protocol, whether any given device natively supports that protocol or not.

Figure 3A:
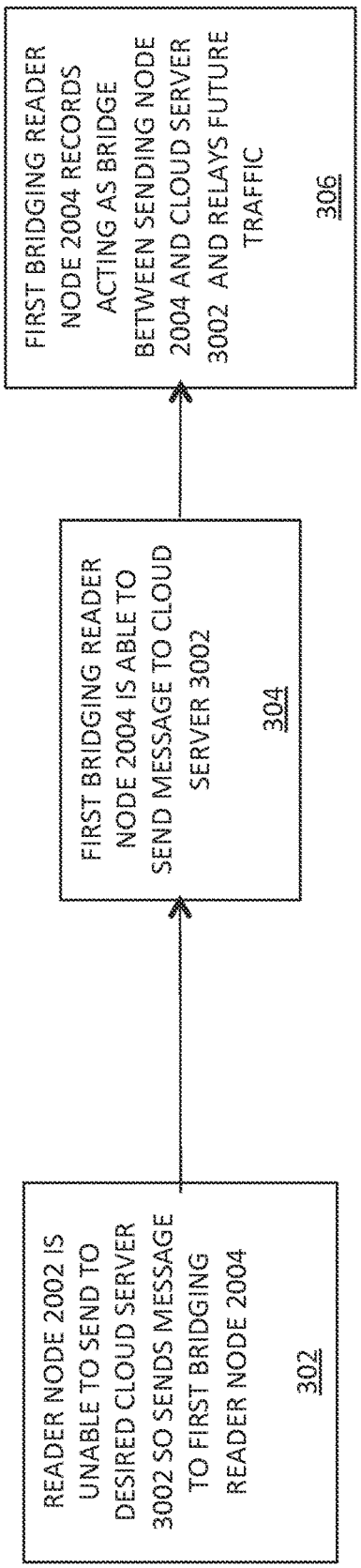
FIGS. 3A-3D depict various process flows for bridging nodes to support indirect connections with a cloud server.
Figure 3B:
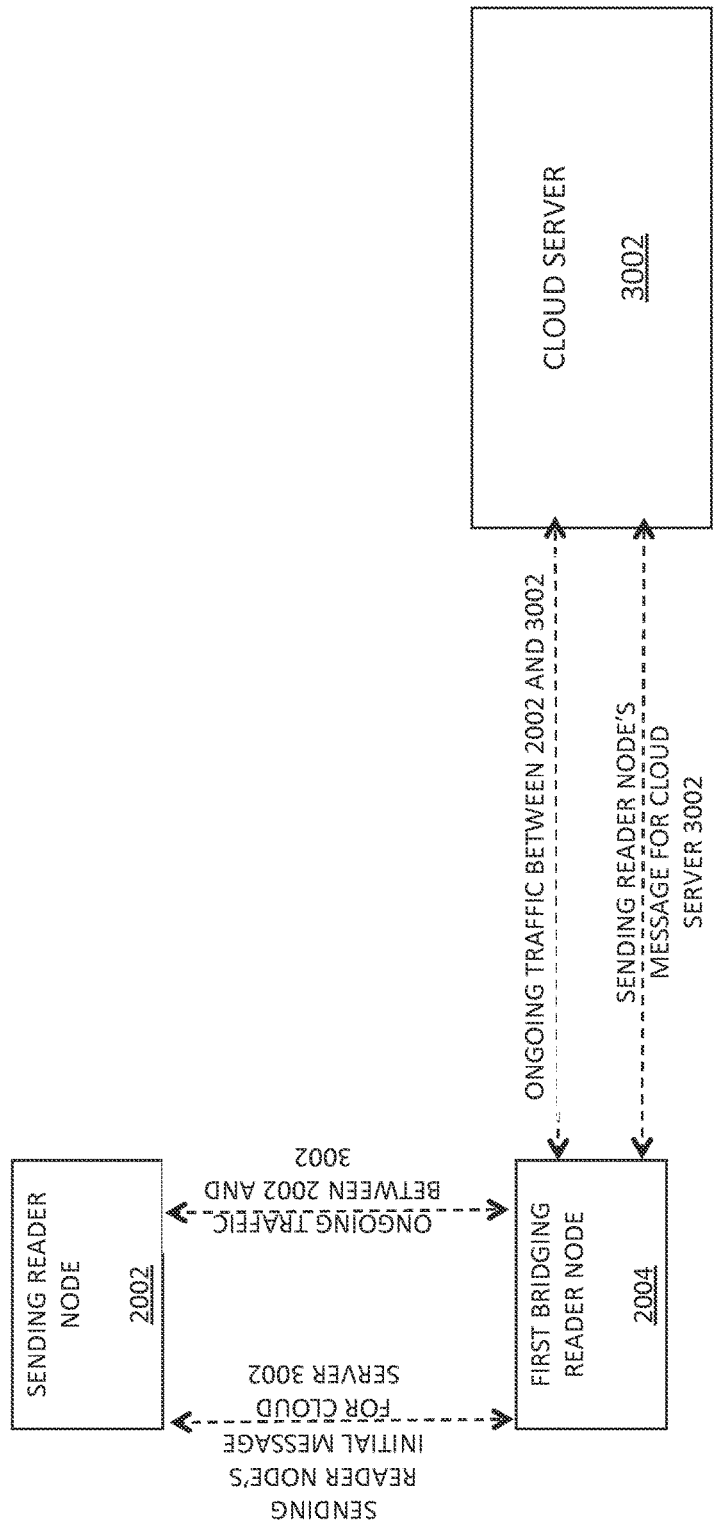

As described above, in embodiments, devices may communicate indirectly with one another and as such, in embodiments, a reader node 2000 may not communicate directly with a cloud server 3000. In an illustrative example, one reader node 2000 may bridge the connection of another reader node 2000 to the cloud, referred to herein as the first bridging reader node 2004. In an illustrative and non-limiting example, as shown in FIG. 3A-FIG. 3B, the sending reader node 2002 send a message to the first bridging reader node 2004 that specifies the sending reader node's 2002 target as cloud server 3002 (step 302). If the first bridging reader node 2004 is in direct communication with the desired cloud server 3002 and able to send the message, the first bridging reader node 2004 sends the message from the sending reader node 2002 to the desired cloud server 3002 (step 304). The first bridging reader node 2004 records data that it is acting as a bridge between the sending reader node 2002 and the cloud server 3002 such that in the future, when the first bridging reader node 2004 receives a message from the sending reader node 2002, it may forward that message to the same cloud server 3002 (step 306) and, alternately, when the first bridging reader node 2004 receives a message from the cloud server 3002 that is intended for the sending reader node 2002, the first bridging reader node 2004 may forward that message to the sending reader node 2002.

Figure 3C:
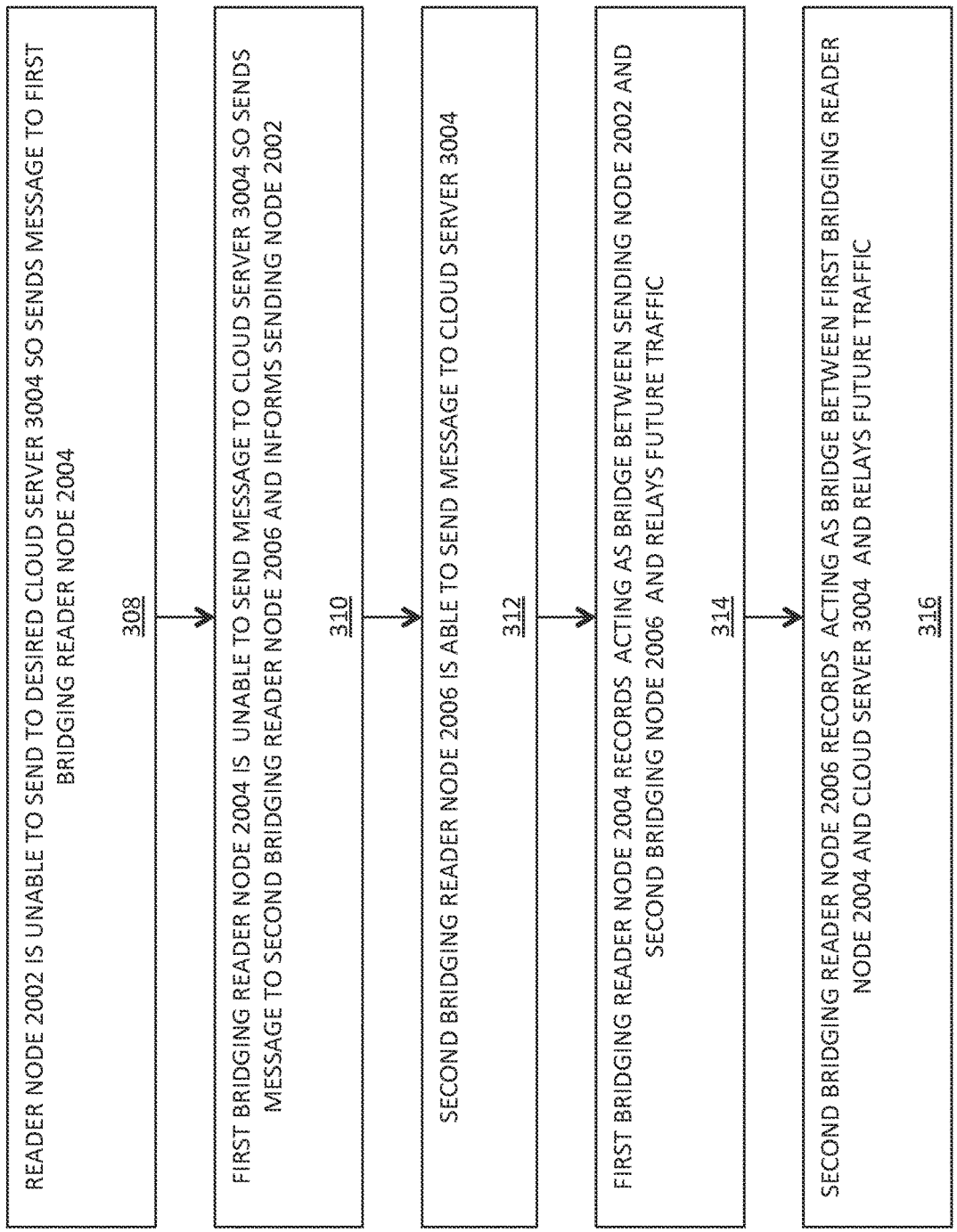
Figure 3D:
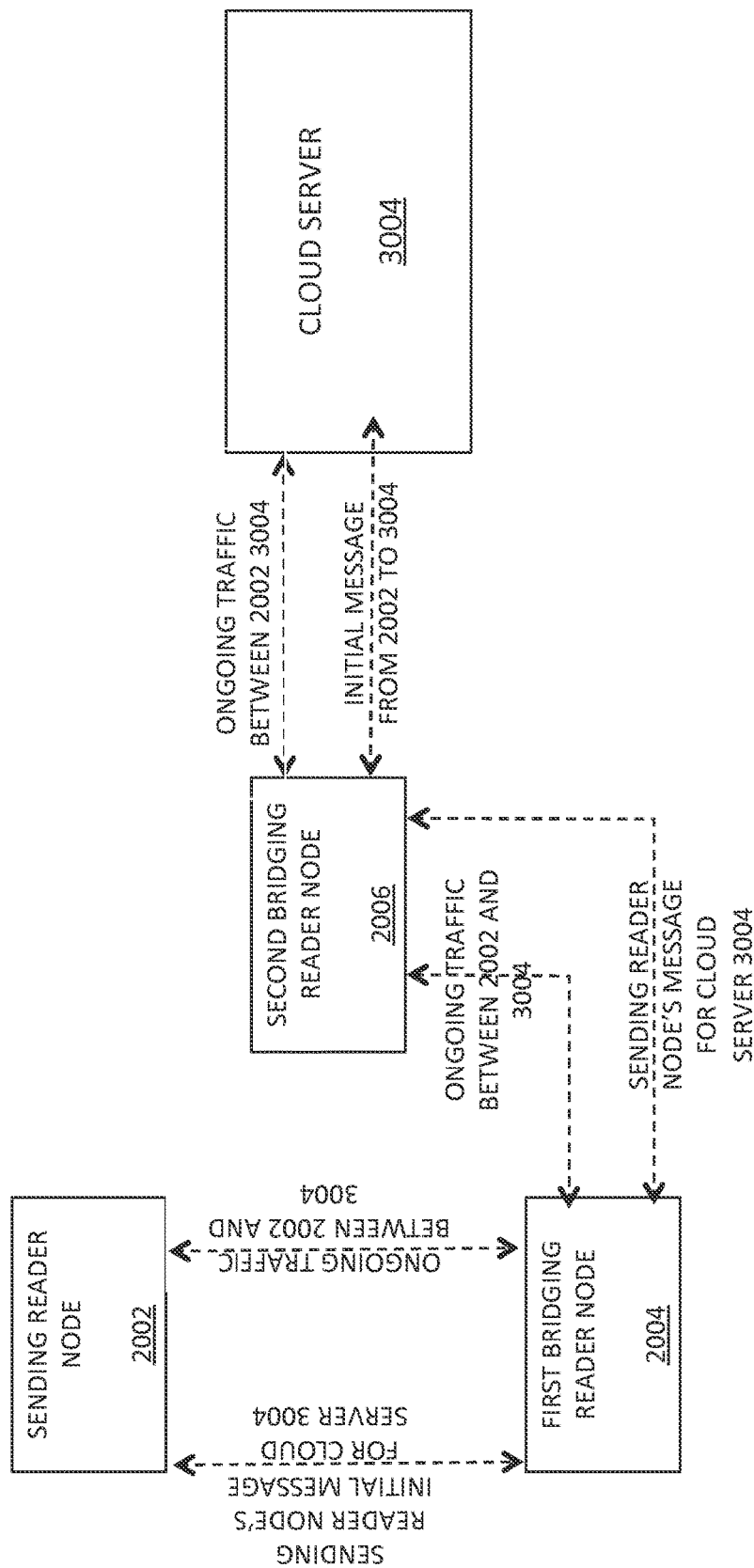

In other embodiments, as shown in the illustrative and non-limiting example of FIG. 3C-FIG. 3D, the sending reader node 2002 send a message to the first bridging reader node 2004 that specifies the sending reader node's 2002 target as cloud server 3004 (step 308). However, if the first bridging reader node 2004 is not in direct communication with the desired cloud server 3004, then the first bridging reader node 2004 returns a message to the sending reader node 2002 that conveys the information that the first bridging reader node 2004 (a) is not in direct communication with the desired cloud server 3004, and (b) that the first bridging reader node 2004 is using another reader node as a bridge, i.e., a second bridging reader node 2006 (step 310). If the second bridging reader node 2006 is in direct communication with the desired cloud server 3004 and able to send the message, the second bridging reader node 2006 sends the message from the sending reader node 2002 to the desired cloud server 3004 (step 312). The first bridging reader node 2004 then records that it is acting as a bridge between the sending reader node 2002 and the second bridging reader node 2006 and relays future traffic (step 314). The second bridging reader node 2006 then records that it is acting as a bridge between the first bridging node 2004 and the cloud server 3004 and relays future traffic (step 314). In embodiments, when the first bridging reader node 2004 receives a message from the sending reader node 2002 intended for the cloud server 3004, the first bridging reader node 2004 forwards the message to the second bridging reader node 2006. And when the first bridging reader node 2004 receives a message from the second bridging reader node 2006 with a message from the cloud server 3004 that is intended for the sending reader node 2002, the first bridging reader node 2004 forwards the message to the sending reader node 2002.

In embodiments, and as is evident, a reader node 2000 need not communicate with a cloud server 3000 directly. In fact, in some embodiments, a reader node 2000 may lack this ability. In the case where a reader node 2000 does not communicate directly with a cloud server 3000, it may relay its communication through a chain of reader nodes, where the last reader node in that chain communicates with a cloud server.

Reader nodes in communication with one another may use spanning tree algorithms to determine optimal communication paths between any two reader nodes and also between any reader node and a cloud server.

In embodiments, a reader node 2000 and a leaf node 1000 in communication with one another exchange microsecond-accurate timestamps to determine the delay between themselves in communication. This delay is used to synchronize their clocks or to otherwise account for the delay, primarily, by providing the leaf node 1000 and the reader node 2000 with allotted time windows where each should communicate with one another on any particular channel. The above allows the reader nodes, in embodiments, to listen for the respective leaf node at the optimal time on the optimal channel. Also, the system may provide a schedule of communications to a reader node from applicable leaf nodes such that the applicable leaf nodes do not to overlap in transmitting on the same channel at the same time.

To optimize communication pathways and conserve power, embodiments of the invention may limit the set of devices or device types with which a given reader node may communicate. In embodiments, a reader node may contain an access control list of devices with which it is permitted to communicate and if a device not on the list, then the reader node will not communicate with that device. Power conservation is a large concern. Devices, including leaf nodes and reader nodes, may run on batteries, in which case power conservation is critical. Even for those devices that are tied to the power grid, it is highly important to minimize power consumption, since this lowers cost and decreases environmental waste heat.

In embodiments, there may exist instructions regarding urgent or high-priority situations where a reader node may override the access control list and establish communication even if the device is not on the list.

Figure 4B:
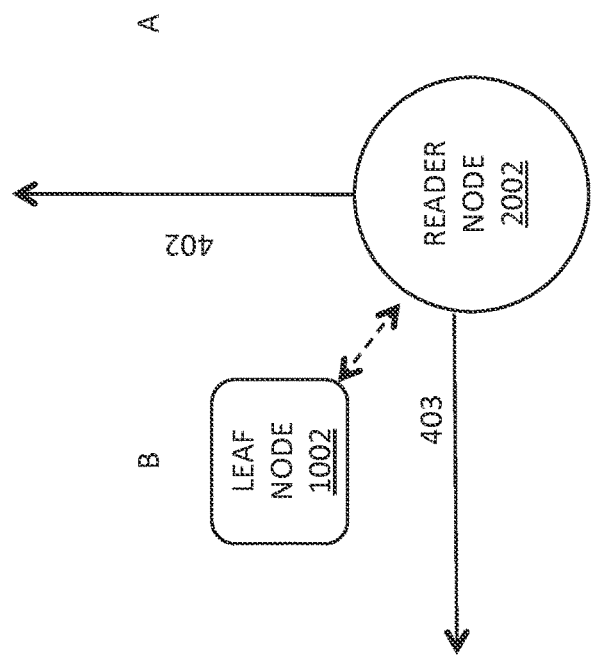
FIGS. 4A-4B depict embodiments of BLE sweeping.
Figure 4A:
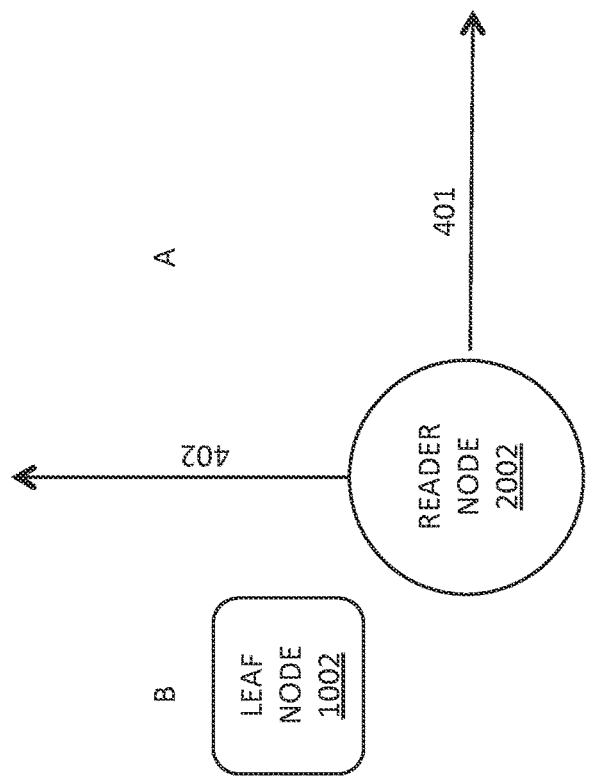

FIG. 4A shows an embodiment of BLE sweeping. In FIG. 4a, a reader node is in proximity to a leaf node 1002. The reader node directs its antenna energy at the region A between two rays 401, 402. Upon determining that the leaf node 1002 is not in region A as shown in FIG. 4B, the reader node 2002 directs its antenna energy at region B between rays (402, 403). Upon determining that the leaf node 1002 is in region B, which is done by receiving an advertisement from the leaf node 1002, the reader node 2002 establishes a connection to the leaf node 1002.

In a system according the embodiments described herein including BLEATS, knowledge of the precise locations of system devices, including leaf nodes 1000 and reader nodes 2000, may be important. In some cases positions may be determined by GPS devices within devices themselves, or by operators 9000 programming the location into the device. However, in some embodiments, a device may not be equipped with GPS capability or with other means to determine its position.

In embodiments, reader nodes 2000 are provided with an antenna structure, which may be a pyramidal or horn antenna structure. Being so equipped, a reader node 2000 may determine the location of a device, such as a leaf node 1000, in embodiments, based on the known radiation pattern of the antenna and the signal strength of the signal from a leaf node 1000. However, such antennas may not be not precise enough to determine the angle offset of the leaf node 1000 (or other device) from the reader node 2000.

Returning to FIG. 4B, the reader node 2002 may drive its combination of antenna elements in particular ways, causing a selected combination of amplitudes and phases at each specific element to produce a specific radiation pattern, which in embodiments, may result in beams and nulls in particular directions and optionally with specified polarization angles and/or types (linear, right circular, or left circular). In embodiments, when reader node 2002 directs its energy into sector A between rays 401 and 402, it does not see any other device. However, when reader node 2002 directs its energy into sector B between rays 402 and 403, it sees advertisements from leaf node 1002. It then knows that leaf node 1002 is in B and it directs its communication towards that sector when it attempts to communicate with reader node 1002.

Instructions within the system or promulgated in an application layer or by an operator can direct the antenna circuitry to shape this beam width to be between 0 and 360 degrees. The antenna(s) detect presence or absence via strength within patches of pattern, and both presence/absence and estimation of location by relative strength within multiple patches of pattern, either via multiple settings of a single transceiver/antenna array, or by combining information from multiple radios and antenna arrays. Taken together, this information provides precise angular information about the location of a node 1002 within the 360 degree angular sweep around the reader 2002, without requiring use of expensive RADAR technology.

It may be noted that narrowing the beam from an omnidirectional beam to narrow lobe can increase the range of communication for a particular antenna by a significant factor, such as up to at least 200 feet in one direction.

In embodiments, multiple BLE radios may be used in a reader node 2002, optionally each tuned to distinct BLE channels, such as the advertisement channels 37, 38 and 39. Also, multiple BLE radios may be used in connection with each beam or antenna array, so that each targeted angular sector (e.g., 5 degrees of the 360 angle around a reader node 2002) handle by a particular antenna or antenna array has a collection of multiple BLE radios that are used for communication with the leaf nodes that are located within that angular sector. The combination of angular sectorization and the use of multiple radios having spectral variation (i.e., using different communication channels), allows a single reader node 2002 to handle a multiplicity of leaf nodes 1002, and the aforementioned benefits of angular sectorization (namely, extended range and precise angular location) apply to communications by the multiple radios with leaf nodes located in a particular angular direction from the reader node 2002. To communicate with the radios of the reader node 2002, leaf nodes advertise their presence with specific authentication ID and credentials on these channels. When reader node 2002 receives data from leaf node it establishes a handshake with that leaf node on the applicable advertisement channel. Then the reader node hands off communication with that leaf node to a data channel, on the same radio on which communication was initially established or on a different physical radio.

Figure 5:
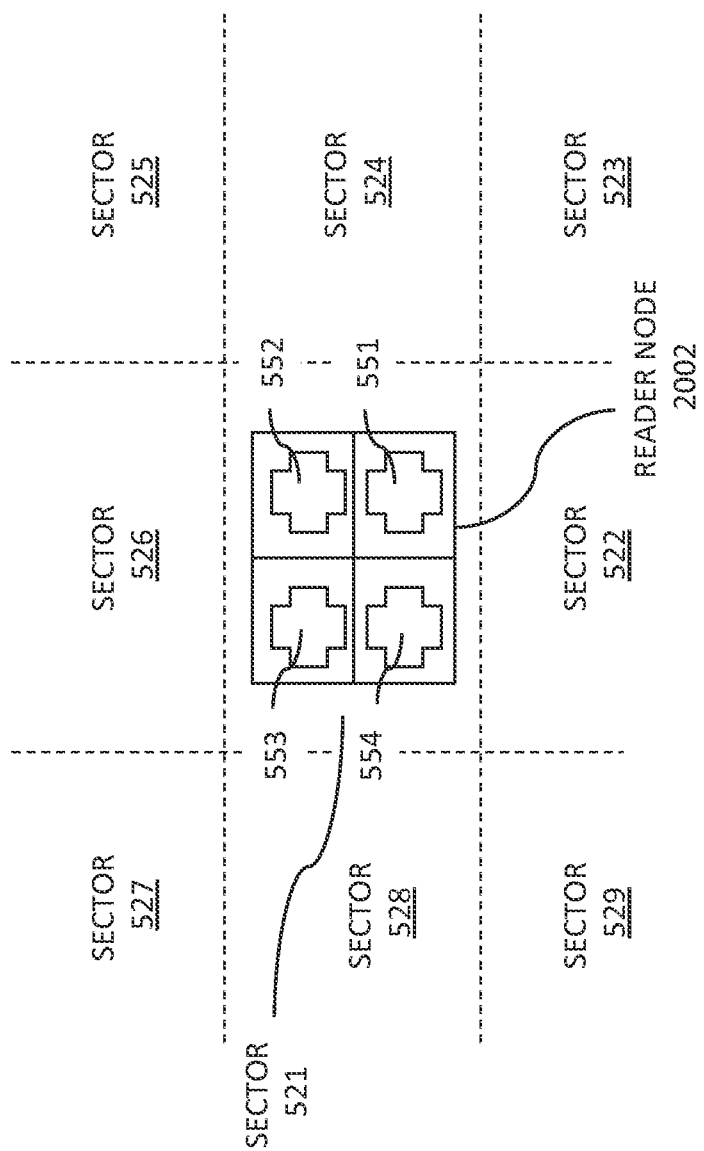
FIG. 5 depicts a reader node with multiple antennas.

FIG. 5 depicts an antenna setup of a reader node in embodiments. The reader node 2002 comprises four antenna arrays 551, 552, 553, 554. The area originating at the reader node 2002 is divided into multiple sectors, and for this illustration, nine sectors 521-529. Antenna array 551 directs its energy mostly in sector 523, 552 in sector 525, 553 in sector 527 and 554 in sector 529. 551 and 552 cover sectors 524, 552 and 553 cover sector 526, 553 and 554 cover sector 528, and 554 and 551 cover sector 522. All four arrays cover sector 521.

In embodiments, the antenna arrays function independently of one another and transmit and receive on potentially different frequency channels, as per the BL/BLE specifications. In embodiments, the antenna arrays may transmit or receive omnidirectionally. In omnidirectional embodiments, the antenna transmits and receives in all directions equally. However, since this method sends energy everywhere it uses significant power and may not be desirable for all circumstances.

In other embodiments, the antenna arrays may or transmit and receive BL/BLE signal in a particular direction or beam (as discussed herein), such beam forming being well known and well understood in the art. The hardware devices used are off-the-shelf elements of technologies including but not limited to: Gallium Arsenide High speed, RF SW or RF MEMs, and PIN diode network.

As shown in FIG. 5, 551 interacts with sector 523,552 with sector 525, and so on, both 551 and 552 with sector 524, and so on. Based on which antenna arrays receive a BLE signal from another device and the strengths of those signals, the reader node can deduce the direction and distance of that other device. For example, if the signal strength of a BLE node is known to decay over distance according to a known function (e.g., based on electromagnetic principles), then the strength detected at each array can be used to estimate the distance (absolute or relative) the signal has traveled from a particular node to each antenna. Having estimated distances of the node from two antenna locations, a set of possible intersection points that correspond to the distances can be established (e.g., two possible intersection points from a pair of antenna arrays), which can be disambiguated, such as based on known directional characteristics of the antennas themselves.

In embodiments, a single location for a leaf node may be determined with two reader nodes of known locations given a constrained travel path for the leaf node. Alternately, with three or more reader nodes of known locations, a single location for the leaf node may be determined using the following formula:

$$\text{RSSI (Signal strength measured at the reader in dBm)} = -10*n*\log 10(d) + A$$

where d is distance in meters from leaf node to reader node; and

A is the received signal strength in dBm at 1 meter (a reference signal); and n is the propagation constant or path-loss exponent. (Free space has n=2 for reference, while for indoor environments the value of "n" is estimated using measurements).

Therefore, the distance (in meters) from a single reader node to the leaf node may be estimated as:

$$d = 10^{(-(RSSI-A)/(10*n))}$$

Figure 6A:
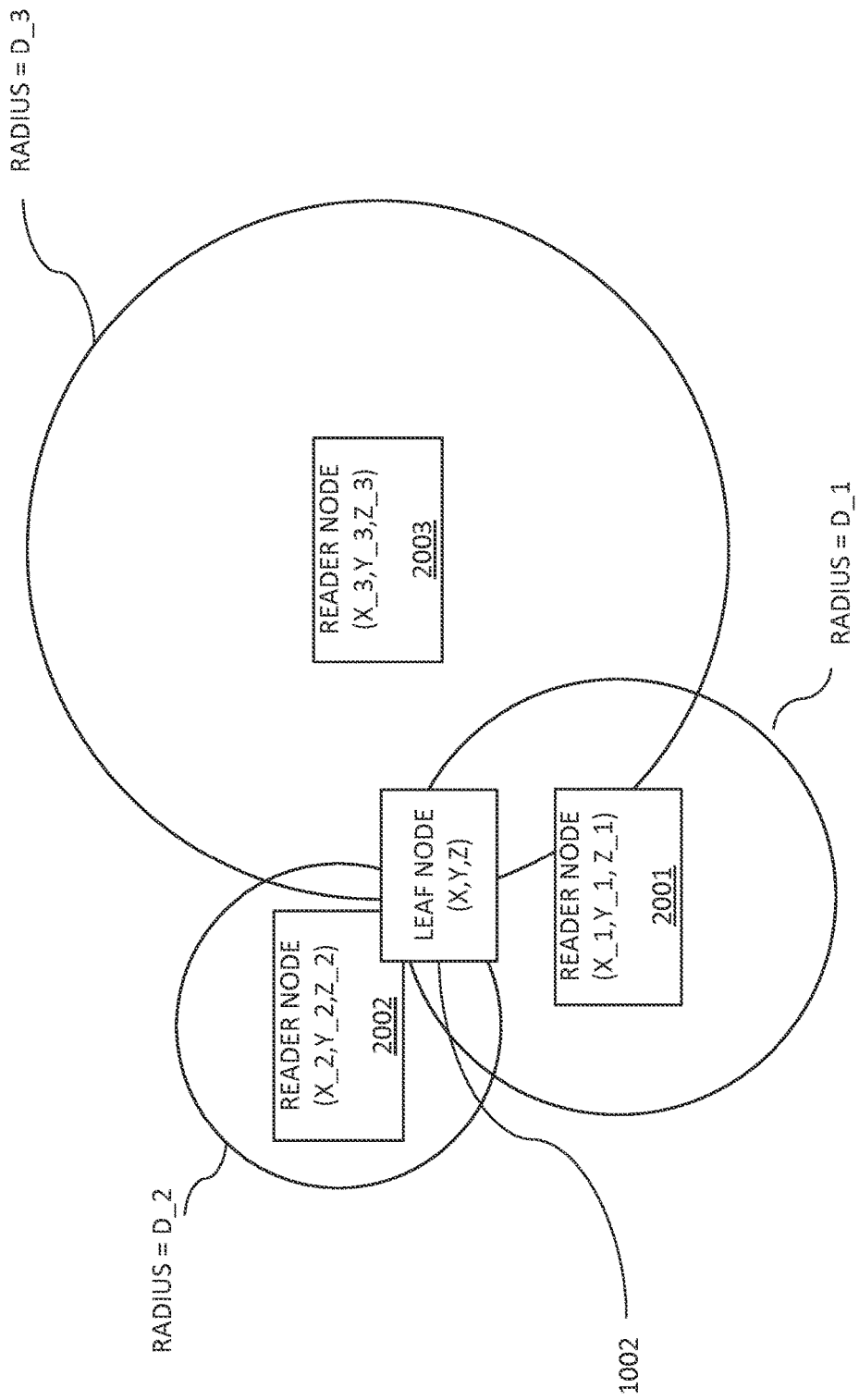
FIGS. 6A-6B depict embodiments showing triangulation to locate a leaf node.

The distance of the leaf node may be estimated with respect to more than one reader node (FIG. 6A) such that the estimated distances may be represented as $d\_1$, $d\_2$, $d\_3$, etc. Given known locations for each of the reader nodes 2001, 2002, 2003, such as $(x\_1, y\_1, z\_1)$, $(x\_2, y\_2, y\_2)$ and (x_3, y_3, z_3), the unknown location (x,y,z) of the leaf node 1002 may then be estimated by solving the following three equations:

$$d\_1^2 = (x\_1-x)^2 + (y\_1-y)^2 + (z\_1-z)^2$$

$$d\_2^2 = (x\_2-x)^2 + (y\_2-y)^2 + (z\_2-z)^2$$

$$d\_3^2 = (x\_3-x)^2 + (y\_3-y)^2 + (z\_3-z)^2$$

The values for (x,y,z) may be computed numerically using a variety of common mathematical techniques. In one non-limiting example, these computations may be carried out as follows:
  Convert the three sets of location coordinates to arrays representative of circles:
  P1=array([x_1, y_1, z_1])
  P2=array([x_2, y_2, z_2])
  P3=array([x_3, y_3, z_3])
  Transform coordinates to position the circle corresponding to array P1 at origin
  Further transform coordinates to position the circle corresponding to the array P2 on the x axis
  Solve the three equations to get the values of (x,y,z)

Figure 6B:
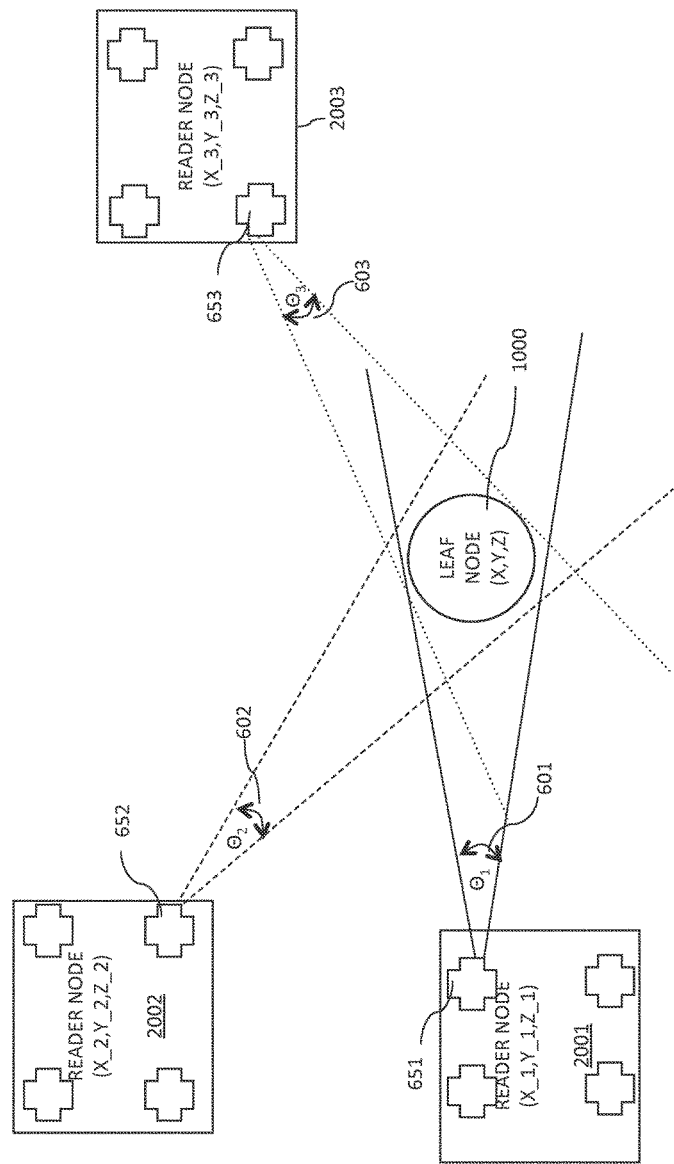

If directional antennas and/or antenna arrays are present the angle of arrival in an indoor environment may be used along with the estimated distances to compute the location (x,y,z) co-ordinates of the leaf node. The direction information reduces the error in the estimated distances especially in an indoor multi-path propagation environment. In the illustrative and non-limiting example of FIG. 6B, there are three reader nodes 2001 2002 2003, each having at least one directional antenna 651 652 653. The leaf node 1000 is located in the intersection of the fields of view 601 602 603 provided by the directional antennas 651 652 653 respectively. This area, defined by the intersecting fields of view 601 602 603 together with the respective distances d_1, d_2, d_3 of the reader nodes 2001 2002 2003 respectively from the leaf node 1000 may be used to estimate the location of the leaf node 1000.

In a sectorized antenna scenario, as shown in FIGS. 5 and 6 for example, a reader node 2002 dedicates each of a set of BLE radios to direct its beam at a specific region, or sector. These beams specifically listen to advertisements on channels 39, 38 or 37, for connectivity to devices such as leaf nodes, POIs or other reader nodes. The region around the reader node divides into a plurality of sectors, depending on the beam width of antenna pattern.

In embodiments, a given antenna array consists of a plurality of antenna elements, where the elements may vary in properties, such as directionality, polarization, and the like. These multiple antenna elements combinations may be used to create different overall signal strength patterns for the whole array. These patterns are stored in the reader node, the cloud server, or some combination thereof. Decisions made on the basis of patterns may be precomputed and saved in the system as a rule. Alternately they may be computed in real-time. In embodiments, instructed to do so a reader node may train by going through these patterns for each antenna element to determine which works best for a given antenna array, taking into consideration factors such as: (a) other devices such as leaf nodes and reader notes that the array is in communication with and what antenna pattern and polarization scheme they use, (b) the angle of arrival of and direction of arrival for such communication with a given array, (c) round-trip time of flight for traffic with such a device, (d) proximity sampling by multiple antenna arrays in a given window, and/or (e) historical data.

In embodiments, sectorization works in conjunction with a given reader node directing its different radios to different directions. This enables the reader node to receive the same transmission on more than one of its antennas. By correlating the antennas' physical orientations with the strength of the signal each antenna receives, the reader node can mathematically determine directionality.

For example, suppose for an antenna oriented in direction theta the signal strength is known, based on the characteristics of the antenna, to die down as the cosine of the offset from theta. Now suppose reader node has two antennas (e.g., out of a larger set of four), where one antenna orients east, and the other orients north. And the strength of the same transmission from the eastward antenna is 1.66 times as much as that of the northward antenna. Then cotangent-inverse (1.66) is approximately 30 degrees. So the direction of the transmission is about 30 degrees north of east.

As noted above, due to factors that impact signal strength, such as interference and varying power levels of nodes, in some cases the system may be able to discern direction more effectively than distance from a signal transmission. Variations of transmitted signal strength would affect the received signal strength and thus the apparent distance, but in most cases such variations would not affect the ratio of received signal strengths at the two antennas and thus the apparent direction can be estimated accurately even in the presence of variable signal strength information. However, if two reader nodes receive the same transmission and they know their positions relative to each other, then they can use the direction of the signal to each reader node to triangulate the exact position of the origin of the signal, because the two angles, coupled with the known position of the side between the two reader nodes, define a unique triangle having a third vertex at the location of the node.

Thus, in embodiments having more than one reader node, multiple reader nodes may receive a signal from a device, such as a leaf node. The reader nodes receiving the signal can share this information with each other or with a device of the system, which through processing can deduce the position of that other device by triangulation.

For each of its antenna arrays the system keeps a set of polarization patterns in its memory. If programmed and/or commanded to do so the system trains a given array by causing the reader node to change the polarization pattern of each of the elements of that array, and then measure the effectiveness of the new pattern against prior patterns. The system keeps track of the history of effectiveness of each pattern used for an array. Eventually the system can determine an optimal pattern. In embodiments, the system stays with that optimal pattern; however, it will periodically perturb that pattern to determine if there has been a change such that this is no longer the best pattern to use.

A particular LNRG is physically able to use any of these three methods. But it is programmed to use just one of them at any given time on any given radio. The LNRG may use the same method or different methods on different radios or groups of them. The controllers—i.e. the set of individuals, programmable automata and the software running on those programmable automata acting in concert to determine how the BLEATS behaves—determines which method to use based on various criteria including but not limited to: desired antenna range, desired power consumption, and density of LNRGs in the vicinity, density of LSTs in the vicinity.

Figure 7:
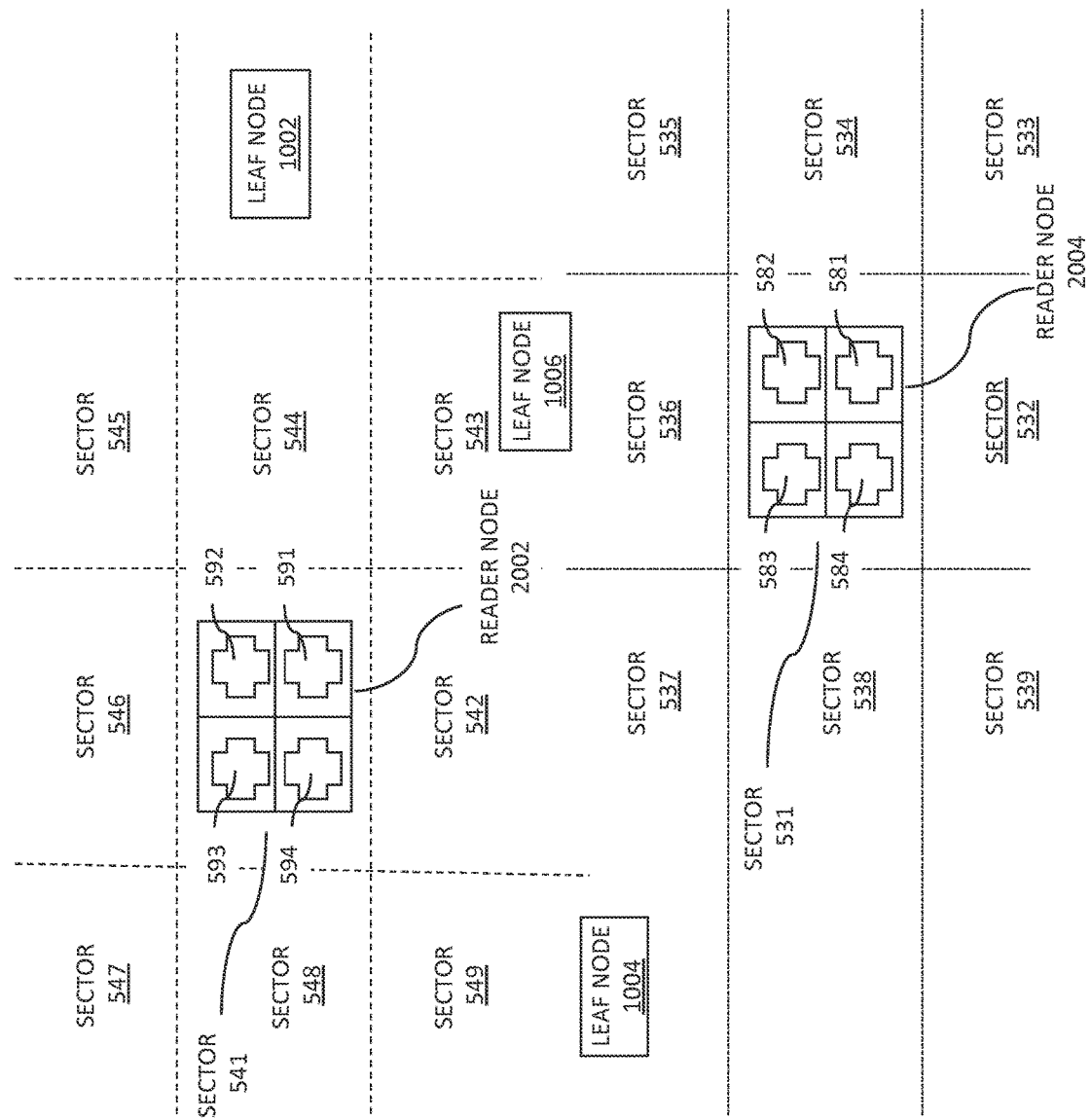
FIG. 7 depicts using multiple reader nodes to locate leaf nodes.

In embodiments containing multiple reader nodes 2000, the system may determine location of the leaf nodes 1000 via other means described herein. FIG. 7 shows such as embodiment. Reader nodes 2002 and 2004 are deployed in the system and are in communication with one another. Reader node 2004 has four antenna arrays 581, 582, 583, 584. The area around this setup is divided into nine sectors, 531-539. 581 directs its energy mostly in sector 533, 582 in sector 535, 583 in sector 537 and 584 in sector 539. 581 and 582 cover sector 534, 582 and 583 cover sector 536, 583 and 584 cover sector 538 and 584 and 581 cover sector 532. All four arrays cover sector 531. The other reader node 2002 has four antenna arrays 591, 592, 593, 594. The area around this setup is divided into nine sectors, 541-549. 591 directs its energy mostly in sector 543, 592 in sector 545, 593 in sector 547 and 594 in sector 549. 591 and 592 cover sector 544, 592 and 593 cover sector 546, 593 and 594 cover sector 548 and 594 and 591 cover sector 542. Leaf nodes 1002, 1004, and 1006 are within the range of reader nodes 2002 and 2004. Reader node 2004, or any element of the system so-programmed such as cloud server 3000, determines that leaf node 1002 is in its sector 535. Reader node 2002 determines that leaf node 1002 is in sector 544. Thus, the system determines that the location of leaf node 1002 is in the area where there is overlap between sectors 544 and 535. Similarly the system determines that leaf node 1006 is in the area where sectors 536 and 543 overlap, and 1004 is determined to be in the area where sectors 537 and 549 overlap.

In embodiments, antenna arrays are configured to transmit and receive directionally. For example, antenna arrays may point upwards from a surface, like a floor. In embodiments, antenna arrays point outward from walls. In embodiments antenna arrays have some other geometric position and orientation. In embodiments, different antenna arrays have different positions and orientations. For example, in an office setting reader nodes may be placed just above the ceiling paneling, with the antenna arrays pointing upwards. In this orientation the reader node may sense and control devices that are wired through the ceiling. For instance, if another device, i.e., a router is physically present in the ceiling the reader node can control and observe this router.

BLE, like many other radio frequency communications systems, breaks down a received signal into in-phase and quadrature (I and Q) components. These are referred to herein as "I" and "Q" data. It may be noted that these phases are temporal and not spatial components. I and Q data provides the arrival time and phase of a signal in reference to a particular time base, which takes the form of a combination of the local oscillator for a superheterodyne down conversion or a direct down conversion, and the clock and timing signals from the analog-to-digital converters that are providing the I and Q data sampling. In embodiments the baseband may be a Gaussian Shift Key (GSFK) Modulator. When more than one receiver delivers I and Q data for signals received from differently positioned antennas, and they use the same time base (or an otherwise synchronized time base), such as a local oscillator time base and A-to-D conversion time base, the I and Q data can be combined in post-processing to (a) measure the difference in arrival time of a signal at the various antennas (thus inferring the direction to it); (b) compute the signal (and thus the receiving antenna pattern) that would be received from any antenna that can be generated by summing various amplitude and phase combinations of the signals intercepted by the various elements; and (c) (i) compute many such patterns and their received results simultaneously or (ii) (such as in pre-processing) compute the signals to be transmitted from the antennas according to any such antenna pattern—or as many independent signals via as many independent antenna patterns as desired. Thus for signals received on a particular receiver node, post-processing of appropriately time-synchronized I and Q data can have the same effect as the beam-switching approaches described above, except that post-processing can try all the beam patterns of interest on a single transmission from a leaf node, simultaneously. It should be noted that it is not typically practical to correlate I and Q data from different receiver nodes, since they use different clocks, and sufficiently accurate synchronization mechanisms are impractical or exceedingly expensive. Thus, one can typically perform I and Q-based location with respect to signals received on a given device, where different antennas run on the same local oscillator. However, the methods and disclosed herein are intended to encompass multi-receiver approaches to the extent that such synchronization is accomplished by methods known to those of ordinary skill in the art, even if such methods may be expensive.

I and Q data may be somewhat inaccurate in determining position. To improve this a receiver node may use multiple antennas to receive I and Q data from a single source. Then the system may use probabilistic algorithms to arrive at a best estimate for that single source's position.

Alternately or in conjunction to this, multiple receiver nodes that receive signals from a single source can independently use I and Q data from that source to determine its position, then correlate this information and use their positions relative to each other, and relative to the single source, to arrive at a best approximation for the location of that single source.

The I and Q data that a receiver node receives from a leaf node may need to be calibrated, since this information is derived, among other things, from the known shapes of the radiation patterns of the radio antennas for a particular receiver node. Since these patterns are not typically perfectly symmetric, the I and Q data is not usually perfectly accurate. This problem is exacerbated by the fact the radiation patterns may be affected by spatial features around the receiver nodes, such as features that deflect or interfere with radio frequency signals.

It may be tempting to think that if two receiver nodes are stationary, are in proximity to each other, and know their own GPS positions, then those receiver nodes could calibrate each others' I and Q data by the following method. A first receiver node could relay to a second receiver node information indicating the position of the first receiver node. The second receiver node could receive the position information and compute from the I and Q data what it believes to be the first receiver node's position. The second receiver node could then iteratively correct its calculations by changing the coefficients in its I and Q calculations, until perfected. The same process could be used to perfect the calculations of the first receiver node. In theory, when a leaf node traversed the space between the two receiver nodes, both would derive much more accurate position information from the I and Q data received from the leaf node.

However, this approach has two challenges. The low modulation bandwidth means there is an uncertainty of a substantial fraction of 2,400 cycles in the designation of a cycle, or the arrival time of a signal. This also corresponds to a distance of an appreciable fraction of 300 meters.

So while phase-related approaches with I and Q data are good for finding directions with antennas physically attached to, or cabled to, a single radio, the problem of acquiring and maintaining the necessary synchronization between separated radios requires, in practical implementations, some synchronization mechanism outside the BLE signal—and probably prohibitively expensive equipment, such as atomic clocks, to maintain the necessary stability. However, receiver nodes can still refine their estimates of their relative locations—and detect whether one or more of their number has been accidentally displaced—by taking turns acting as leaf nodes, with the remaining receiver nodes estimating the location of the receiver node temporarily acting as a leaf node. Such techniques can identify problems, such as gross dislocations, without requiring high-accuracy phase comparisons between signals received at different receiver nodes.

In embodiments, receiver nodes may act in conjunction to pass each other PTP synchronization data to synchronize time down to nanosecond resolution. Once receiver nodes achieve this synchronization they are able to correlate I/Q samples received from a leaf node at multiple receiver nodes at a given time. Then the receiver nodes can send this information to a cloud server that correlates the various samples to determine the leaf node's exact position at that time.

Once a network of receiver nodes self-synchronizes down to nanosecond resolution by PTP, the receiver nodes in that network monitor I/Q samples from a leaf node. The receiver nodes can calculate at any given time the degradation of those I/Q samples going to different receiver nodes. This allows the receiver nodes to run a collision avoidance algorithm to avoid sending colliding messages (e.g., inconsistent instructions) to that leaf node.

In embodiments, more advanced techniques may be used for detecting position and motion, especially in a noisy or otherwise lossy environment. In such embodiment, the methods may process RSSI for (a) the location estimation of the tag. The spirit of this is as follows. Suppose multiple leaf nodes are moving through a set of detectors and that each of those leaf nodes advertises periodically. Then a given receiver node generally picks up a given advertisement from a given tag and extracts its RSSI, such as a function of dB attenuation. However, multiple conditions may interfere with this reception such as: (a) the tag moving temporarily out of range, (b) environmental interference, such as a metal object, (c) environmental noise, such as random static, (d) a collision with another leaf node's BLE advertisement, or (e) absence of an advertisement by a leaf node, for various reasons. At any rate a receiver node is unlikely to pick up every advertisement from every leaf node that is in theory in range.

The methods and systems disclosed herein may use the following techniques to mitigate the effects of noise, fading channels, BLE network interference, and other problems. First, one may use filtering to mitigate the effects of the fading channel. One may detect the presence/absence of the tag based on the global properties of the received waveform. Also, one may apply multi-antenna techniques to improve SINR-AOA, combining the results received by the distinct antennas. Also, one may use adaptive filtering to jointly avoid fading and lost packets, such as using a Kalman/particle filter on each node and/or well across multiple BLE radios. One may also use the BLE network architecture, such as by deploying more than one BLE receiver to take care of mobility and/or the slow squawk rate of the radio. Also, one may modify the advertisement packet to aid detection of the tag. Another method is use of motion-compensated RSSI filtering. This approach may use Kalman filtering with multiple co-located radios with distinct antenna to receive independently faded packets. Here multiple co-located radios with spatially separated antenna elements may receive advertisement packets independently for generating RSSI estimates. Finally, one may use Adaptive Squawk Rate Variation. This approach adaptively varies the squawk rate to ensure that the receiver node receives a large number of advertisement packets from every tag, even in the presence of packet collision and fading.

Another method detects for detecting presence/absence involves using the shape of the signal wave form. In connection with this method the term "signal" refers to the plurality of RSSI data points, and "waveform" and "envelope" refer to the arrangements of these points according to the time they were collected. These terms should not be confused with the usual meanings of signal, waveform and envelope as applies to radio waves and as they are related to electrical waveforms.

In this method the receiver node may pass the filtered output of the signal though a waveform shape analyzer block. The block may use the overall shape of the waveform along with the received RSSI threshold to declare the presence or absence of an obstacle. The key advantage of capturing the waveform shape before declaring the presence/absence of a tag is the following. An RSSI-based approach declares presence or absence of the tag based on the received RSSI being above or below the threshold. The waveform undergoes frequency selective fading. This leads to presence/absence declaration based on every filtered RSSI estimate. However, if the presence/absence detection is based on the observed signal envelope, it eliminates the effect of instantaneous changes in the received RSSI of the signal.

The distance between the leaf node and the receiver node decreases as the leaf node comes closer to the receiver node. Here the received RSSI increases. As the leaf node moves away from the receiver node, the RSSI drops. The increase and decrease in the received RSSI is typically characterized by the path loss exponent in a given environment. Increase and decrease in the received RSSI according the path loss exponent will reliably indicate the presence and absence of the tag. The receiver node may declare the presence/absence of a leaf node after observing the received RSSI over a window of samples, rather than relying on a single reading.

The RSSI window width is a design parameter that varies with the embodiment. In some embodiments it is programmable. The receiver node may treat the adjacent windows of received RSSI estimates as overlapped or as disjoint for signal waveform analysis. In some embodiments the system analyzes sliding adjacent windows by one sample.

In some embodiments the receiver node can detect whether the leaf node is present, without a threshold over the window, based on the waveform shape alone. In some other embodiments the receiver node uses a counting, statistics-based approach, which employs a threshold.

RSSI filtering for location estimation or presence/absence detection may use the statistics and/or shape of the received waveform using single antenna radios. This is extended for the case with multiple antennae in the same radio. The distributed multi-antenna system may also be used.

Steps in the detection of the presence/absence of a tag based on the received RSSI wave form shape may be: 1) the RSSI signal is stored for a given window duration; 2) the RSSI over the window is the rate of change in the RSSI computed based on the successive difference between RSSI samples; 3) the rate of change of the RSSI, including the increase in the rate of change of RSSI followed by the decrease in the change of RSSI, may be used to effectively characterize the movement of the tag towards the receiver initially and later moving away; and 4) the local average within a window and maximum value may be estimated based on the received RSSI. The difference between the average and maximum value also indicates the movement of the tag towards the receiver.

The system may also compute the following statistics over the window. First, simple counting statistics may be computed, such as setting a threshold and counting the number of times the RSSI is above threshold. If the number of times the RSSI is above the threshold is greater than the number of times it is below the tag is declared to be present.

Weighted counting statistics may also be computed. For each RSSI the system may obtain the sum of difference between the threshold and the RSSI values which are above the threshold. The system may obtain the absolute value sum of differences between the threshold and the RSSI values below the threshold. If the sum of the differences of the RSSI estimates above the threshold is greater than the sum of the differences of RSSI's below the threshold, the system may declare that the tag is present.

In different embodiments and with different programming a receiver node may look for various distinct patterns in the RSSI time series. For example, the system may look for patterns where RSSI values increase and then decrease. A monotonic increase followed by monotonic decrease may indicate the leaf node moving toward, then away from, the receiver node. The system may look for the RSSI value to increase, then plateau, within the window. In other situations, the RSSI value decreases and then it plateaus. In other situations, the RSSI values increases in a non-decreasing manner and then it decreases in a non-increasing manner. The system, such as a receiver node or cloud server, can use these and other computed statistics to decide on the presence or absence of a tag over each window. As a first step we may consider significant overlap. In spirit, a receiver node running this analysis must take these different scenarios for consideration. First, there is a benign case, where the leaf node moves towards the receiver and then moves away over the finite window of observation. Here, the received RSSI at the leaf node increases and then decreases. This can be characterized based on the steps above. Another case is the quasi mobile case. Here, the assumption is a leaf node moves from one location to another with long intervals without any change in the observed location of the leaf node. The leaf node stays in each intermediate location for a long time. Here, again combining the waveform shape and identifying that the RSSI does not change for long over the window of observation will lead to a reliable decision for the presence/absence detection. This is more reliable than the point decision of absence/presence based on the received RSSI. Another case is the fully mobile case. Here the leaf node moves rapidly in comparison to its advertisement rate. The receiver node may miss the advertisement, also called a squawk, when it is close to the receiver node. In one possible scenario the RSSI remains low over the window length. Here, based on the RSSI signal waveform envelope not peaking, the system could change the squawking rate and check for changes in the RSSI waveform. The waveform shape aids in changing the squawking rate of the leaf node.

In different embodiments the pre-processing step (to generate the RSSI time series for processing) includes one or more of the following filtering steps. First, one may perform a low pass filtering based on a simple averaging over a fixed number of samples. The averaging length is decided based on the squawking rate of the tag and the velocity of the tag. If the velocity of the tag as well is high and the squawking rate is low the averaging length is small. In other extreme where the squawking rate is high and the velocity of the tag is low we could choose a longer averaging length. One may also perform Kalman filtering. Here we consider the process noise as well as the additive noise. The filter works by minimizing process/measurement noise through a two-phase algorithm. First, a predictor performs the next RSSI estimation. Then, a corrector improves the RSSI estimation by exploiting the current RSSI measurement. When the tag is moving, successive received advertisement packets are transmitted by the tag from different positions with respect to the receiver. A motion compensation algorithm using Kalman filtering could be implemented to receive multiple advertisement packets from the same relative location with respect to the receiver.

A typical Kalman filter may be represented by the following steps:
State Update Equation:

$$X_k = F_k X_{k-1} + B_k u_k + W_k$$

where
$X_k$ is a state vector
$F_k$ is a state transition model
$B_k$ is a control input model applied to control vector $u_k$
$W_k$ is a Gaussian process noise $-N(0,Q_k)$
Measurement equation:

$$Z_k = H_k X_k + V_k$$

where
$Z_k$ is a measurement vector
$V_k$ is a Gaussian observation noise; $N(0,R_k)$
$H_k$ is a input, output transfer function
Prediction step:
$\hat{X}_{k|k-1} = F_k \hat{X}_{k-1|k-1} + B_k u_k$
$P_{k|k-1} = F_k P_{k-1|k-1} F_k^T + Q_k$
$\hat{X}_{k|k-1}$: predicted state
$P_{k|k-1}$: predicted covarience matrix
Update Step:
$K_k = P_{k|k-1} H_k^T (H_k P_{k|k-1} H_k^T + R_k)^{-1}$—Kalman gain
$\hat{X}_{k|k} = \hat{X}_{k|k-1} + K_k(Z_k - H_k \hat{X}_{k|k-1})$—state update
$P_{k|k} = (I - K_k H_k) P_{k|k-1}$—estimate covariance matrix Also, the system may perform filtering in the presence of missing packets. In a typical wireless environment several received packets could be lost. For instance, if the tags move rapidly (for a given squawking rate) the advertisement packet could be lost. Here the system may address the solution using two possible approaches. First, multiple radios may be deployed along the determined path of the tag. There is finite intersection between the listening ranges of the radios. Here if the tag is heard by one of the radios. If the tag is heard by one radio one may combine the output of the two radios multiple ways. Alternatively, one may use knowledge about the prior location of the tag. Another approach to filtering is to perform Bayesian filtering/Particle filtering: A receiver node may do this in situations where the propagation model is unknown, the antenna characteristics are non-ideal, etc. Here the approach is to obtain the probability distribution of the parameters characterizing the propagation losses using RSSI. This will aid in reliable estimate of the presence/absence of the tag. In embodiments, the receiver node or other system element may use a combination of the above-referenced methods across different radios.

In embodiments, the system may employ multiple antennas on a single receiver node, across different receiver nodes, or both. These multiple antennas perform coordinated filtering when they receive squawks from the same tag. The overall approach may remain to use the RSSI according to various methods described above.

The approaches may include the following. First, the system may use equal gain combining to improve RSSI estimates, such as by spatial averaging. This can be across spatial distributed radios as well. Also, the system may use maximal ratio combining: optimal combining (whether by co-located antenna array or distributed arrays). Also, the system may use a switched antenna, such as taking the output of the most reliable RSSI value. This can be combined with weighted combining. The system can also use distributed multi-antenna systems. It may be attractive to combine the output of the receiver and the location marker (i.e., the known location of the receiver node and the location marker, such as for a POI). This may include synchronization across different radios, such as between POIs and receiver nodes. The system may also use AOA-based BLE. Here the system would likely have widely varying characteristics to encounter, including multipath propagation. This approach may be used for obtaining the angle of arrival based on different array geometries. This may be modified to include both distributed and co-located multi-antenna systems. The system may also combine AOA and RSSI ranges, such as to reduce the "uncertain" regions and improve the confidence in location estimation. The system may also leverage polarization diversity, as well as combine this with the AOA and RSSI measurement. Finally, the system may transmit a specific signal (such as a signature signal, such as a liner chirp) from a tag. The phase delay difference seen at reference nodes can be employed to arrive at the angle information with respect to a specific tag. This can be employed to estimate the direction arrival from distinct BLE tags. In embodiments, a simple spatial averaging of the received RSSI across the received signal from different antenna elements may be used. This may be done prior to waveform-based analysis for classification of different events.

The approaches above can be used for location estimation, once the RSSI signals are filtered, AOA computed, etc. The required accuracy in the estimate of the tags and known priors may be used. The architecture may be used for presence and/or absence detection, for determination of the proximity of a leaf node to the receiver or the state of being away from the receiver. The approaches can be used for location of the tag and for path characterization of the tag to track the movement of tag within the wireless network, as well as integrating this information with the cloud infrastructure.

In embodiments, a network architecture may be based on the receiver nodes, the POIs and the leaf nodes (tags). The positioning of the POIs and receiver nodes is designed to locate/detect varying numbers of tags, tags moving with different speeds, mobility models, constraints on the battery life in the tags, etc. In a given deployment it may be assumed that the POI has to detect a varying number of tags with different speeds (varying from moving very slowly to moving at higher speeds, such as 4 ft/s) with a high degree of reliability. Here depending on the maximum speed and maximum number tags (which could squawk at the same time) one may design the number of POIs with overlapping coverage. In a macro coverage area, where the number of tags present in the coverage area of a receiver node has to reported consistently, the system may use multiple techniques, including deploying multiple antennae at the receiver, using multiple receivers, modifying the advertisements sent from the tag, observing the statistics of each radio node, and waiting longer before changing the state of the tag (such as if the RSSI for the tag is not above the threshold consistently). Such a network preferably provides reliable presence absence detection of every tag (e.g., with an error of the order of 0.0000001 per tag, provides good battery life of the tag, provides highly accurate location estimates, provides two-, and optionally three-, dimensional positioning and provides enough receiver nodes to handle the maximum number of tags that are likely to be supported. The network preferably also is adapted to handle maximum and minimum supported velocity of the tags.

In embodiments, a site survey may be used to develop a deployment approach for the BLE network for location monitoring/presence absence detection.

In embodiments, methods may be used for handling interferences in the BLE advertisement channels, such as by gathering the interference statistics and employing receiver algorithms to work in the presence of interference, or by deploying receivers with signaling techniques to improve SINR.

Once a network of LNRGs self-synchronizes down to nanosecond resolution by PTP, the receiver nodes in that network may test their interference with each other by having multiple receiver nodes transmit a packet at exactly the same time, and having multiple receiver nodes monitor such events and record the strength of the I/Q sample. By running different combinations of receiver nodes, the overall system can determine a map of receiver node interactions. This allows the system to tell each receiver node when it may or may not transmit in a given frequency band and direction, and thereby avoid signal collisions.

Figure 8B:
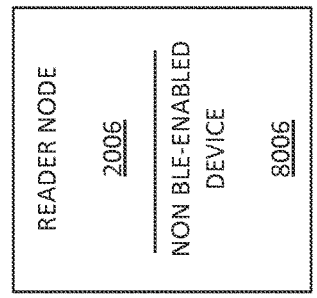
FIGS. 8A-8D depict different deployment scenarios for reader nodes with other non-reader node devices.
Figure 8D:
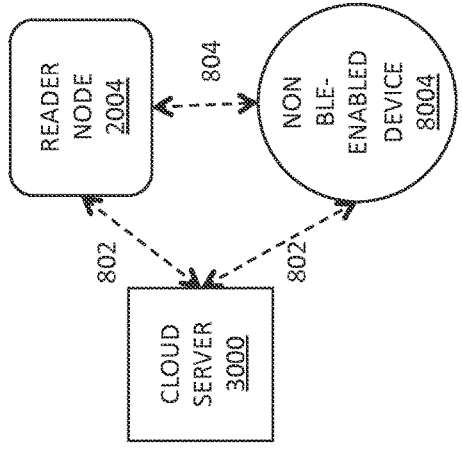
Figure 8A:
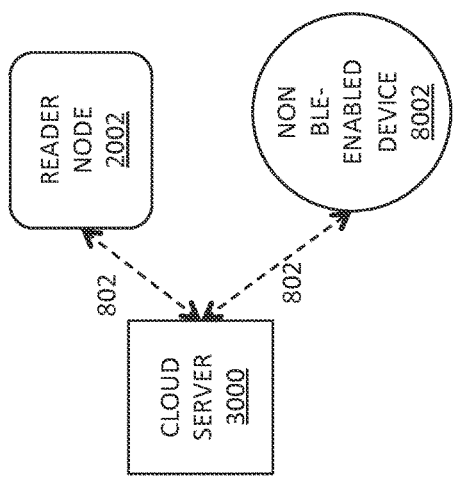
Figure 8C:
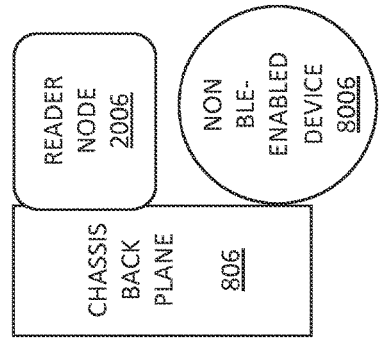

FIGS. 8A-8D shows four different deployment scenarios for reader nodes with other non-reader node devices. FIG. 8a shows a reader node LNRG (251) communicating over the Internet 802 with a cloud server 3000. A non-BLE-enabled device 8002 communicates with cloud server 3000 over the Internet 802. Thus, 2002 and 8002 communicate using cloud server 3000 as a relay. FIG. 8B shows reader node 2004 and a non-BLE-enabled device 8004 communicating with cloud server 3000 via the Internet 802 but also communicating directly via local some local protocol 804. FIG. 8C shows reader node 2006 communicating with non-BLE-enabled device through a chassis back plane 806. FIG. 8D show an embodiment in which a single device is both the reader node 2006 and a device 8006 with non-BLE capabilities such as a wireless access point.

Currently, conventional wireless access points do not have the capability to communicate with certain kinds of local devices, for example, various Internet of Things (IoT) devices that may use communication protocols other than WiFi. A BLEATS of the type herein integrated with, or working in conjunction with, such access points provides much broader communication capability to IoT devices, and more generally to various leaf node devices, such as asset tags. Referring to FIG. 7A, a wireless access point (AP) is represented by the schematic circle 8002 on FIG. 7, and it is positioned parallel to a reader node 2002. In embodiments, they are separate devices. In embodiments, they do not communicate directly. However, they may communicate through a cloud server 3000 via the Internet 702. The AP may send messages to the reader node, receive such messages, and so on. In embodiments, the AP may itself have other reader node capabilities.

In the second implementation referred to now in FIG. 8B, the AP occupies the schematic circle referenced by 8004 and the reader node 2004 communicates directly with the AP through protocols and media including but not limited to Ethernet, 802.3, 802.11, USB and BLE. Either or both devices may also communicate with cloud server 3000 or other devices.

In embodiments, an AP 8006 shown in FIG. 8C and a reader node 2006 physically reside on the same machine.

The reader node 2006 may be implemented, for example, as a card that sits in the AP's chassis. They communicate through the backplane of the chassis 806

In embodiments, a reader node 2006 is simply an additional capability of the AP 8006. In addition to being an access point for other wireless communication, the AP/reader node unit communicates with other devices of the system via BLE, and communicates with the cloud servers over the Internet.

None of the above embodiments are exclusive and they may work in concert. For instance, a reader node integrated into an AP may interact via cloud servers with an AP that does not have any capacity to interact directly with reader nodes.

In embodiments, BLE Communication between devices of the system comprises a series of communication sequences. A communication sequence consists of a series of BLE messages. The following is a description of an embodiment of communication sequences involving a reader node and other devices. Upon a reader node's establishment of a connection with some other device, the connection sequence may be as follows:
CONNECT REQUEST
CONNECT GRANT
SEND REQUEST
DATA or ACKNOWLEDGE
DISCONNECT REQUEST
DISCONNECT GRANT In embodiments, there may be multiple SEND REQUEST, DATA or ACKNOWLEDGE pairs.

In embodiments, a BLE-enabled reader node may not keep track of the state of a sequence of communications between itself and any other device with which it communicates. Thus, each communication sequence may be independent of those preceding it in time. Such an approach allows the reader node to communicate with a much larger number of other devices than would be possible if it kept state history for each communication.

In embodiments, a reader note continually checks via the advertisement channels for leaf nodes in its radius. Leaf nodes that are not currently in communication with a reader node periodically advertise on the BLE advertisement channels. If a reader node is within range of the leaf node's advertisement, it should receive that advertisement after which the reader node may responds to the leaf node and establish a handshake. In this way, the reader node knows in what direction and on what channel it should communicate with that leaf node. In embodiments, the reader node may maintain this communication on a BLE data channel, and may instruct the leaf node to do the same. The reader node may establish that it is in communication with a particular leaf node, by learning the leaf node's PIN and TIN and relaying this information back to a cloud server as a reader node event. The cloud server may note this in the registry, that is, that this reader node is communicating with this leaf node, identified by PIN and TIN.

In embodiments, when a reader node establishes a communication sequence with some other device that sequence may be stateless or persistent. A stateless sequence comprises a start handshake to establish communication, then a query or command from one device to the other, then possibly a response, and then an end handshake to terminate communication. A persistent communication establishes communication with a start handshake, but then it maintains communication by a series of messages in both directions. It may or may not terminate at some point with an end handshake. A reader node may maintain a mixture of stateless and persistent sequences with the BLE devices with which it communicates.

In embodiments the control architecture, or stack (the MCU 2100 described herein), of a reader node may simultaneously keep of track of multiple, in embodiments of up to eight, different communication sequences with different devices, including leaf nodes and other reader nodes. Such tracking is independent of the physical communication vehicle for these communication sequences. Given that each communication sequences comprises an ordered set of messages that the reader node transmits and receives:
  the messages the reader node receives may arrive on the same receiver, on different receivers, or on some combination thereof;
  the messages the reader node receives may arrive on the same spectral BLE channel, on different BLE spectral channels, or on some combination thereof;
  messages that arrive on the same spectral channel and on the same physical receiver may be time-multiplexed so that they do not interfere with each other;
  the reader node may logically create, allocates or assign a separate control state, or sequence/control stack, for each message sequence when such a sequence starts; and/or
  when the sequence is complete the reader node may destroy, free or reassign its stack.

In embodiments, the system, such as a BLEATS, may instruct the leaf node to alter its advertising periodicity signal strength programmatically in one of several ways, including: (a) instructing a leaf node to increase its frequency of advertisement when it is determined that the leaf node may be in motion or when it is determined that it would be beneficial to take a rapid series of measurements to estimate the leaf node's location; (b) instructing the leaf node to maintain a higher rate of advertisement either until the system or an operator resets it or for some preset duration (as a hedge against the system failing to restore it to normal once the exceptional condition is over); (c) instructing the lead node to increase its frequency of advertisement at some event of the leaf node receiving data indicative of a condition, e.g. the leaf node receiving sensor data of motion, the leaf node receiving sensor data of temperature (such as an overheating condition), etc. of for some duration after such an event; (d) instructing the leaf node to maintain a higher rate of advertisement either for some preset duration, or until some other event such as establishment of communication with a POI or non-POI reader node; and/or (e) instructing the leaf node to increase its advertising signal strength, either to a fixed higher level or according to some function, such as incrementally, either at or at a predefined time after some event.

Thus, in embodiments, the leaf node advertises based on its known condition, which is either known at or during deployment or is determined by sensors 6000 or otherwise detected. The advertisement pattern and rate may be variable and adjusted based on the circumstance. The frequency of advertisement may be adjusted based on the condition. A decreased advertisement frequency may be beneficial for a leaf node that is known to be at rest in that if a leaf node is known to be at rest, it only needs to infrequently advertise its location so communications can be established with it. For example, for a system where leaf nodes are associated with assets in a large warehouse, infrequent advertisements may be adequate. Such infrequent advertisement can conserve device battery life, such as leaf node battery life, as well as avoid clogging the advertising channels with traffic.

If the leaf node is associated with the type of asset that moves frequently or if leaf node is equipped to sense movement and senses frequent movement, infrequent advertisements may not be adequate for a system, such as a BLEATS, to reliably keep track of the asset's changing location. Therefore, increasing the advertising rate (also referred to as frequency above) for leaf nodes expected to be or known to be experiencing a condition, such as moving, allows the associated assets to be tracked more reliably. Increasing advertisement rate/frequency only while the asset is experiencing a condition, such as motion preserves battery life of associated devices, most notably, leaf nodes. In such situations, automatically setting to infrequent advertisements after the condition has expired, such as movement stopping, conserves battery power. Similarly, setting to infrequent advertisements after a preset time if the BLEATS fails to reset the advertisement (based on the changed condition or the end of the condition) guards against the BLEATS being unable to communicate with the leaf node and prevents accidental excess consumption of battery life.

In embodiments, the system may increase accuracy of location determination of the leaf nodes by combining detection of a number of advertisements to average out noise and other inaccuracies. At advertising rate of a low frequency, this might take a long time and may consume reader node resources. Increasing the advertising rate/frequency while the measurements are being taken can shorten the task.

If there is some urgent or extraordinary event detected by or otherwise communicated to the system, for example, an asset such as a container is on fire, the system can increase its advertisements so as to increase the probability of establishing communication so that in turn, the system may, in a timely fashion, convey the critical information to some entity that can address it, e.g. call the fire department.

Consistent with the above capabilities of the system to dynamically respond to given situation by addressing operational parameters of the system, including advertisement and data sampling rate, the system may raising the signal strength after a period where there is no response. This is akin to "shouting louder for help", and may allow more letting more distant reader nodes hear the message if the nearby reader nodes are unresponsive for some reason. Returning to normal settings (as discussed above) after a set time reduces channel clogging. For example, if whole sections of a warehouse are on fire, leaf nodes returning to normal may allow responders to "hear" other sensors without being overwhelmed by those whose situations have already been addressed or are not salvageable. Other events will now be described.

An event referred to as Wake-Up is described below. With reference to a leaf node of the system, a leaf node 1000 may function autonomously. It may have a PIN (product identification number) unique to it, and a TIN (type identification number) it has in common with other leaf nodes of its kind. In embodiments, when leaf node wakes up it may advertise continually on all three BLE advertisement channels, 37, 38 and 39 until it makes contact with a desired device. It may wake up due to a pre-programmed schedule, the detection of a condition, or the like. In embodiments the leaf node may be schedule to wake up based on time to transfer telemetry data, it may be scheduled to wake up based on sensory thresholds such as when an accelerometer on the Leaf node indicates it was moved or a temperature sensor exceeds a certain temperature, and the like.

Figure 9A:
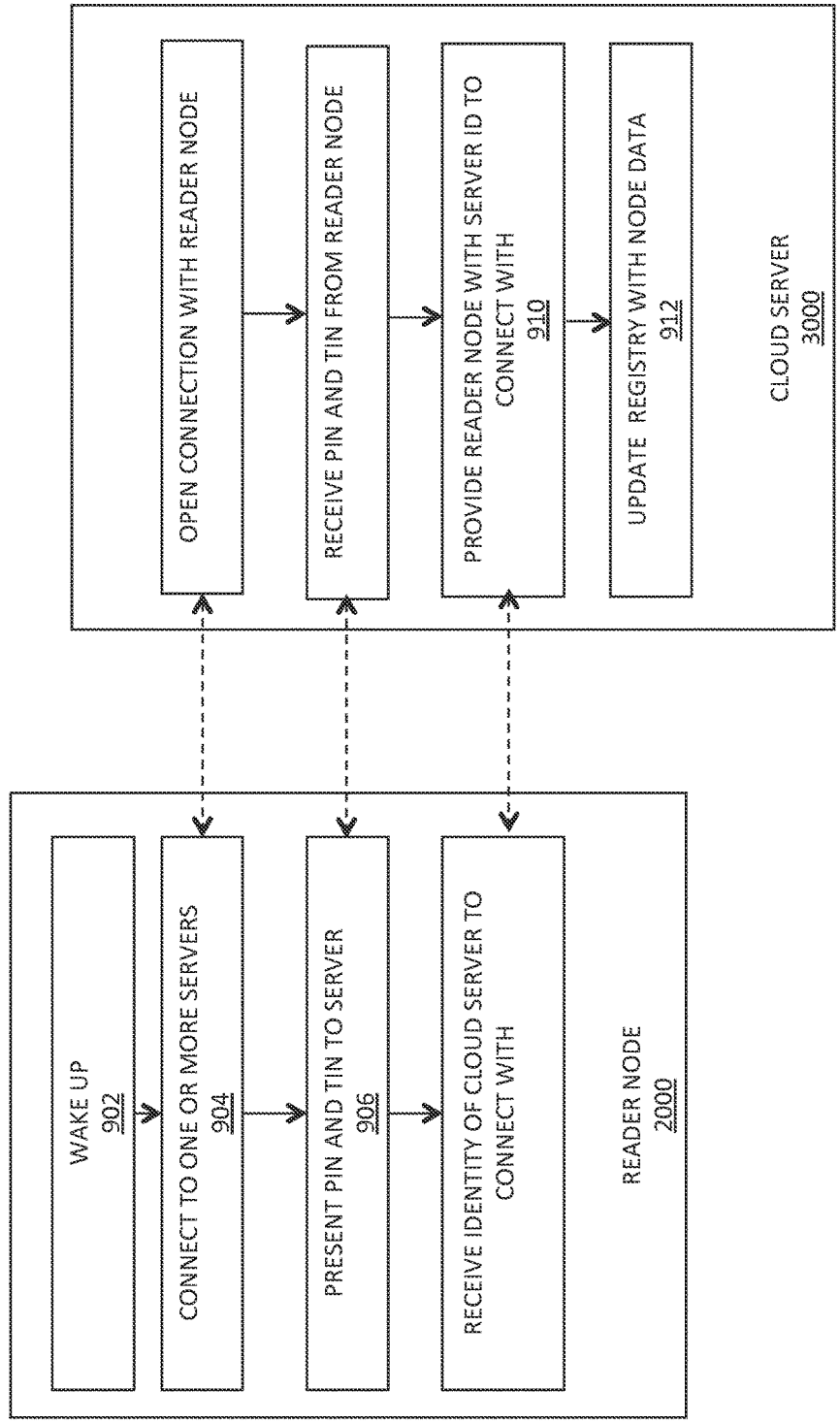
FIGS. 9A-9B depict embodiments of a reader node initiating contact with a cloud server.
Figure 9B:
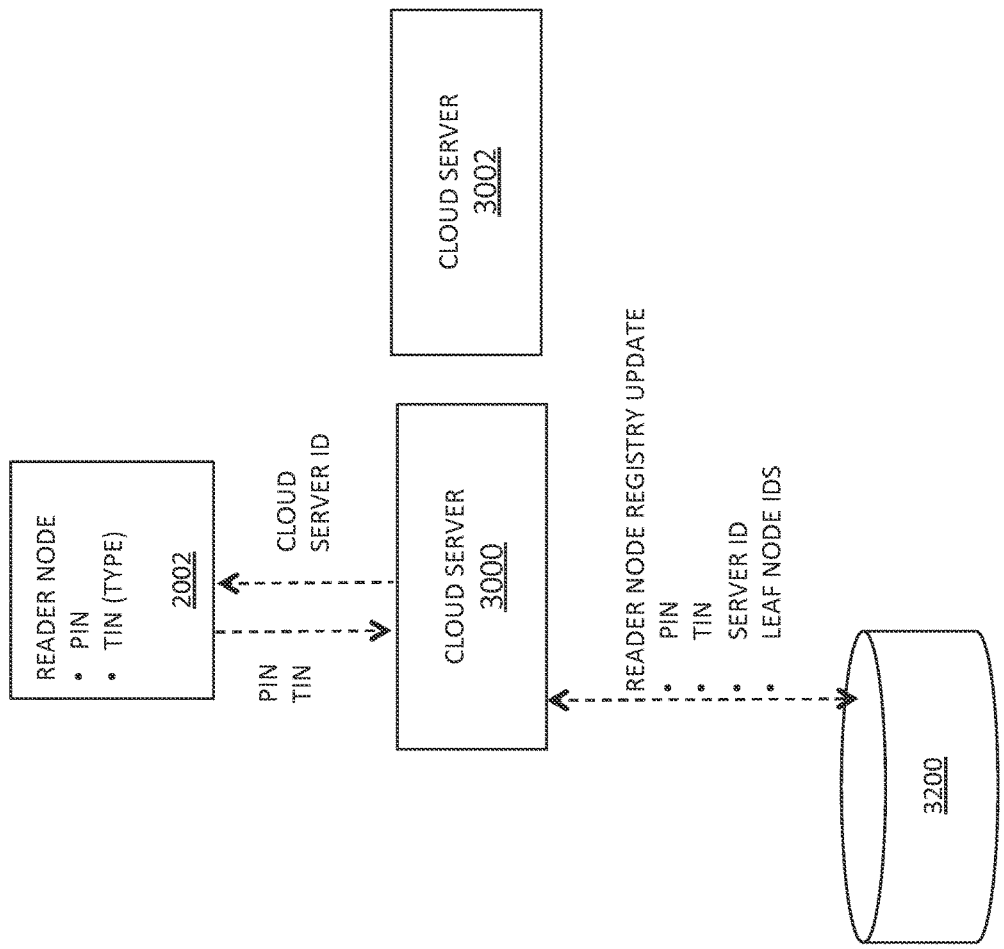

With reference to a reader node 2000, a reader node 2000 may function autonomously. It may have a PIN unique to it, and a TIN (type identification number). In one illustrative and non-limiting example, as shown in FIGS. 9A-9B, a reader node may be preprogrammed to connect to one or more cloud servers 3000. In embodiments, when the reader node 2000 wakes up (step 902) it may establish a connection over the Internet to a selected cloud server (step 904) and it may present its PIN and type (TIN) to the cloud server (step 906). The cloud server 3000 may be programmed to instruct the reader node 2000 to communicate with a specific cloud server (step 910), which may be itself 3000 or another cloud server 3002. The cloud server 3000 may note the PIN and TIN of the reader node, and also that it or another cloud server is communicating with the reader node 2000 in the registry (step 912), which again, may comprise a database 3200 that the cloud servers in the system, such as a BLEATS, maintain to track which devices are communicating to which devices, such as which cloud server 3000 is communicating with which reader nodes 2000, and which reader node is communicating with which leaf nodes 1000.

Figure 10A:
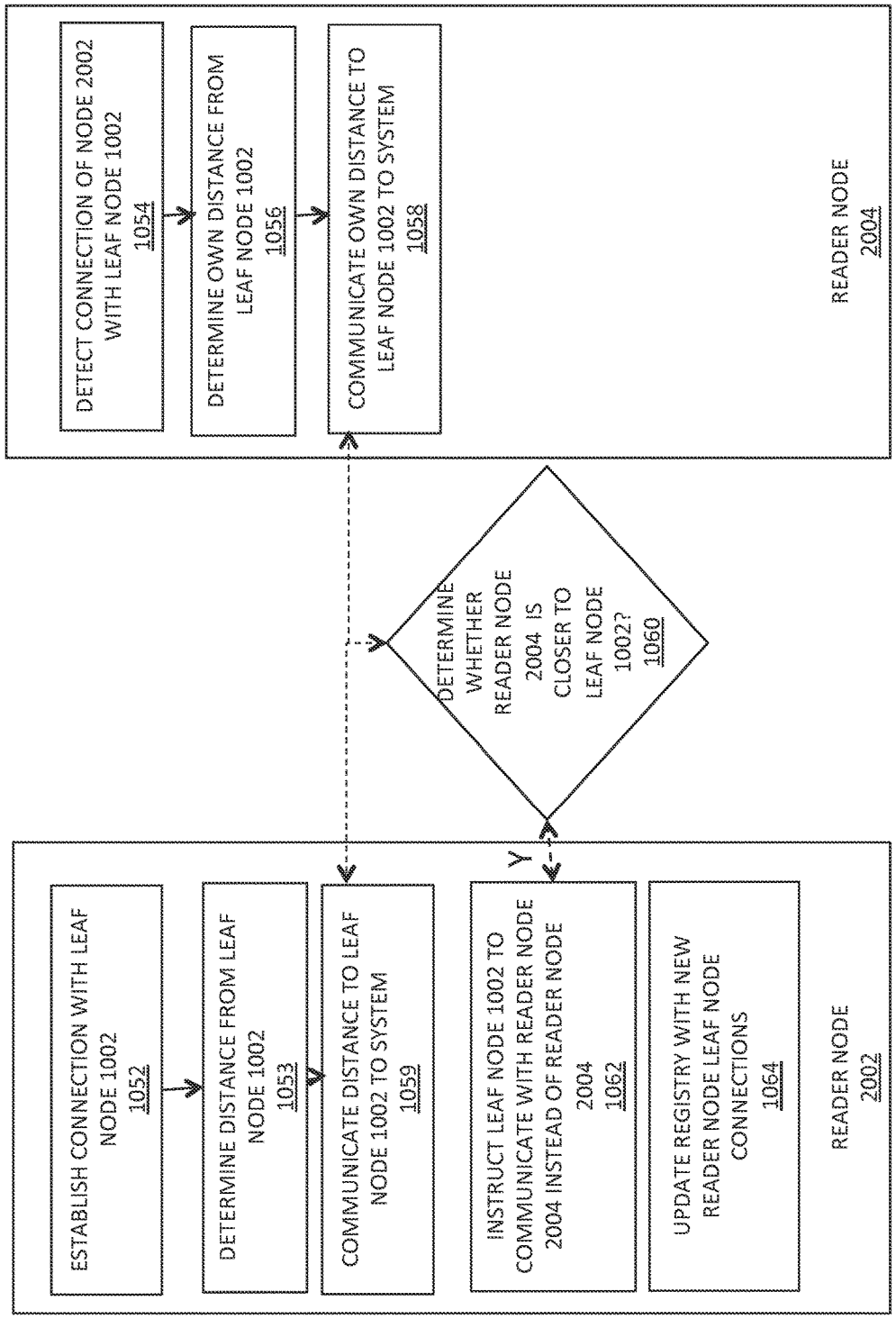
FIGS. 10A-10B depict an embodiment of a leaf node "take over".
Figure 10B:
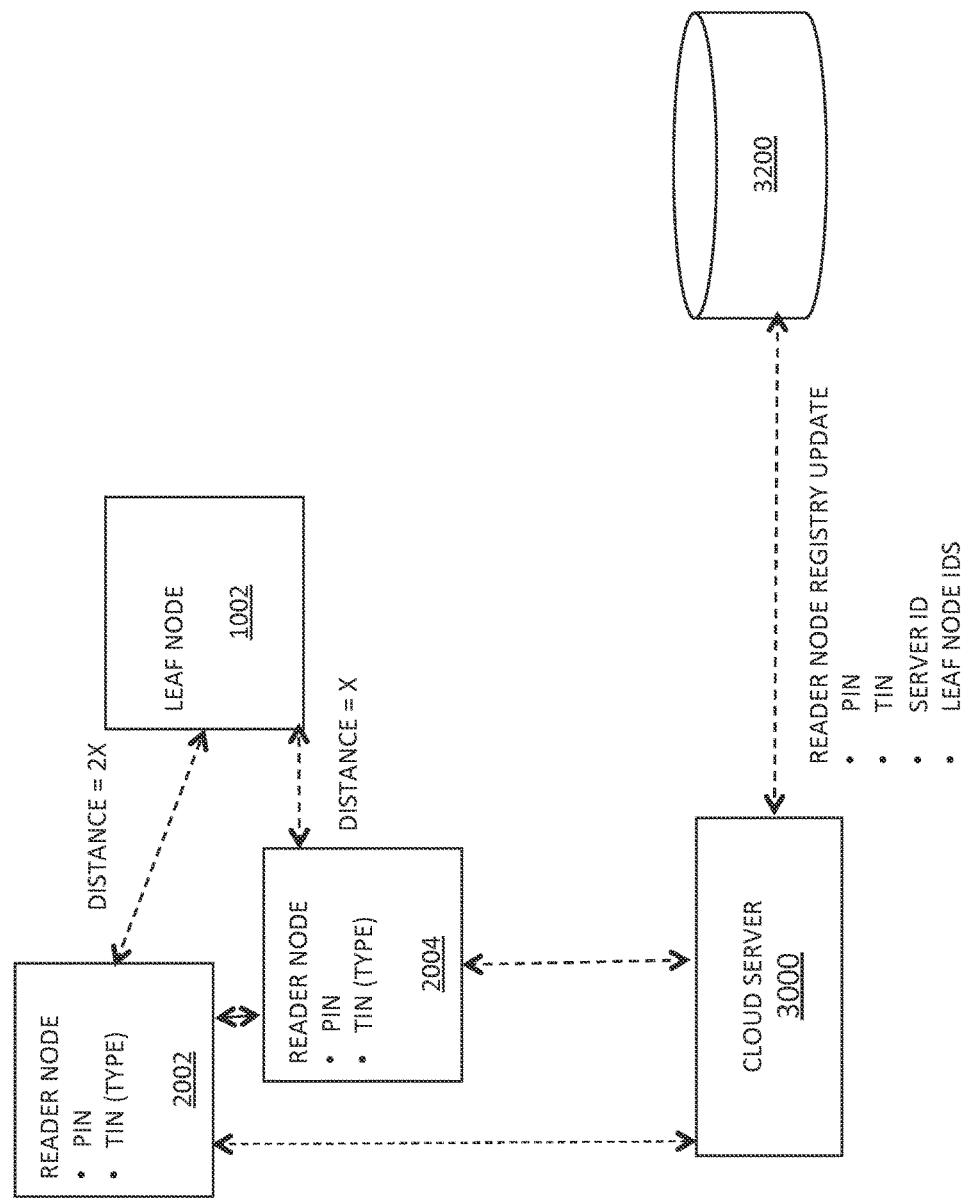

Another event, referred to as a "take-over" and an illustrative example of which is shown in FIG. 10A-FIG. 10B, will now be described. In embodiments, a reader node 2002 may establish communication with a leaf node 1002 (step 1052), and determine the distance between the reader node 2002 and the leaf node 1002 (step 1053). When another reader node 2004 detects this communication (step 1054), reader node 2004 may determine its own distance from leaf node 1002 (step 1056). Each reader node 2002 2004 may communicate that distance to the system (step 1058 1059), for example to reader node 2002, to a cloud server 3000, or other viable pathway. A determination may be made as to which reader node 2002 2004 is closer to the leaf node 1002 (step 1060). If reader node 2004 is closer, then the system, either via programmed instructions from the cloud server 3000 or from reader node 2002, instructs leaf node 1002 to communicate with reader node 2004 instead of itself (step 1062). In embodiments, reader node 2002 may send a message to the cloud server 3000 asking that the cloud server remove the reader node 2002/leaf node 1002 connection in the registry, and add a reader node 2004/leaf node 1002 connection in the registry (step 1064) (which in embodiments is also the database 3200 referred to above).

Factors used to determine which reader node will communicate with a particular leaf node may be a weight system, where the weight of an leaf node for any reader node takes into account among other factors the proximity of the leaf node to that reader node, how heavily loaded that reader node is (for example, how many leaf nodes it is communicating with), the remaining battery life of a reader node, the operational availability of the reader node. Reader nodes exchange information as to the weight of those factors with respect to a leaf node for applicable reader nodes. In embodiments, the reader node with the weightiest result will communicate with that leaf node.

An illustrative and non-limiting depiction of a "self-deregistration" event for a leaf node 1000, is shown in FIG. 11. In embodiments, if a leaf node 1002 determines that it is experiencing a condition affecting its ability to continue operation (step 1152) (for example, its battery is low), the leaf node 1002 may initiate shutdown (step 1154). The leaf node 1002 may send a message, i.e. an event, to a reader node 2002 informing the reader node 2002 (either directly or indirectly as described above) of its pending shutdown and causal condition (step 1156). In embodiments, the reader node 2002 may (or may be instructed to) remove this connection (step 1158) and send the event information to the applicable cloud server 3000 (step 1160). The cloud server 3000 may then update one or more of the registry 3200 (step 1162) and other databases accordingly.

Figure 12:
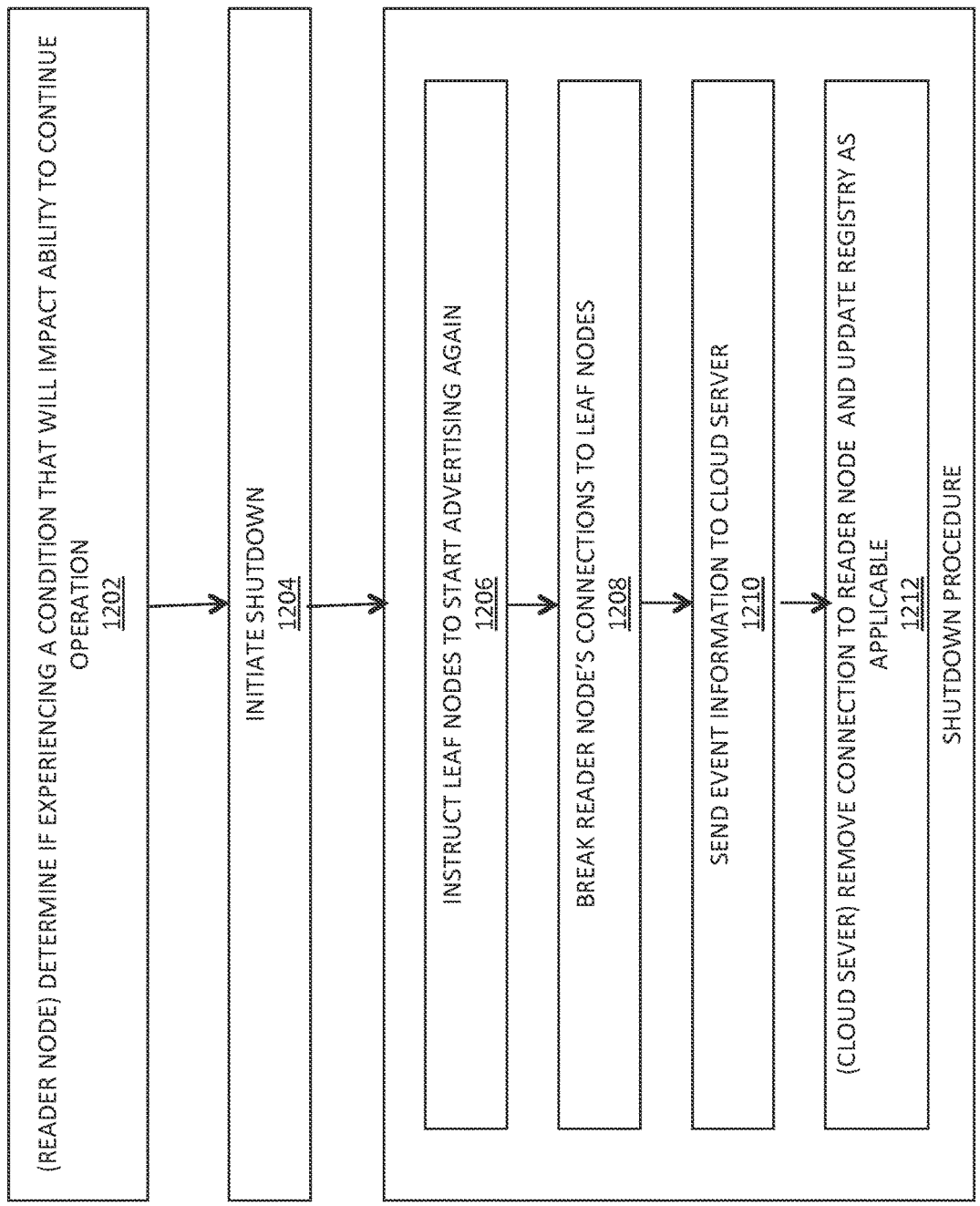
FIG. 12 depicts a "self deregistration" event for a reader node.

An illustrative and non-limiting flowchart of a "self-deregistration" event by a reader node 2000, is shown in FIG. 12. In embodiments, if a reader node 2002 determines that it is experiencing a condition affecting its ability to continue operation (step 1202) (for various reasons described above in connection with the leaf node self-deregistration embodiment), the reader node 2002 may initiate shutdown (step 1204). The reader node 2002 sends a message to connected leaf nodes 1002 1004 instructing the leaf nodes 1002 1004 (step 1206) to start advertising again and, in some case, breaking the reader node's 2002 connections to the leaf nodes 1002 1004 (step 1208). In embodiments, the reader node 2002 may also send a message, i.e., event to an applicable cloud server 3002 informing the cloud server 3002 that it will shut down or otherwise go off-line (step 1210). In response, the cloud server 3002 may remove its connection to the reader node 2002, and all of the reader node's 2002 connections to applicable leaf nodes 1002 1004, from the registries or databases 3200 (step 1212).

Another event, referred to as "device loss," will now be disclosed. In embodiments, a reader node may be configured to maintain a communication interval at a pre-selected regular interval with the leaf node, which can be described as a periodic heartbeat communication with the leaf node. For example, the reader node may be configured to send the leaf node a ping packet at one-second intervals. If the leaf node does not respond within the pre-selected interval, then the reader node (or any device programmed accordingly in the system) can deem the leaf node "lost" and then does not attempt to communicate with the leaf node any longer. The criteria for loss may be a number of pings (or messages) the leaf node does not respond to out of a total number of messages, a number of consecutive messages the leaf node does not respond to, and the like. If a leaf node is deemed lost, the reader node may send an event, i.e., message, to the applicable cloud server and the cloud server may remove that applicable reader-node-leaf-node connection from the registry. Device loss above may occur in the situation where a leaf node and a reader node are moving with respect to one another. As with embodiments above, the criteria and format is adjustable. For example the heartbeat communication may happen every 10 seconds, and may time out, such as after a designated threshold number of packets, such as after 4 lost packets. Also, instead of a ping packet the reader node may send out a special packet, such as a layer-7 protocol packet, for the purpose of determining device loss.

In embodiments, a leaf node may maintain an internal counter. When a leaf node is in communication with a reader node, the leaf node may record data such as the last time it received a message from a reader node. If the last message from the reader node was more than some pre-defined interval, for example 30 seconds, the leaf node may then ago stops communication with that reader node.

Reader nodes may be programmed with instructions similar to the above for their communications with the cloud server. For example, a reader node may maintain a communication interval at a pre-selected regular interval with a cloud server, which can be described as a periodic heartbeat communication with the cloud server. In an example, a reader node may send a communication to a cloud server at an interval of every 5 seconds. In embodiments, it may be a Layer 7 protocol message specific for this purpose. Such may be referred to as "checking in". This information about the communication may be updated in the registry. In embodiments a cloud server assesses the registry periodically, and removes from the registry any reader node that has not checked in in the pre-defined time period or interval, for example the last one minute, and in embodiments, along with leaf nodes that the lost reader node in communication with.

In embodiments, the system, or devices thereof, may be configured such that when a leaf node and a reader node first establish communication the leaf node may inform the reader node of its type. The reader node may use this information to determine the type of data it will request of the leaf node and what commands it will send to the leaf node. In embodiments, if the reader node does not know the type of the leaf node, i.e., it is a new type of leaf node, at least to the reader node, then the reader node may send a request event to a cloud server, asking the cloud server to provide it instruction on how to interact with leaf node devices of this new type. The cloud server may transmit to the reader node a program, such as a driver and referred to herein as a "cloud driver", that contains instructions and/or control parameters for this "new" type of leaf node. The reader node may run the program to operate this particular leaf node, and any other leaf node that it encounters of this type.

Based on certain events, such as a directive from the operators or programmed instructions in the system, a reader node may request a leaf node to communicate the version of control program it is running in embodiments. In embodiments, if the operators desire that the lead node run a different version of program, then the cloud server may transmit an image of the program update into the reader node and the cloud server may instruct the reader node to push the image into the leaf node. The reader node may then transmit the image to the leaf and instruct the leaf node to run the program going forward.

Similarly, and with respect to control programs run on reader nodes, the operators or other devices of the system request a reader node to communicate what version of the control program it is running. If the operators or system determines that another version of the control program should be used, the cloud server may then transmit an image of the control program to the reader node and direct the reader node to run the program going forward Another event relates to balancing the loads on cloud servers of the system. The "load" may refer to the number of devices and and/or the computational demands imposed by whatever number of devices, such as reader nodes, the cloud server is communicating with and/or managing. For example, if there are two cloud servers and the first cloud server is heavily loaded by virtue of communicating with a higher number of reader nodes while the second cloud server is communicating with fewer reader nodes, then embodiments of the system provide that the first cloud server may change the registry entries of some of the device connects it currently owns, to be owned by the second cloud sever, such that the devices communicate with the second cloud server going forward. In addition to the load balancing among existing clusters of server processes, the cloud also instantiates new processes automatically when it detects an increase in "load." The various clusters of server processes may be managed and monitored through an "orchestration engine" which itself may be "load" balanced for failure scenarios.

In embodiments, certain cloud server processors may go down due to a malfunction, because of a request from an operator, or for some other reason. In those scenarios, a set of rules or instructions encoded in the orchestration engine (e.g.: the number of processing nodes of the host machine having CPU utilization below 70%) is violated, triggering new instances being spawned to compensate. Data inflow, processing, and data saving operations are resilient to failures because new processes pickup the work from last change and synchronize its state across other running processes. There may be four categories of process clusters, i.e.: web clusters, messaging clusters, processing clusters, and database clusters. Each of these clusters maintains a set of process instances to serve the workload. Each of these clusters maintains the input and output watermarks across different clusters. These watermarks are used to detect unprocessed work across different clusters and are picked up by newly spawned processes.

In embodiments, when transmitting data a device may use local processing to accrue data into a smaller format. For instance, a leaf node having or in communication with a temperature sensor senses the same temperature once a second for an hour, it may be configured to compresses that temperature data into a format of a fixed temperature over an hour, which will be around 3600 times smaller than the data for each sample. In such embodiments where data is compressed, the leaf node may sends such compressed data periodically to a reader node or any other device in the system, which is in the interest of conserving energy.

In embodiments, devices such as leaf nodes may compress data prior to sending it out to other devices such as a cloud server or reader node (include in the manner described above). In some embodiments, the device may send out data without compressing it due to the criticality of timing, for example. If for instance a leaf node receives temperature data associated with an asset, where that temperature is at or beyond a threshold critical level, then the leaf node sends out that data as a high-priority bit set, indicating a state of emergency, in some cases without compressions.

In embodiments, peripherals, such as leaf nodes, may transmit periodic advertisements. Upon receipt of the advertisement the reader node may perform various actions such as:
 If the reader node has one or more actions to be performed on a peripheral, such as setting a parameter on the peripheral, the reader node will connect to the peripheral and perform the action.
 If the reader node is waiting for an event from the peripheral, it may poll the peripheral to check the status such as by connecting to the peripheral from time to time. However, polling consumes air bandwidth and power.

Instead of polling, an attention bit may be used as an interrupt mechanism. The use of an attention bit may save air bandwidth and reduce power consumption by both the peripheral as well as the reader node. In embodiments, an attention bit may be designated in the advertisement packet, for example the most significant bit of the 3rd byte of the MANUFACTURER_SPECIFIC field of the advertisement packet. The reader node would ignore the advertisement packets until an attention bit is set. In a peripheral tag, the attention bit may be turned on when an event of interest is triggered and then reset when the condition is serviced. For example, an event of interest could be that an accelerometer on the peripheral was triggered due to a shock. The peripheral registers the shock value and sets the attention bit when it sends out the next advertisement packets. All advertisement packets from then on will have the attention bit set, until the reader node reads the shock value, thereby clearing the attention bit.

In embodiments, devices of the system need to broadcast information to a larger set of devices in the system, and in some cases all the devices in the system. In embodiments, when a reader node receives a message intended for broadcast, the reader node reviews the msg_id to determine if the reader node has processed this message already. (In embodiments, messages from any device of the system contain unique message_id's and data comprising information such as the device from which the message originated, the time it was sent, and the like). If the reader node processed the message already, it may discard the message. This prevents ringing. Ringing is when a packet keeps getting sent from one node to the next in a loop without any node recognizing that the packet is for that node and keeping it, or recognizing that it has been seen before, so that it should not be retransmitted. As a result, a ringing packet doesn't terminate, but just keeps going on. If the message is new the reader node may mark it in a database, such as a local table, as read. The reader node may forward the message for some period of time to all other devices with which it is in communication (or to the cloud server, which forwards it to all other devices with which the cloud server is in communication), except, in embodiments, the device that sent the broadcast message in the first instance.

In embodiments, there is a method for dealing with unclear messages. For example, if a leaf node or another reader node sends a second reader node a message that the second reader node does not understand, then the second reader node may mark the message as a special "message not understood" message and it may sends it to a cloud server for further analysis.

As described herein, in embodiments, the system determines the proximity of a leaf node is to a reader node. Reader nodes may be configured to perform this step. After deducing the proximity, the reader node may decrease its signal strength and instruct the leaf node to do the same. This is a power consumption measure for such BLE enabled devices.

In embodiments, when devices are in communication with one another, each device may be configured to provide data to the device with which it is in communication BER (bit error rate) of the transmission. In the cases of two devices, D1 and D2 for example, if device D1 transmits to D2 and D2 reports a BER that is higher than a preprogrammed threshold then D1 may increase its transmission power to address for the BER. If the BER is lower than a preprogrammed threshold then D1 may reduce its transmission power in order to conserve power but still maintain an acceptable BER. D1 and D2 may be configured to store historical data and adjust to an optimal power level incrementally to achieve the least power consumption for the desired BER.

In embodiments, devices of the system including leaf nodes or reader nodes may accrue data over time into a combined packet. The size of such packets may be pre-set and when the packet reaches this pre-set size then the device may sends out this packet. This is another power conservation method. In embodiments, the device may have a timeout period, since the overall system needs to keep the data current. If the first data in a packet is older than the timeout then the device sends out the data even though the packet has not reached the programmed size. For example, suppose a leaf node wants to accumulate 128 data objects before sending out an aggregation of data to a reader node, such as in the interest of compressing data and minimizing overhead. The leaf node may wait for some event to occur, but after some lower number of events (e.g., the 27th event in the current set), the condition that sets off events may stop happening. In such a case, time passes, and still the leaf node has only 27 events. Eventually the data may lose some value, since it is dated. So, rather than waiting for the accumulation of 128 data objects, the leaf node can be programmed to send what it has on to the system after the designated time period has passed.

Another event is referred to as "hibernation". In embodiments, a device, including a leaf node or a reader node, may deployed in an environment where, or otherwise may determine that, there is little to no possibility of a high-priority event. In such scenarios, the device may shut down for a preprogrammed duration, e.g. 1 minute. After this time it may wake up and functions for a preprogrammed duration, e.g. 1 second.

Data transmitted in the system may be encrypted data in transmission between different devices so that eavesdroppers may not access that data in transmission. In embodiments, the system can encrypt all or some types of communication. The encryption algorithms may be based on standard shared-secret key exchange. In embodiments, operators can define or select the encryption method. In embodiments, operators can request encrypted access to the cloud server, and from there, to reader nodes, and, from there, to the leaf nodes. In effect the whole communication path from the operator to the leaf nodes may be virtual private network, or VPN.

As described herein, reader nodes and leaf nodes may discover each other via the means specified by the relevant BLE standards or IEEE 802.15.1 BL depending on their configuration, which optimizes power consumption with the constraint of achieving some given range. The system may be configured to allow the leaf-node-reader-node network and interconnections to be dynamic. Devices, including cloud servers, reader nodes and lead nodes may be static or in motion relative to one another as mentioned herein. Thus, the system may be configured to take into account that new connections may be established, or an old connection may be broken, at any time. This includes connections between a leaf nodes and reader nodes, connections between reader nodes themselves, connections between reader nodes and cloud servers if any, and connections between any of these device and operators.

With the devices and system architecture and rules described above, the following disclosure is directed to embodiments of BLEATS. The following description of BLEATS may include additional descriptions of the configurations of any device, system rules, and/or architecture of the system and, as such, and the skilled artisan will appreciate that such additional descriptions (if described only in connection with the BLEATS below) will apply to all applicable embodiments herein. Similarly, any of the embodiments described above may be used in connection with the BLEATS described below where applicable, including any combination of devices, rule, or architectural scheme.

In embodiments, a BLEATS may be deployed in an industrial setting, which may be a stationary setting, such as a factory or warehouse, or a mobile setting, such as a semi-detached truck, a freight train, or a container-bearing cargo vessel. In embodiments, the industrial setting comprises assets, drawn from a very large set of possible types of assets. Such industrial settings and assets are well known and well understood in the art. In embodiments, each asset may be associated with a leaf node. Depending on the nature and mobility of the asset, and the nature of the industrial setting, the leaf node is in communication with sensors detecting data of various conditions, including temperature, barometric pressure, humidity, movement, location, and weight. Location may be determined according to any of the methods described herein. In embodiments, the BLEATS for the industrial setting may comprise one or more reader nodes. As described herein, the reader nodes communicate with lead nodes via BLE, or other methods. When a leaf node is within range of a reader node, discover initiates (as described herein). Once communication is established, the leaf node periodically sends, according to rules in its control program, various data that it has accrued to the reader node. This may be done both on a periodic basis, and when particular events occur (as described herein). The reader node also, as its programming and directives instruct it, may request various data from the leaf nodes with which it currently communicates. As described herein, the reader node can also transmit control programming/rules to a leaf node to run. A device of the system (such as a lead node or a reader node) may be static, i.e., located in one particular location of an industrial setting. Alternately the device may be static within that setting where the industrial setting itself is in motion, as is the case on a cargo ship. Yet again, a device may be mobile within the industrial setting, as is the case for a user carrying the device on his person. Reader nodes may use wired or wireless Internet media and protocols to communicate with a plurality of cloud servers, across the Internet.

A BLEATS in an automobile manufacturing setting is described below. An automobile manufacturer may require engine oil for the cars coming off its assembly line. Its operations people may query the factory reserves to determine how much engine oil is left, and at what rate the factory is consuming engine oil, and thereby determine at what time the engine oil will run out. A BLEATS according to the embodiments herein would provide the manufacturer with the ability to identify and monitor specific pallets of oil and their locations, are relative to where it needs them to be, as well as how many bottles or tubs are left on each pallet by, for instance, monitoring the weight of the pallet using a pressure sensor. Liquid level sensors could be used to determine the amount of oil in vats. With the BLEATS enabled by the embodiments herein, the manufacturer can quickly determine, for example, that the factory will be out of oil in a given amount of time. Such information would allow factory operators then query the oil vendors to see what is available in an acceptable time frame. For example, vendor A is charging $1.20 a gallon, but will not be able to provide any oil for 44 hours. Vendor B is charging $1.25 a gallon and can provide oil in 8 hours, but it only has 20,000 gallons on hand. And so on. Based on this information the factory operations people may determine from which vendor to purchase the oil and how much to purchase from each vendor. This ability is critical in just-in-time manufacturing, also known as "Kanban".

In another example, a tugboat holding 20,000 bottles of wine makes its way from Chicago to New Orleans. A BLEATS comprising the embodiments herein may be able to determine at all relevant times where the shipment is, and also other parameters associated with the shipment such as the temperature of assets within the shipment. If for example, that temperature rises above a pre-set threshold, e.g., 15 degrees Celsius, the BLEATS may send a message to the shipper (or any person or device in a position to control the temperature of the asset's environment) to lower the temperature of the shipment, thereby preventing the shipment from getting ruined. Consistent with the broadcast embodiments above, urgent conditions can be addressed. If for example, the temperature rises above 18 degrees Celsius then every leaf node that detects this information sends messages to any entity with which it can communicate—including other BLE devices outside the system—that the system is in a state of emergency and the temperature must be lowered.

In the context of wearable devices, from a consumer's point of view his experience improves with digital automata that he bears on his person or on his belongings being continually tracked and monitored, when data from such devices allows a controlling programmatic system to perform tasks for him without his initiating action. Examples of wearable devices include wristbands, watches, clips, clothing, glasses and more. Having continuous real-time access to this sort of information is extremely valuable in individual endeavors as well, as shown by the following examples. Such wearable devices may be considered leaf nodes.

In an example, a traveler books a hotel room online. The hotel operations and reservation system utilize a BLEATS type system described herein. The hotel may automatically charge the traveler's credit card and assigns him a room number and a time it will be available for him. In a BLEATS system as described herein, then the traveler does not need to check in at the front desk. Instead he proceeds to the room itself. There his electronically active ID tag communicates with the door, which unlocks as he approaches. He enters his room and goes to bed. Inside the room his tag communicates with sensors in the room, which activates wireless for him to use on a particular broadband channel, and turns on the TV to his preselected movie.

In another example, an elderly person with a wearable device experiences a fall in her home. She does not move. Her wearable device may detect the fall, and a subsequent lack of movement, and then alert emergency responders.

In another example, a person rents a car at rental facility. The person completes the transaction online and in the process learns where his car is. He walks to the car, which identifies him from a wear able device (i.e., a leaf node). The system, having identified him, unlocks the car and allows him to exit the facility.

In the context of Internet of Things, it is known that connected devices are those devices such as thermostats, smart locks, stationary medical devices, light controllers, security systems, and many more. In an example, a hotel chain has multiple vendors each for smart locks, thermostats, lighting control, water temperature and purity, replenishables systems, entertainment systems. In all they have many vendors, and each of these has its' own proprietary data and data structures, its own cloud instance and its own dashboard, currently making these impractical to centrally monitor, manage, and interoperate. If the hotel used the BLEATS described herein and all the devices were tied into the BLEATS, by virtue of being assets of the BLEATS, a guest could programmatically be able to specify preferences such as when the guest opens the smart lock and the temperature is over X degrees in the room, have the air conditioner go on. The guest can preprogram the lights to his desired brightness, and turn on the stereo to soft music. Such is enabled by allowing an operator user access to the applications in communication with a BLEATS herein. Instructions and preferences can be pushed to each device within the BLEATS due to the architecture and capabilities described herein. This aspect is not offered by existing systems where the devices and control programs live in disparate, proprietary data structures, each having has its own cloud instance and dashboard, or control interface.

Another embodiment of a BLEATS is in the context of a lighting control system. A BLEATS according to the embodiments herein would enable control over aspects (including but not limited to) the following:
  color—the color each element show, each being individually controllable;
  intensity—the intensity of each element, each being individually controllable;
  control of zones and subzones—controlling lights as regions or patterns, based on where light is needed or desired;
  power use
  LED life cycle management—tracking how much power has been used for given lighting element over time;
  light harvesting—increasing or decreasing how much light electrical fixtures produce by taking into account how much ambient light is present A BLEATS based lighting system facilitates controlling individual light elements with leaf nodes, and controlling the overall system through reader nodes. The advantages include:
  no additional wiring is necessary, beyond the power grid;
  elements may be added dynamically, and the system can rebalance through the methods described herein;
  the light elements themselves may be configured to inform the BLEATS of their condition, such as when they are at end-of-life
  add ancillary elements may be added to such a system dynamically such as motion detectors and infrared sensors (leaf nodes themselves) that can inform the BLEATS of the location of people so that the BLEATS can illuminate the inhabited locations only.

A BLEATS lighting system of the type above can integrate into a non-BLEATS lighting system. Currently lighting systems do not have the capability to communicate with local devices on the Internet of Things (IoT). This demonstrates how BLEATS being built into, or working in conjunction with, such lighting elements or access points provides local communication.

In another embodiment of a BLEATS, the BLEATS works in conjunction with an HVAC control system. The BLEATS may control multiple different heating, cooling and ventilation elements, connected to and controlled by the leaf nodes, without adding control wiring. As with embodiments above, elements can be added more removed dynamically. The HVAC BLEATS may also tie into other leaf node-controlled devices such as thermometers, motion sensors and worn leaf nodes tell it where people are and what their climate preferences are.

As mentioned above, a BLEATS interacts with BLE-enabled devices outside of the BLEATS per se. In an example, GPS may not work in an indoor venue. A person with a BLE-enabled cell phone may be located in the venue. Determining the exact position of this BLE-enabled device, and hence this person, may be quite valuable for various reasons, for example, the person may not be authorized to be in a particular location, the person may have an interest in items nearby to his current location, it may be useful to guide the person to move towards some location or some object. In addition, the person may belong to a set of people who can address some particular issue, and it is useful for the system or operator to know the locations of all such persons so that the operator or system can determine an appropriate person to address the problem.

In embodiments, the venue has installed in it a set of leaf nodes whose locations are known. When the person moves through this field of leaf nodes the leaf nodes or reader nodes determine from the strength, directionality and I-and-Q data of the signal coming from the person's BLE-enabled phone, the angular direction of that phone from two or more of those leaf nodes or reader nodes. In embodiments, where applicable, leaf nodes send this this information to a reader node, or where applicable the reader nodes send the information to the cloud server. The system can correlate the data and determine user's location as provided herein.

In another example, there is a field covered with landmines at random locations. In a mine clearing exercise, it may be inefficient to cover the entire field linearly with one device, referred to herein as a "clearing" device. It may be more efficient for a row of devices each moving parallel through the field. Controlling such a row currently requires one human being per clearing device. Using BLEATS, each clearing device may be controlled by a leaf node with reader node(s) placed along the row. With the reader nodes in communication with the cloud server, and operators accessing a control application run on or in connection with the cloud server, operators may control the clearing devices in the row.

A BLEATS according to the system above enables new advantages. For example, according to the embodiment herein, a reader node can have a method for, on a particular BLE channel, to deliver notifications and ancillary contextual information from connected devices untethered to and independent of any mobile device such as smartphone or tablet, and ability to reply or take responsive action to the notification.

Another advantage of the BLEATS is that it enables a universal virtual reader compatible with multiple platforms including, but not limited to, Windows, Android and iOS, providing ubiquity of the channel through any number of form factors.

ILLUSTRATIVE CLAUSES

In some implementations, information about real time location management and asset tagging system based on a leaf data communication device and beam forming gateway node may be facilitated as described in the following clauses.
1. A system for real time location of at least one leaf node device, comprising:
    a location processing engine located on a server that is remote from the at least one leaf node device; and
    at least one beam forming gateway node for collecting sectorized data relating to at least one leaf node, wherein the location processing engine processes information relayed by the beam forming receiver hardware node to facilitate determination of the location of the leaf node.
2. The system as recited in clause 1, wherein the leaf node is adapted to use the Bluetooth Low Energy protocol and to be deployed as an asset tag on a physical asset.
3. The system as recited in clause 1, wherein the beam forming gateway node and the leaf node can communicate over a range of at least twenty feet using not more than 10 mW of power.
4. A system for management of information relating to a leaf node device, comprising:
    at least one Bluetooth Low Energy-enabled leaf node device adapted communicate through a gateway node; and
    a processing engine located on a server that is remote from the at least one leaf node device for managing information relating to the leaf node.
5. The system as recited in clause 4, wherein the gateway node is a beam forming gateway node.
6. The system as recited in clause 4, wherein the managed information includes at least one of location data for the leaf node, event data about the leaf node, state information about the leaf node, and sensor data collected by the leaf node.
7. An asset tagging system, comprising:
    at least one leaf data communication node adapted to be attached to a physical asset, wherein the leaf data communication node is configured to continuously communicate in real time using the Bluetooth Low Energy protocol with at least one receiver node that collects real time information about the location of a plurality of assets.
8. The system as recited in clause 7, wherein the assets comprise at least one of human assets, manufacturing assets and inventory assets.
9. A system for real time location management of at least one leaf node device, comprising:
    a remote location processing facility located on a server that is remote from the at least one leaf node device for determining the location of the at least one leaf node device;
    at least one beam forming receiver hardware node for collecting and communicating sectorized data relating to the at least one leaf node; and
    a Bluetooth Low Energy (BLE)-enabled user device having an application for communicating with at least one of the beam forming receiver hardware node and the at least one leaf node to display the current location of the at least one leaf node, wherein the location of the leaf node is determined by at least one of the remote location processing facility and the beam forming receiver hardware node.
10. The system as recited in clause 9, wherein at least one leaf node is deployed as an asset tag on a physical asset.
11. A method for real time location of at least one leaf node device, comprising:
    taking at least one of signal strength information, proximity information and phase angle information collected via Bluetooth Low Energy communication signals from the leaf node device;
    delivering the collected information to a processing engine that is remote from the leaf node device; and
    processing the collected information in real time to determine the location of the leaf node.
12. A system for real time location of at least one leaf node device, comprising:
    at least one beam forming gateway node for managing data relating to at least one leaf node, wherein the leaf node is adapted to use the Bluetooth Low Energy protocol.
13. The system as recited in clause 12, wherein the data is managed according to location sectors located around the beam forming gateway node.
14. A system for asset tagging, comprising:
    at least one Bluetooth Low Energy-enabled leaf node device adapted to be attached as an asset tag on an asset and adapted to communicate through a gateway node to a remote location processing facility.
15. The system as recited in clause 14, wherein the gateway node is a beam forming gateway node that can identify a sector around the gateway node in which the leaf node is located.
16. The system as recited in clause 14, wherein the assets comprise at least one of human assets, manufacturing assets and inventory assets.

17. The system as recited in clause 14, wherein the leaf node device has at least one sensor.

18. A system for managing information related to at least one leaf node device that uses Bluetooth Low Energy (BLE) data communication, comprising:
   a software application installed on a mobile hardware device for communicating by the BLE data communication with at least one of a beam forming gateway node that collects data related to the leaf node device, the leaf node device, and a processing engine that is remote from the leaf node device, to present at least one of location data, event data, state data and sensor data related to the least one leaf node.

19. The system as recited in clause 18, wherein the beam forming gateway node forms sectorized beams that enable collection of directional information about the leaf node device.

20. A system for real time location of at least one leaf node device, comprising:
   at least one beam forming gateway node for collecting sectorized data relating to at least one leaf node, wherein the beams of the gateway node are shaped into sectors by use of a plurality of patch antennas.

21. The system as recited in clause 20, wherein the patch antennas are used to form four sectorized beams around the gateway node.

22. The system as recited in clause 20, wherein the sectorized beams collectively cover a 360-degree angle around the gateway node.

23. The system as recited in clause 20, wherein the sectorized beams are at least partially overlapping.

24. A system for real time location of at least one leaf node device, comprising:
   a location processing engine located on a server that is remote from the at least one leaf node device; and
   at least one beam forming receiver hardware node for collecting sectorized data relating to at least one leaf node, wherein the beams of the beam forming receiver are shaped into sectors by use of at least one antenna selected from the group consisting of a patch antenna, a linear antenna, a point antenna, a spherical antenna, a circular polarization antenna, a vertical polarization antenna, a horizontal polarization antenna, and an omnidirectional antenna with reflectors.

25. A system for managing data related to a leaf node device, comprising:
   a location processing engine located on a server that is remote from the at least one leaf node device;
   at least one beam forming gateway node for collecting data relating to at least one leaf node; and
   a database of the locations of points of interest corresponding to known locations of deployed gateways, wherein the known locations are used as a basis for determining the locations of a plurality of leaf nodes that communicate with the gateways using BLE.

26. A system for managing and storing data related to at least one leaf node device, comprising:
   a location processing engine located on a server that is remote from the at least one leaf node device;
   at least one beam forming gateway node for collecting data relating to at least one leaf node; and
   a database for storing the information collected from the leaf node devices.

27. A system for real time location of at least one leaf node device, comprising:
   a location processing engine located on a server that is remote from the at least one leaf node device;
   at least one beam forming gateway node for collecting sectorized data relating to at least one leaf node; and
   a database of the locations of virtual points of interest corresponding to logical locations of beam forming gateway nodes within a flow of assets, wherein the logical locations are used for determining the locations of a plurality of leaf nodes within the flow of assets, wherein the leaf nodes communicate with the beam forming gateway nodes using BLE.

28. The system of clause 27, wherein the logical location of a leaf node device is used to trigger an action.

29. The system of clause 27, wherein upon a leaf node arriving at a logical location, an event is triggered by the beam forming gateway node.

30. The system of clause 27, wherein upon a leaf node sensing a triggering condition, an event is triggered by the beam forming gateway node.

31. A system for real time location of at least one leaf node device, comprising:
   a location processing engine located on a server that is remote from the at least one leaf node device;
   at least one gateway node for collecting data relating to at least one leaf node; and
   a database of the locations of virtual points of interest corresponding to logical locations of gateway nodes within a flow of assets, wherein the logical locations are used for determining the locations of a plurality of leaf nodes within the flow of assets, wherein the leaf nodes communicate with the gateway nodes using BLE.

32. An information technology system for handling information to enable a real time location system using Bluetooth Low Energy (BLE), comprising:
   a device management system for mapping physical devices and handling sampled data with respect to the devices;
   an asset visibility system for real time tracking of asset locations;
   a process flow system for tracking travel paths of assets;
   a logic layer for using logic to determine locations of assets; and
   a presentation layer for presenting locations of assets.

33. A method of an information technology system for handling information relating to a real time location system (RTLS) that uses Bluetooth Low Energy (BLE) nodes for communication of data, comprising:
   a process flow editor having a user interface to allow a user to at least one of access a stored process flow from a library and edit a process flow to create a customized process flow, such that an asset may be tracked using the RTLS system with respect to at least one of a physical location corresponding to the process flow and a logical location with respect to a logical position within the process flow.

Figure 13A:
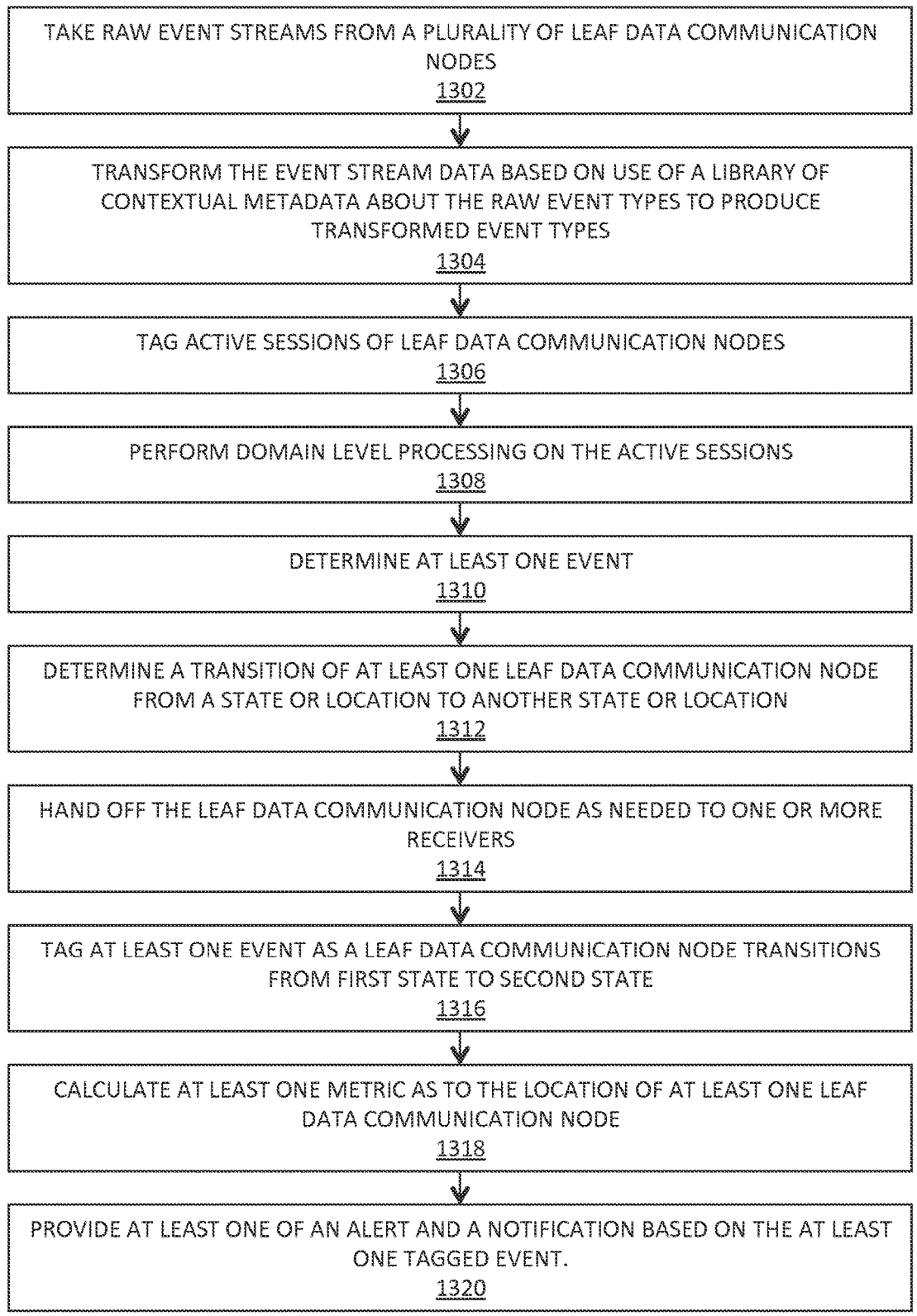
FIG. 13A-13C depict embodiments of an information technology system for handling information to enable a real time location system using the Bluetooth Low Energy protocol (BLE).

34. A method of an information technology system for handling information to enable an a real time location system using data communication nodes that communicate using the Bluetooth Low Energy protocol (BLE), comprising (as shown in FIG. 13):
   taking raw event streams from a plurality of leaf data communication nodes (step 1302);
   transforming the event stream data based on use of a library of contextual metadata about the raw event types to produce transformed event types (step 1304);
   tagging active sessions of leaf data communication nodes (step 1306);
performing domain level processing on the active sessions (step 1308);

determining at least one event (step 1310);
determining a transition of at least one leaf data communication node from a state or location to another state or location (step 1312);
handing off the leaf data communication node as needed to one or more receivers (step 1314);
tagging at least one event as a leaf data communication node transitions from first state to second state (step 1316);
calculating at least one metric as to the location of at least one leaf data communication node (step 1318); and
providing at least one of an alert and a notification based on the at least one tagged event (step 1320).

35. The method as recited in clause 34, wherein the events are at least one of boundary events and visit events.

36. The method as recited in clause 34, wherein the events relate to at least one of battery status, temperature, location, signal strength, and phase angle.

Figure 13B:
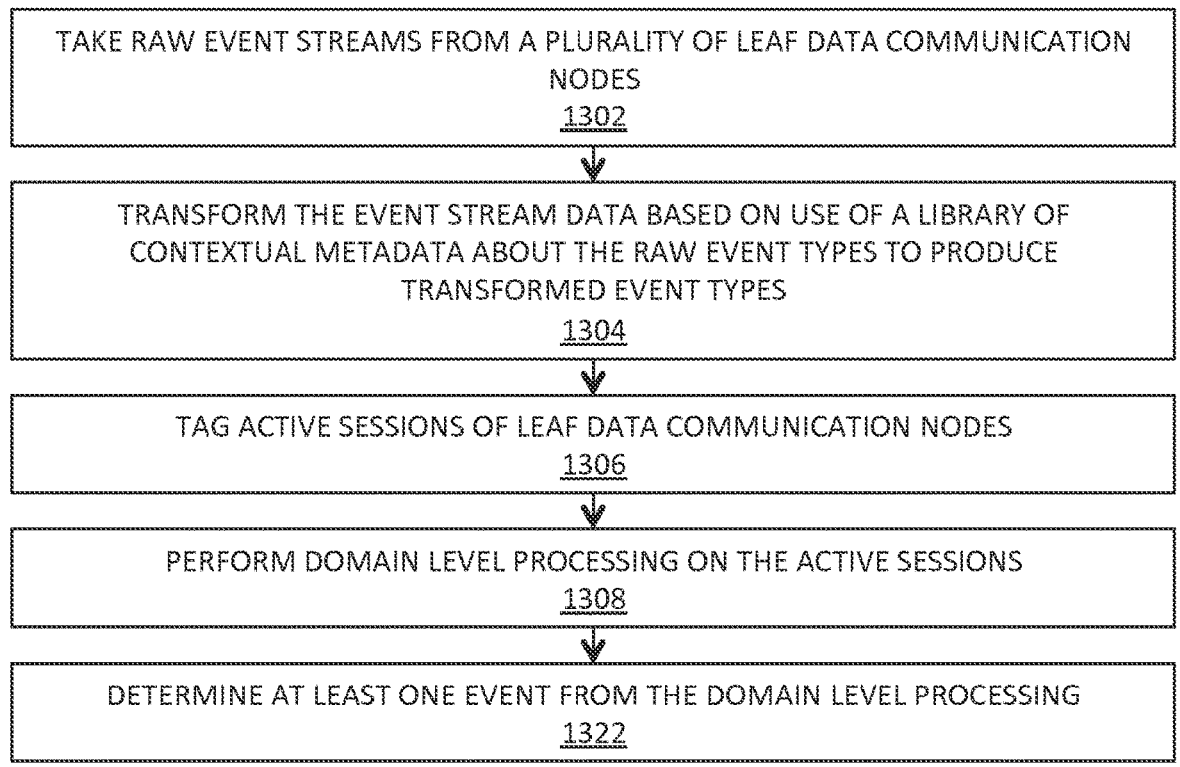

37. A method of an information technology system for handling information to enable an a real time location system using data communication nodes that communicate using the Bluetooth Low Energy protocol (BLE), comprising (as shown in FIG. 13B):
taking raw event streams from a plurality of leaf data communication nodes (step 1302);
transforming the event stream data based on use of a library of contextual metadata about the raw event types to produce transformed event types (step 1304);
tagging active sessions of leaf data communication nodes (step 1306);
performing domain level processing on the active sessions (step 1308); and
determining at least one event from the domain level processing (step 1322).

Figure 13C:
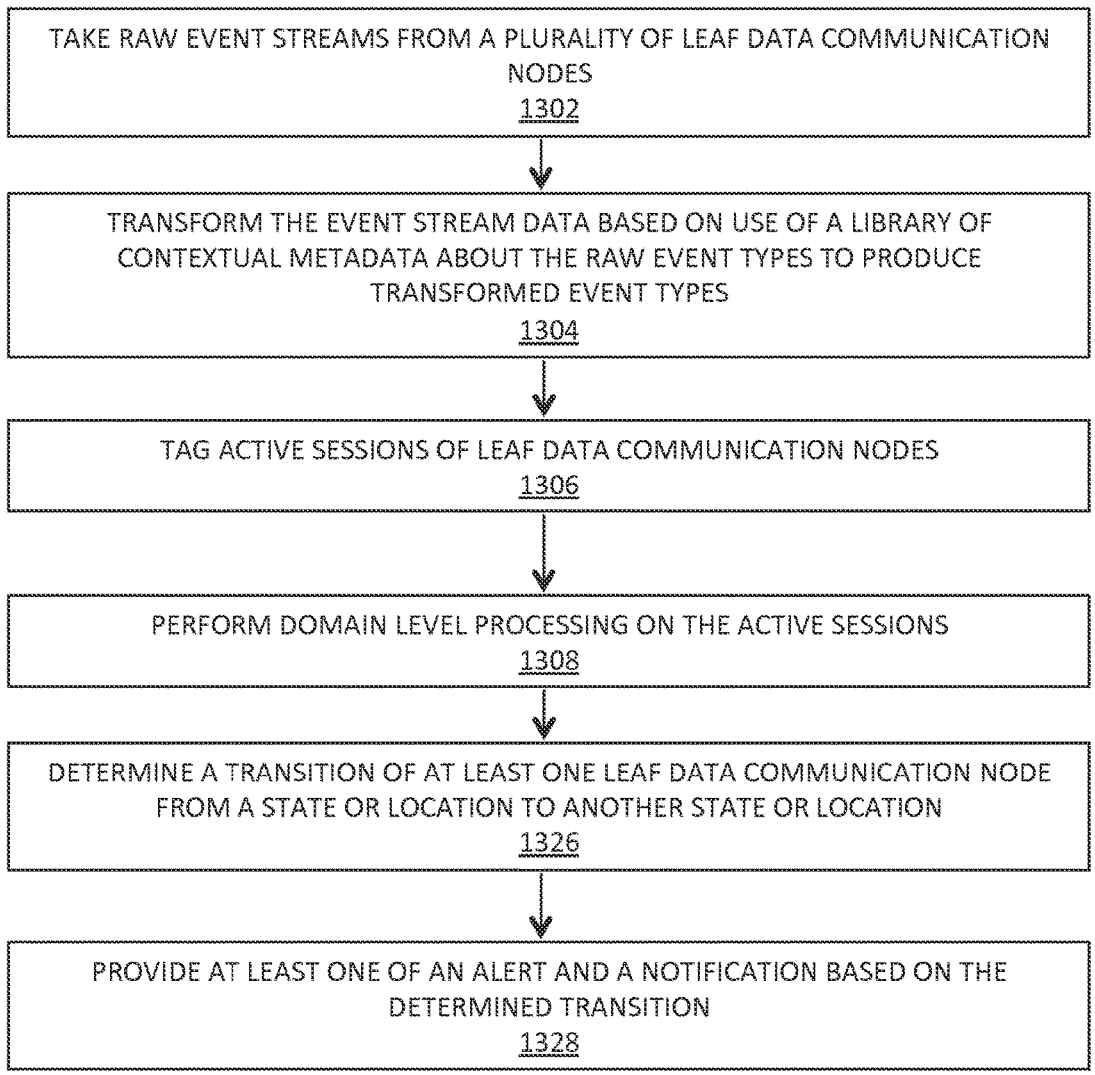

38. A method of an information technology system for handling information to enable an a real time location system using data communication nodes that communicate using the Bluetooth Low Energy protocol (BLE), comprising (as shown in FIG. 13C):
taking raw event streams from a plurality of leaf data communication nodes (step 1302);
transforming the event stream data based on use of a library of contextual metadata about the raw event types to produce transformed event types (step 1304);
tagging active sessions of leaf data communication nodes (step 1306);
performing domain level processing on the active sessions (step 1308);
determining a transition of at least one leaf data communication node from a state or location to another state or location (step 1326); and
providing at least one of an alert and a notification based on the determined transition (step 1328).

39. A method relating to an information technology system for handling information to enable a real time location system using Bluetooth Low Energy data communication nodes, comprising:
providing a reference data library containing at least one of device metadata, context data, business rules for stages of a processing pipeline, business rules for a domain, and process flows for devices that use the data communication nodes, wherein the rules and flows may be customized for particular situations.

40. A method relating to a system for real time location of at least one leaf node device, comprising:
providing at least one gateway for collecting data relating to a plurality of leaf nodes; and
time division multiplexing connections of the leaf nodes to the gateway in a time domain protocol and managing each of the connections in the time domain.

41. A method relating to a system for real time location of at least one leaf node device, comprising:
providing at least one gateway node for collecting data relating to a plurality of leaf nodes; and
providing a MAC layer designed to manage connections in the time domain, thereby enabling concurrent connections of a large number of leaf nodes to a receiver of the gateway node.

42. A method relating to a system for real time location of at least one leaf node device, comprising:
providing at least one beam forming receiver hardware node for collecting sectorized data relating to a plurality of leaf nodes; and
providing a plurality of physical radios in each sector of the beam forming receiver hardware node.

43. The method as recited in clause 42 wherein 16 physical radios are provided per beam of the beam forming receiver hardware node.

44. A method relating to a system for real time location of at least one leaf node device, comprising:
providing at least one beam forming receiver hardware node for collecting sectorized data relating to a plurality of leaf nodes; and
providing a plurality of physical radios in each sector of the beam forming hardware receiver node, wherein the plurality of radios have spectral diversity among them.

Figure 14:
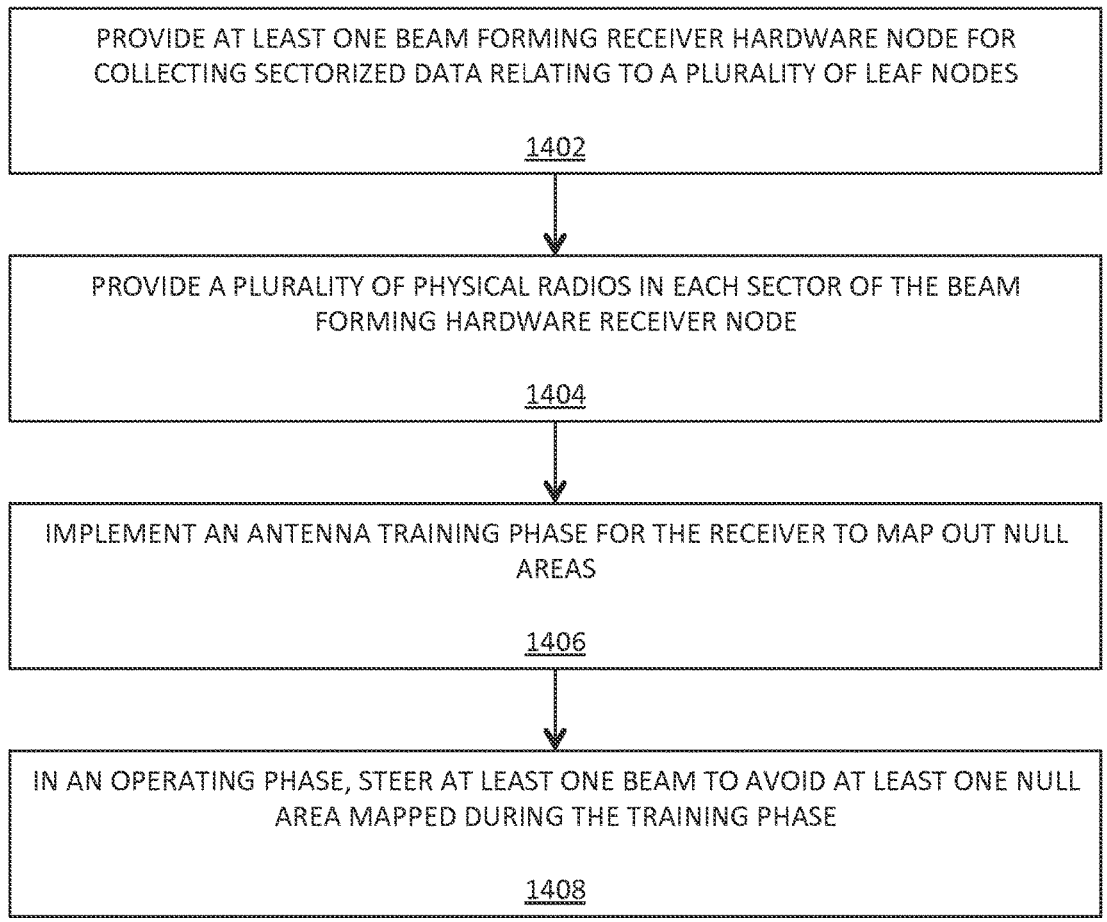
FIG. 14 depicts an embodiment of a method relating to a system for real time location of at least one leaf node device.

45. A method relating to a system for real time location of at least one leaf node device, comprising (as shown in FIG. 14):
providing at least one beam forming receiver hardware node for collecting sectorized data relating to a plurality of leaf nodes (step 1402);
providing a plurality of physical radios in each sector of the beam forming hardware receiver node (step 1404);
implementing an antenna training phase for the receiver to map out null areas (step 1406); and
in an operating phase, steering at least one beam to avoid at least one null area mapped during the training phase (step 1408).

46. A method relating to a real time location system using data communication nodes that communicate using the Bluetooth Low Energy protocol (BLE), comprising:
providing a virtualized connection manager that manages connections of a plurality of leaf nodes to a receiver node in a TDM protocol.

47. A method relating to a system for real time location of at least one leaf node device, comprising:
providing at least one beam forming gateway node having a plurality of radios for
collecting sectorized data from a plurality of leaf nodes; and
using a TDM protocol of the beam forming gateway node to enable the beam forming gateway node to handle more than one hundred leaf node device data connections per radio of the beam forming gateway node.

48. A method relating to a system for real time location of at least one leaf node device, comprising:
providing at least one beam forming receiver hardware node having a plurality of radios for collecting sectorized data from a plurality of leaf nodes; and
using multiple radios per sector to enable long range communication between the beam forming receiver hardware node and the leaf nodes.

49. The method as recited in clause 48, wherein the range of communication between the beam forming receiver hardware node and a leaf node extends at least to at least one of ten meters, twenty meters, thirty meters, forty meters, fifty meters, sixty meters, seventy meters, eighty meters, ninety meters, and one hundred meters.

50. A system for machine learning of the real time location of at least one leaf node device, comprising:
at least one beam forming receiver hardware node for collecting sectorized data relating to at least one leaf node;
a location processing engine located on a server that is remote from the at least one leaf node device, wherein the location processing engine uses machine learning on the data flow collected by the beam forming receiver hardware node about the leaf node device to help determine the location of the leaf node; and
at least one leaf node, wherein machine learning is also performed on at least one of the leaf node and the beam forming hardware receiver node.

51. A system for real time location of at least one leaf node device, comprising:
at least one gateway node for collecting sectorized data relating to at least one leaf node;
at least one leaf node that communicates using the Bluetooth Low Energy (BLE) protocol;
a location processing engine located on a server that is remote from the at least one leaf node device, wherein the location processing engine orchestrates information for the gateway node, at least one leaf node, and at least one mobile application that presents information about the location of the at least one leaf node, wherein the location processing engine includes an interpreter for interpreting heterogeneous languages used by the beam forming hardware receiver node, the leaf node and the mobile application.

52. The system as recited in clause 51, wherein the interpreter handles at least one of code and logic that is at least one of customer-specific and location-specific.

53. The system as recited in clause 51, wherein the interpreter uses SCALA language.

54. The system as recited in clause 51, wherein the interpreter uses at least one of a docker container and an embedded container.

55. A system for real time location of at least one leaf node device, comprising:
at least one gateway node for collecting data relating to at least one leaf node;
at least one leaf node that communicates using the Bluetooth Low Energy (BLE) protocol; and
a location processing engine using a plurality of servers that are remote from the at least one leaf node device, wherein the location processing engine load balances resources for a plurality of gateway nodes and wherein if a server of the plurality of servers becomes unavailable, an alternate server is designated to manage data relayed by the gateway node that was served by the unavailable server.

56. A system for real time location of at least one leaf node device, comprising:
at least one gateway node for collecting data relating to at least one leaf node;
at least one leaf node that communicates using the Bluetooth Low Energy (BLE) protocol; and
a location processing engine located on a server that is remote from the at least one leaf node device, wherein real time processing of location data about the leaf node and sensor data from the leaf node is distributed across the gateway node and the location processing engine.

Figure 15:
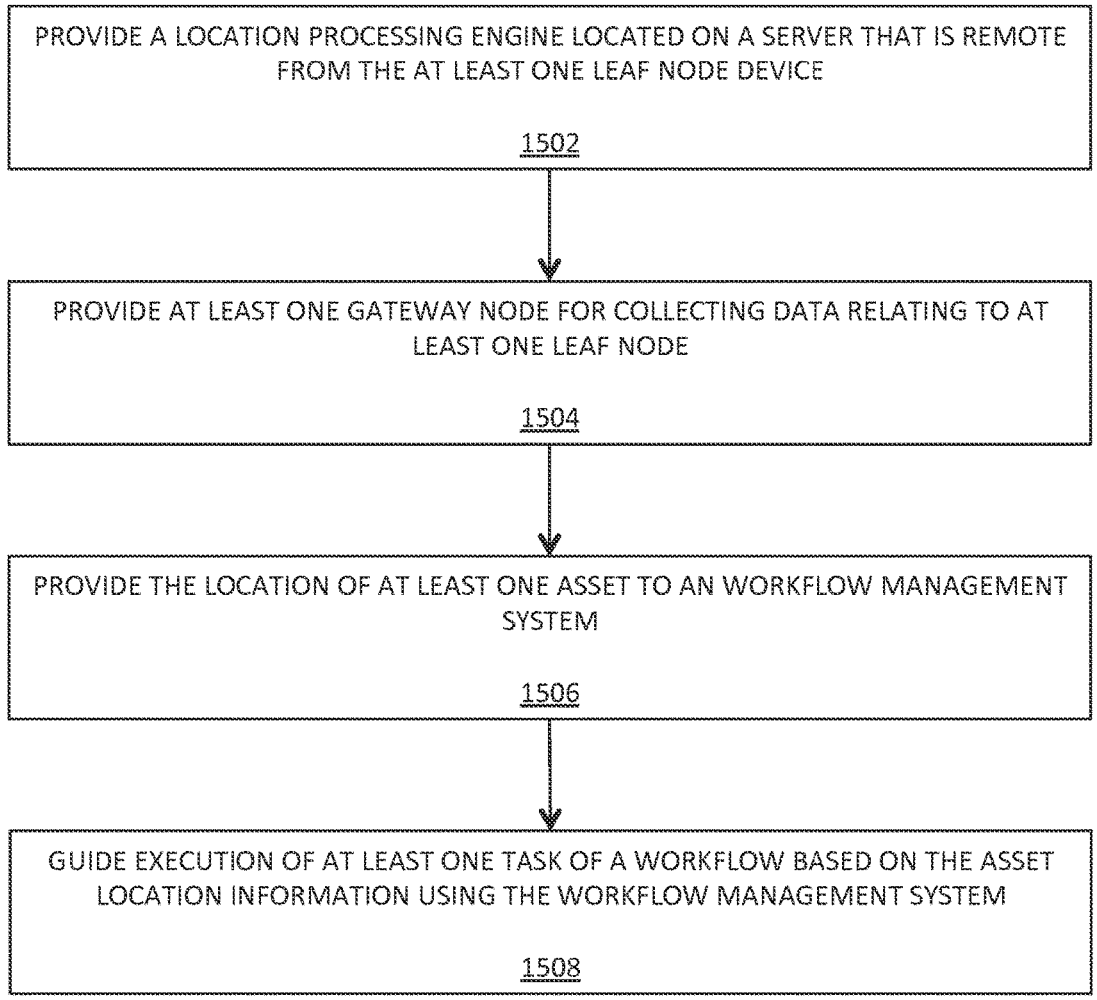
FIG. 15 depicts an embodiment of a method for managing a work flow based on the real time location.

57. A method for managing a work flow based on the real time location of at least one leaf node device, comprising (as shown in FIG. 15):
providing a location processing engine located on a server that is remote from the at least one leaf node device (step 1502);
providing at least one gateway node for collecting data relating to at least one leaf node (step 1504);
providing the location of at least one asset to an workflow management system (step 1506); and
using the workflow management system, guiding execution of at least one task of a workflow based on the asset location information (step 1508).

58. The method as recited in clause 57 wherein the asset is at least one of a hardware asset and a human asset.

59. A method relating to a system for real time location of at least one leaf node device, comprising:
providing at least one gateway node for collecting data relating to a plurality of leaf nodes; and
providing a MAC layer designed to handle data connections to the receiver hardware node;
providing a virtual MAC address in the MAC layer to at least gateway node; and accessing the gateway node by using the assigned virtual MAC addresses.

60. The method as recited in clause 59 wherein the gateway node is a beam forming gateway node.

61. A method relating to a system for real time location of at least one leaf node device, comprising:
providing at least one gateway node for collecting data relating to a plurality of leaf nodes; and
providing a MAC layer designed to handle data connections to the gateway node;
providing a virtual MAC address in the MAC layer to at least one leaf node device; and
accessing the leaf node device through the gateway node by using the assigned virtual MAC addresses.

62. The method of clause 61 wherein the MAC layer translates the virtual MAC address of the leaf node to an asset tag identifier.

63. The method of clause 61 wherein the gateway node is a beam forming gateway node.

64. A method relating to a system for real time location of at least one leaf node device, comprising:
providing at least one gateway node for collecting data relating to a plurality of leaf nodes;
providing a virtual IP address to at least one leaf node device;
translating the virtual IP address at the gateway node into an asset tag identifier; and
accessing the leaf node device through the gateway node by using the assigned virtual IP address.

65. The method as recited in clause 64 wherein the gateway node is a beam forming gateway node.

66. A system for real time location of at least one leaf node device, comprising:
a location processing engine located on a server that is remote from the at least one leaf node device;
at least one gateway node for collecting data relating to at least one leaf node; wherein a software language is provided to allow a user to at least one of query and control at least one of the leaf node and the gateway node based on at least one of an attribute and an event.

67. The system as recited in clause 66 wherein the attribute is at least one of the address, the physical location, the virtual location, and a sensed condition of at least one of the leaf node device and the gateway node.

68. The system as recited in clause 66 wherein the event is at least one of a timing event and a sensed condition.

69. The system as recited in clause 66 wherein the gateway node is a beam forming gateway node.

70. The system as recited in clause 66 wherein the software language allows a user to at least one of schedule events, query individual lead nodes, query individual gateway nodes, send commands to individual leaf nodes, send commands to individual gateway nodes, send commands to groups of leaf nodes in the system, send command to groups of gateway nodes in the system, and take action based on data transmitted by at least one of a leaf node and a gateway node.

71. The system as recited in clause 66 wherein a gateway node uses the software language to send an event notification to a remote server.

72. The system as recited in clause 66 wherein a remote server uses the software language to request data from a gateway node identified in a registry.

73. The system as recited in clause 66 wherein a remote server uses the software language to send a programmatic instruction to be executed by a gateway node.

74. A method of a system for real time location of at least one leaf node device, comprising:
providing a plurality of gateway nodes for collecting data relating to at least one leaf node;
configuring at least one leaf node to provide a rolling advertisement packet; and
using the rolling advertisement packet data to correlate information about the leaf node as the information is detected by a plurality of receiver hardware nodes.

75. A method relating to a system of real time location of at least one leaf node device, comprising:
providing a plurality of gateway nodes for collecting data relating to at least one leaf node;
configuring at least one leaf node to provide a rolling advertisement packet having a time stamp; and
using the rolling advertisement packet time stamp data to synchronize information across components of the real time location system.

76. The method as recited in clause 75 wherein the real time location system further includes at least one of a location processing engine located on a server that is remote from the at least one leaf node device and a Bluetooth Low Energy (BLE)-enabled user device having an application for communicating with at least one of the receiver hardware node and the at least one leaf node to display the current location of the at least one leaf node.

77. A method relating to a system of real time location of at least one leaf node device, comprising:
providing a plurality of beam forming gateway nodes for collecting data relating to at least one leaf node;
identifying a characteristic of the environment of the leaf node; and
configuring at least one of a number of radios, a number of sectors, a type of antenna, and a configuration of antennas based on the identified characteristic to facilitate communication between the gateway node and the leaf node.

78. A method of a system for real time location of at least one leaf node device, comprising:
providing a plurality of gateway nodes for collecting data relating to at least one leaf node; and
using the rolling advertisement packet data from a moving leaf node device to identify the leaf node as being present in the proximity of a gateway node.

79. A system, comprising:
A gateway node that is configured to search for proximate Bluetooth Low Energy (BLE) devices through a sectorized spatial region and across a range of frequency spectral bands 80. A system, comprising:
a gateway node that is configured to search for proximate Bluetooth Low Energy (BLE) devices through a sectorized spatial region and across a range of frequency spectral bands in order to establish communication with at least one such BLE device, and
a channel switching facility of the gateway node that, upon establishing communication with the BLE device, switches to a data channel for continued communication with the BLE device.

81. A system, comprising:
a plurality of gateway nodes each configured to interact with at least one leaf node device; and
a synchronization facility of such gateway nodes for exchanging PTP synchronization data among them to synchronize the gateway nodes to nanosecond resolution; and
a correlation facility for correlating sampled I and Q components of signals received by the gateway nodes from the leaf node device to determine the leaf node device position at a point in time.

82. The system of clause 81 wherein the correlation facility is located on a server that is remote from the gateway nodes.

83. A system, comprising:
a plurality of gateway nodes each configured to interact with at least one leaf node device; and
a synchronization facility of such gateway nodes for exchanging PTP synchronization data among them to synchronize the gateway nodes to nanosecond resolution; wherein once synchronized, the gateway nodes test interference with each other by simultaneously transmitting a packet and a plurality of gateway nodes monitor and sample the I and Q data with respect to the packet, and wherein the system uses the interference test data to determine a map of gateway node interactions.

84. A method of communication in an asset management system having a plurality of leaf nodes that communicate via Bluetooth Low Energy (BLE), comprising:
detecting a collision of messages emitted by two leaf nodes on the same channel at the same time; and
upon detecting the collision, having each of the leaf nodes wait a random amount of time then retransmit the messages, thereby reducing the likelihood of a second collision of the messages.

85. A method relating to an asset tracking system having a plurality of leaf nodes associated with a plurality of assets, comprising:
providing a plurality of gateway nodes for collecting data relating to at least one leaf node;
providing a geo-location system of the gateway nodes to establish the positions of the gateway nodes; and
storing the positions of the gateway nodes in a data storage facility, such that the positions can be used as references in determining relative locations of the leaf nodes.

86. A system for real time location of at least one leaf node device, comprising:
- a location processing engine located on a server that is remote from the at least one leaf node device; and
- at least one gateway node for collecting data relating to at least one leaf node, wherein the location processing engine processes information relayed by the gateway node to facilitate determination of the location of the leaf node, wherein the communication between the gateway node and the leaf node device is configured to hop between available BLE frequencies.

87. A system for real time location of at least one leaf node device, comprising:
- a location processing engine located on a server that is remote from the at least one leaf node device; and
- at least one gateway node for collecting data relating to at least one leaf node, wherein the location processing engine processes information relayed by the gateway node to facilitate determination of the location of the leaf node, wherein the priority of communication between the gateway node and a leaf node device may be managed based on a communication bit that designates a message as a high priority message.

88. A system for real time location of at least one leaf node device that communicates using the Bluetooth Low Energy protocol, comprising:
- at least one gateway node for collecting data relating to at least one leaf node; and
- at least one access point device for providing Internet access to a region in which the leaf node may be located, wherein the gateway node is integrated as a card in the chassis of the access point device and the gateway node and the access point device communicate through the backplane of the access point device.

The methods and systems described herein may be deployed in part or in whole through a machine that executes computer software, program codes, and/or instructions on a processor. Any processing facility, unless otherwise indicated, may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A system for determining a real time location of a leaf node device, the system comprising:
   at least one battery-powered Bluetooth Low Energy (BLE) enabled leaf node device, wherein the at least one leaf node device is associated with a corresponding monitored asset, wherein the at least one leaf node device transmits data via BLE communication signals on each channel of a plurality of channels, wherein each channel comprises a different frequency band; and
   at least two beam forming reader nodes in communication, via BLE communication signals, with the at least one leaf node, each of the reader nodes including a corresponding plurality of antenna elements for producing a corresponding specific radiation pattern of a plurality of sectorized beams in a corresponding plurality of sectors, wherein each of the reader nodes is enabled to receive communication signals in each sector of its corresponding plurality of sectors on each of the plurality of channels, and wherein each of the reader nodes collects, in at least one sector common to both of the corresponding plurality of sectors, corresponding signal strength data from the at least one leaf node device in the at least one common sector from at least two different sectorized beams of its corresponding plurality of sectorized beams at the same time,
   wherein a location processing facility determines the presence of the at least one leaf node device in the at least one common sector and the real-time location of the at least one leaf node device in the at least one common sector based on the corresponding signal strength data from the corresponding at least two different sectorized beams collected by each of the at least two beam forming reader nodes and based on a triangulation calculation.

2. The system of claim 1, wherein each of the at least two beam forming reader nodes comprises a corresponding plurality of physical radios associated with each sector of the corresponding plurality of sectors.

3. The system of claim 1, wherein at least one of the at least two beam forming reader nodes shapes its corresponding sectorized beams with a corresponding plurality of patch antennas.

4. The system of claim 3, wherein the corresponding plurality of patch antennas is used to form four corresponding sectorized beams around the corresponding one of the at least two beam forming reader nodes.

5. The system of claim 1, wherein, for at least one of the at least two beam forming reader nodes, the corresponding sectorized beams collectively cover a 360-degree angle in a plane around that beam forming reader node.

6. The system of claim 1, wherein, for at least one of the at least two beam forming reader nodes, the corresponding sectorized beams are at least partially overlapping.

7. The system of claim 1, wherein the location processing facility is in at least one of the at least two beam forming reader nodes.

8. The system of claim 1, wherein the at least one leaf node device is an asset tag on a physical asset.

9. The system of claim 8 further comprising a sensor in communication with the at least one leaf node device detecting status information related to the asset.

10. The system of claim 9, wherein the sensor is a temperature sensor.

11. The system of claim 9, wherein the sensor is an accelerometer.

12. The system of claim 9, wherein the sensor is a pressure sensor.

13. The system of claim 9, wherein the sensor is a light sensor.

14. The system of claim 1, wherein communication is established with a corresponding beam forming reader node when that beam forming reader node receives data from the at least one leaf node and subsequently that beam forming reader node hands off communication with the at least one leaf node to a data channel of its corresponding plurality of channels or a different channel.

15. The system of claim 14, wherein the corresponding plurality of channels are BLE advertisement channels.

* * * * *